(12) United States Patent
Murai et al.

(10) Patent No.: US 8,921,020 B2
(45) Date of Patent: Dec. 30, 2014

(54) ELECTROPHOTOGRAPHIC PHOTOSENSITIVE MEMBER, PROCESS CARTRIDGE, AND ELECTROPHOTOGRAPHIC APPARATUS

(75) Inventors: Shio Murai, Toride (JP); Harunobu Ogaki, Suntou-gun (JP); Kazunori Noguchi, Suntou-gun (JP); Takashi Anezaki, Hiratsuka (JP); Kazuhisa Shida, Mishima (JP); Atsushi Okuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/879,348

(22) PCT Filed: Oct. 25, 2011

(86) PCT No.: PCT/JP2011/075020
§ 371 (c)(1),
(2), (4) Date: Apr. 12, 2013

(87) PCT Pub. No.: WO2012/057350
PCT Pub. Date: May 3, 2012

(65) Prior Publication Data
US 2013/0202327 A1 Aug. 8, 2013

(30) Foreign Application Priority Data
Oct. 29, 2010 (JP) ................................. 2010-244361

(51) Int. Cl.
G03G 5/05 (2006.01)
G03G 5/07 (2006.01)
G03G 5/147 (2006.01)
C08G 63/193 (2006.01)

(52) U.S. Cl.
CPC .............. *G03G 5/078* (2013.01); *G03G 5/0542* (2013.01); *G03G 5/0564* (2013.01); *G03G 5/056* (2013.01); *G03G 5/14786* (2013.01); *G03G 5/14773* (2013.01); *C08G 63/193* (2013.01); *G03G 5/14756* (2013.01); *G03G 5/14752* (2013.01)
USPC .............. 430/58.2; 430/59.6; 430/96; 430/66

(58) Field of Classification Search
USPC ............. 430/59.6, 66, 58.2, 96; 399/159, 111
See application file for complete search history.

(56) References Cited

U.S. PATENT DOCUMENTS

| | | | |
|---|---|---|---|
| 6,991,881 B2 | 1/2006 | Ogaki et al. | |
| 6,994,941 B2 | 2/2006 | Tanaka et al. | |
| 7,001,699 B2 | 2/2006 | Tanaka et al. | |
| 7,045,261 B2 | 5/2006 | Tanaka et al. | |
| 7,171,142 B2 | 1/2007 | Kawakami et al. | |
| 7,413,840 B1 | 8/2008 | Ogaki et al. | |
| 7,551,878 B2 | 6/2009 | Ogaki et al. | |
| 7,553,594 B2 | 6/2009 | Ogaki et al. | |
| 7,556,901 B2 | 7/2009 | Anezaki et al. | |
| 7,585,604 B2 | 9/2009 | Ogaki et al. | |
| 7,622,238 B2 | 11/2009 | Uematsu et al. | |
| 7,629,102 B2 | 12/2009 | Ochi et al. | |
| 7,645,547 B2 | 1/2010 | Okuda et al. | |
| 7,655,370 B2 | 2/2010 | Kitamura et al. | |
| 7,704,657 B2 | 4/2010 | Uesugi et al. | |
| 7,718,331 B2 | 5/2010 | Uematsu et al. | |
| 7,749,667 B2 | 7/2010 | Kawahara et al. | |
| 7,799,496 B2 | 9/2010 | Uesugi et al. | |
| 7,838,190 B2 | 11/2010 | Ogaki et al. | |
| 7,875,410 B2 | 1/2011 | Ogaki et al. | |
| 7,927,774 B2 | 4/2011 | Ogaki et al. | |
| 7,931,848 B2 | 4/2011 | Ochi et al. | |
| 8,361,686 B2 | 1/2013 | Nukada et al. | |
| 8,455,170 B2 | 6/2013 | Nakamura et al. | |
| 8,457,528 B2 | 6/2013 | Ochi et al. | |
| 2007/0054207 A1 | 3/2007 | Kimura | |
| 2011/0158683 A1 | 6/2011 | Okuda et al. | |
| 2011/0177438 A1 | 7/2011 | Noguchi et al. | |
| 2012/0114375 A1 | 5/2012 | Fujii et al. | |
| 2012/0301181 A1 | 11/2012 | Ogaki et al. | |
| 2012/0301182 A1 | 11/2012 | Anezaki et al. | |
| 2013/0202326 A1 | 8/2013 | Shida et al. | |
| 2013/0221560 A1 | 8/2013 | Kawai et al. | |
| 2013/0236823 A1 | 9/2013 | Noguchi et al. | |

FOREIGN PATENT DOCUMENTS

| | | | |
|---|---|---|---|
| CN | 1940735 A | | 4/2007 |
| CN | 101526763 A | | 9/2009 |
| CN | 101644904 A | | 2/2010 |
| JP | 2002-128883 A | | 5/2002 |
| JP | 2007-178765 A | | 7/2007 |
| JP | 2009-180760 A | | 8/2009 |
| JP | 2010126652 A | * | 6/2010 |

OTHER PUBLICATIONS

English language machine translation of JP 2009-180760 (Aug. 2009).*
English language machine translation of JP 2010-126652 (Jun. 2010).*
Sekiya, et al., U.S. Appl. No. 13/930,341, filed Jun. 28, 2013.
Okuda, et al., U.S. Appl. No. 13/930,383, filed Jun. 28, 2013.
Kaku, et al., U.S. Appl. No. 13/930,368, filed Jun. 28, 2013.
PCT International Search Report and Written Opinion of the International Searching Authority, International Application No. PCT/JP2011/075020, Mailing Date Jan. 17, 2012.
Chinese Office Action dated Sep. 23, 2014 in Chinese Application No. 201180052664.7.

* cited by examiner

*Primary Examiner* — Christopher Rodee
(74) *Attorney, Agent, or Firm* — Fitzpatrick, Cella, Harper and Scinto

(57) ABSTRACT

Provided is an electrophotographic photosensitive member, including: a support; and a photosensitive layer, which is provided on the support, in which: a surface layer of the electrophotographic photosensitive member includes a terminal siloxane-containing polyester resin having a specific structure; and a lower layer provided in contact with the surface layer includes a polycarbonate resin, a polyester resin, or a polyvinyl acetal resin, having a specific structure.

8 Claims, 1 Drawing Sheet

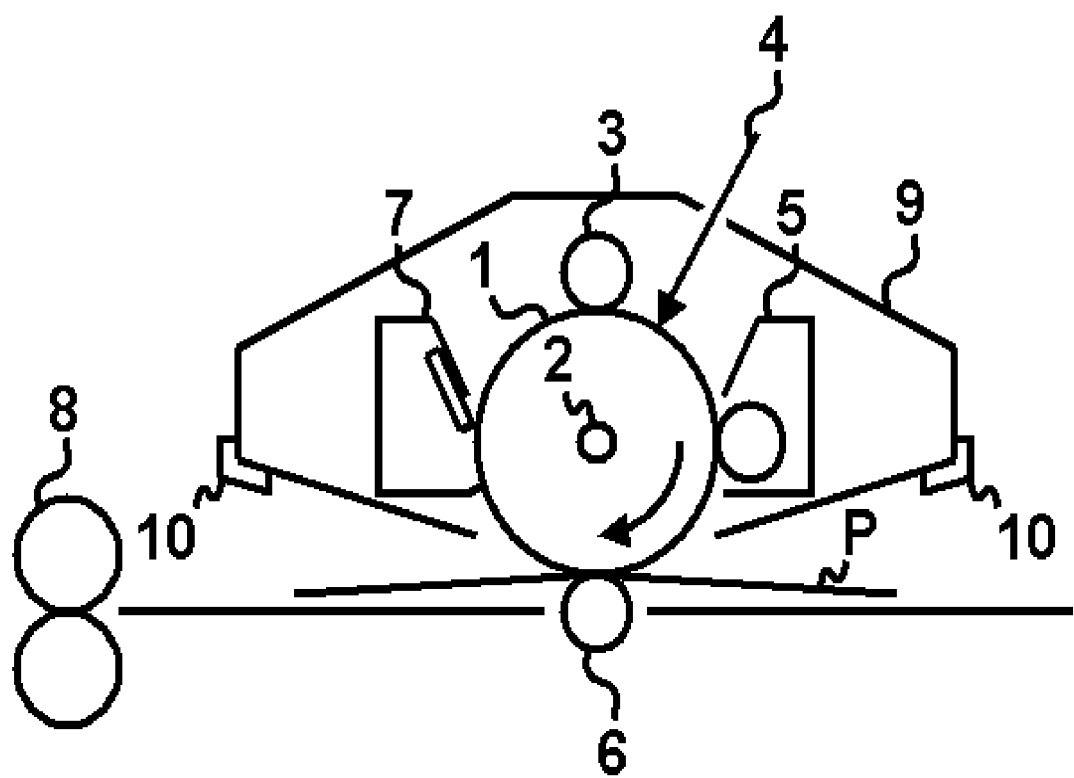

ELECTROPHOTOGRAPHIC PHOTOSENSITIVE MEMBER, PROCESS CARTRIDGE, AND ELECTROPHOTOGRAPHIC APPARATUS

TECHNICAL FIELD

The present invention relates to an electrophotographic photosensitive member, a process cartridge, and an electrophotographic apparatus.

BACKGROUND ART

An organic electrophotographic photosensitive member containing an organic charge-generating substance (hereinafter, referred to as "electrophotographic photosensitive member") is known as an electrophotographic photosensitive member mounted on an electrophotographic apparatus. In an electrophotographic process, a variety of members such as a developer, a charging member, a cleaning blade, paper, and a transferring member (hereinafter, also referred to collectively as "contact member or the like") have contact with the surface of the electrophotographic photosensitive member. Therefore, the electrophotographic photosensitive member is required to reduce generation of image deterioration due to contact stress with such contact member or the like. In particular, in recent years, the electrophotographic photosensitive member has been required to have an effect of reducing the image deterioration due to contact stress with improvement of durability of the electrophotographic photosensitive member.

To relieve contact stress, there is proposed a technology for incorporating a siloxane-containing resin having a siloxane structure in its molecular chain into a surface layer of an electrophotographic photosensitive member. Patent Literature 1 proposes a resin obtained by incorporating a phenol-modified siloxane structure into the terminal of a polyester resin and discloses that the resin can exhibit both of an effect of suppressing potential variation and an effect of reducing contact stress. Meanwhile, Patent Literature 2 proposes a polycarbonate resin obtained by incorporating an ether-modified terminal siloxane structure and discloses that the resin can improve stain or fouling resistance of the outermost layer of the photosensitive member to dust, fingerprint, oil, cleaning liquid, a large amount of toner, and the like.

CITATION LIST

Patent Literature

PTL 1: Japanese Patent Application Laid-Open 2002-128883

PTL 2: Japanese Patent Application Laid-Open 2009-180760

SUMMARY OF INVENTION

Technical Problem

However, the electrophotographic photosensitive member including the resin disclosed in Patent Literature 1 is insufficient for peeling (film peeling) at the interface between the surface layer and a lower layer beneath the surface layer. This is because a siloxane moiety, which exerts low surface energy property, has high surface migration property (interface migration property) and tends to be present at the interface with the lower layer in contact with the surface layer. Therefore, in the case where the surface layer contains the resin having incorporated therein a siloxane structure of Patent Literature 1, film peeling is liable to occur because the content of the siloxane moiety becomes higher in the vicinity of the interface with the lower layer.

Meanwhile, Patent Literature 2 describes an attempt at improving fouling resistance in the photosensitive member including the polycarbonate resin having incorporated therein an ether-modified terminal siloxane structure. However, the number of repetitions of the siloxane moiety is small, and hence an effect of relieving contact stress is insufficient.

An object of the present invention is to provide an electrophotographic photosensitive member which can exhibit both of an effect of relieving contact stress with a contact member or the like and an effect of suppressing film peeling at higher levels. Another object of the present invention is to provide a process cartridge and an electrophotographic apparatus each including the electrophotographic photosensitive member.

Solution to Problem

The above-mentioned objects are achieved by the present invention described below.

The present invention relates to an electrophotographic photosensitive member, comprising:

a support, a charge-generating layer which is provided on the support and comprises a charge-generating substance; and a charge-transporting layer which is provided on the charge-generating layer and comprises a charge-transporting substance, wherein:

a surface layer of the electrophotographic photosensitive member comprises at least one resin selected from the group consisting of a resin B having a structure represented by the following formula (B) and a resin C having a structure represented by the following formula (C); and a lower layer in contact with the surface layer comprises at least one resin selected from the group consisting of a polycarbonate resin D having a repeating structural unit represented by the following formula (D), a polyester resin E having a repeating structural unit represented by the following formula (E), and a polyvinyl acetal resin F having a repeating structural unit represented by the following formula (F-A), a repeating structural unit represented by the following formula (F-B), and a repeating structural unit represented by the following formula (F-C).

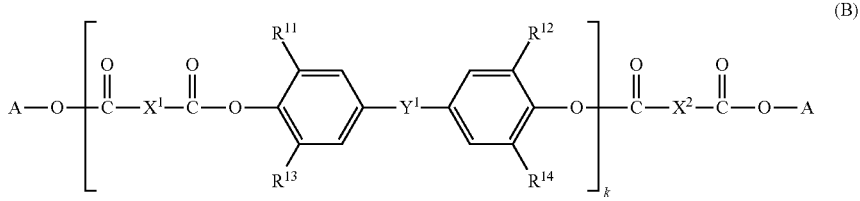
(B)

In the formula (B): $R^{11}$ to $R^{14}$ each independently represent a hydrogen atom or a methyl group; $X^1$ and $X^2$ each independently represent an m-phenylene group, a p-phenylene group, or a bivalent group having two p-phenylene groups bonded with an oxygen atom; $Y^1$ represents a single bond, a methylene group, an ethylidene group, a propylidene group, a phenylethylidene group, a cyclohexylidene group, or an oxygen atom; "k" represents the number of repetitions of a structure within the bracket; and "A" represents a structure represented by the following formula (A).

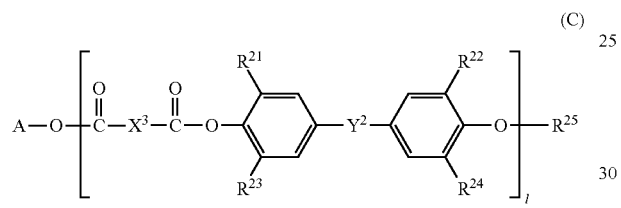
(C)

In the formula (C): $R^{21}$ to $R^{24}$ each independently represent a hydrogen atom or a methyl group; $Y^2$ represents a single bond, a methylene group, an ethylidene group, a propylidene group, a phenylethylidene group, a cyclohexylidene group, or an oxygen atom; $R^{25}$ represents a structure represented by the following formula (R25-1), (R25-2), or (R25-3); $X^3$ represents an m-phenylene group, a p-phenylene group, or a bivalent group having two p-phenylene groups bonded with an oxygen atom; "l" represents the number of repetitions of a structure within the brackets; and "A" represents a structure represented by the following formula (A).

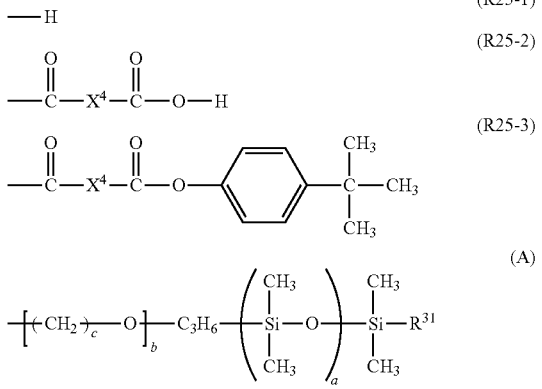

In the formulae (R25-2) and (R25-3), $X^4$ represents an m-phenylene group, a p-phenylene group, or a bivalent group having two p-phenylene groups bonded with an oxygen atom; and in the formula (A), "a", "b", and "c" each represent the number of repetitions of a structure within the brackets, an average of "a" in the resin B and the resin C ranges from 10 to 100, an average of "b" in the resin B and the resin C ranges from 1 to 3, and an average of "c" in the resin B and the resin C ranges from 2 to 4; and $R^{31}$ represents an alkyl group having 1 to 4 carbon atoms.

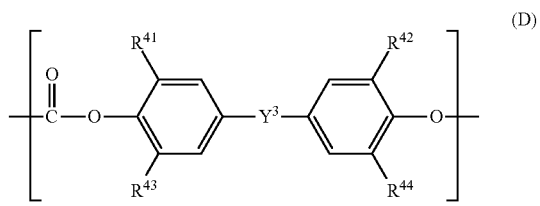
(D)

In the formula (D): $R^{41}$ to $R^{44}$ each independently represent a hydrogen atom or a methyl group; and $Y^3$ represents a single bond, a methylene group, an ethylidene group, a propylidene group, a phenylethylidene group, a cyclohexylidene group, or an oxygen atom.

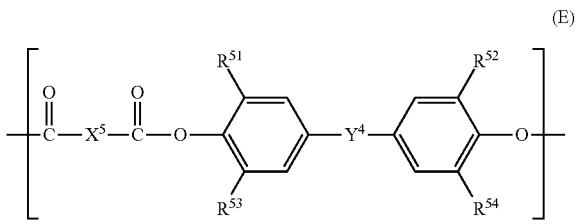
(E)

In the formula (E): $R^{51}$ to $R^{54}$ each independently represent a hydrogen atom or a methyl group; $X^5$ represents an m-phenylene group, a p-phenylene group, or a bivalent group having two p-phenylene groups bonded with an oxygen atom; and $Y^4$ represents a single bond, a methylene group, an ethylidene group, a propylidene group, a phenylethylidene group, a cyclohexylidene group, or an oxygen atom.

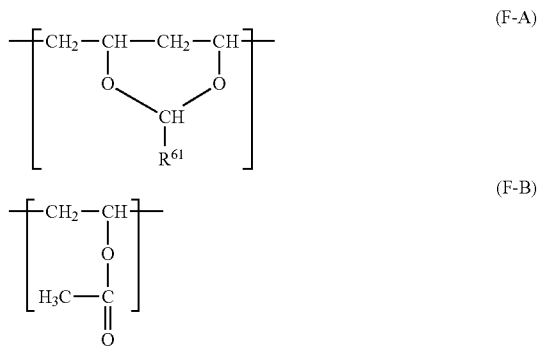

-continued

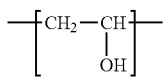
(F-C)

In the formula (F-A), $R^{61}$ represents an alkyl group having 1 to 4 carbon atoms.

Further, the present invention relates to a process cartridge detachably attachable to a main body of an electrophotographic apparatus, wherein the process cartridge integrally supports: the electrophotographic photosensitive member; and at least one device selected from the group consisting of a charging device, a developing device, a transferring device, and a cleaning device.

Further, the present invention relates to an electrophotographic apparatus, including: the electrophotographic photosensitive member; a charging device; an exposing device; a developing device; and a transferring device.

Advantageous Effects of Invention

According to the present invention, it is possible to provide an electrophotographic photosensitive member which exhibits both of an effect of relieving contact stress with a contact member or the like and an effect of suppressing film peeling at higher levels. Moreover, according to the present invention, it is also possible to provide a process cartridge and an electrophotographic apparatus each including the electrophotographic photosensitive member.

Further features of the present invention will become apparent from the following description of exemplary embodiments with reference to the attached drawings.

BRIEF DESCRIPTION OF DRAWING

FIG. 1 is a schematic view of one example of a structure of an electrophotographic apparatus including a process cartridge including an electrophotographic photosensitive member of the present invention.

DESCRIPTION OF EMBODIMENTS

As described above, an electrophotographic photosensitive member of the present invention is an electrophotographic photosensitive member, including: a support, a charge-generating layer which is provided on the support and comprises a charge-generating substance, and a charge-transporting layer which is provided on the charge-generating layer and comprises a charge-transporting substance. A surface layer of the electrophotographic photosensitive member includes at least one resin selected from the group consisting of a resin B having a structure represented by the following formula (B) and a resin C having a structure represented by the following formula (C). In addition, a lower layer in contact with the surface layer includes at least one resin selected from the group consisting of a polycarbonate resin D having a repeating structural unit represented by the following formula (D), a polyester resin E having a repeating structural unit represented by the following formula (E), and a polyvinyl acetal resin F having a repeating structural unit represented by the following formula (F-A), a repeating structural unit represented by the following formula (F-B), and a repeating structural unit represented by the following formula (F-C). As a result, an electrophotographic photosensitive member can be provided which exhibits both of an effect of relieving contact stress with a contact member or the like and an effect of suppressing film peeling at higher levels.

The inventors of the present invention have assumed the reason why the electrophotographic photosensitive member of the present invention exhibits such excellent effects as follows. When a resin having a large number of repetitions of siloxane (a resin having a siloxane moiety in a higher content) is incorporated into the surface layer of the present invention, an excellent effect of relieving contact stress can be obtained, but film peeling is liable to occur because the resin having a siloxane moiety migrates to the interface on the lower layer side of the surface layer. The resin B and resin C of the present invention are also resins each having a large number of repetitions of siloxane. Therefore, in the present invention, an ether structure bonded to the siloxane moiety in the resin B and the resin C included in the surface layer is less sterically-hindered flexible structure, and hence the resins each have high polarity. The inventors have considered that a synergistic effect between the fact that the resin B and the resin C each have high polarity as described above and the fact that the resin included in the lower layer in contact with the surface layer has a carbonyl group having relatively high polarity enhances affinity of both of the resins, resulting in an excellent effect of suppressing film peeling. Further, the inventors have found that both of the effect of relieving contact stress and the effect of suppressing film peeling can be exhibited at higher levels by adjusting the number of repetitions of the siloxane moiety included in the resin B and the resin C.

The surface layer of the present invention includes at least one resin selected from the group consisting of a resin B having a structure represented by the following formula (B) and a resin C having a structure represented by the following formula (C).

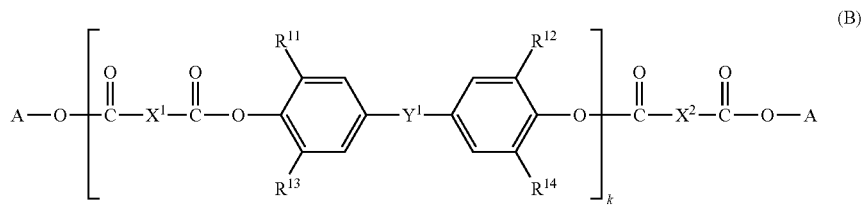
(B)

In the formula (B): $R^{11}$ to $R^{14}$ each independently represent a hydrogen atom or a methyl group; $X^1$ and $X^2$ each represent an m-phenylene group, a p-phenylene group, or a bivalent group having two p-phenylene groups bonded via an oxygen atom; $Y^1$ represents a single bond, a methylene group, an ethylidene group, a propylidene group, a phenylethylidene group, a cyclohexylidene group, or an oxygen atom; "k" represents the number of repetitions of a structure within the brackets; and "A" represents a structure represented by the following formula (A).

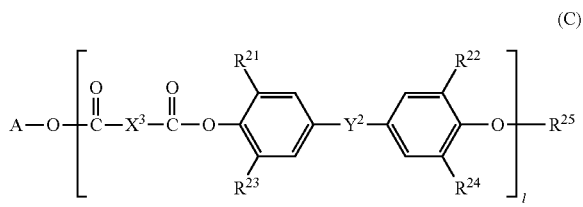
(C)

In the formula (C): $R^{21}$ to $R^{24}$ each independently represent a hydrogen atom or a methyl group; $Y^2$ represents a single bond, a methylene group, an ethylidene group, a propylidene group, a cyclohexylidene group, a phenylethylidene group, or an oxygen atom; $R^{25}$ represents a structure represented by the following formula (R25-1), a structure represented by (R25-2), or a structure represented by (R25-3); $X^3$ represents an m-phenylene group, a p-phenylene group, or a bivalent group having two p-phenylene groups bonded via an oxygen atom; "l" represents the number of repetitions of a structure within the brackets; and "A" represents a structure represented by the following formula (A):

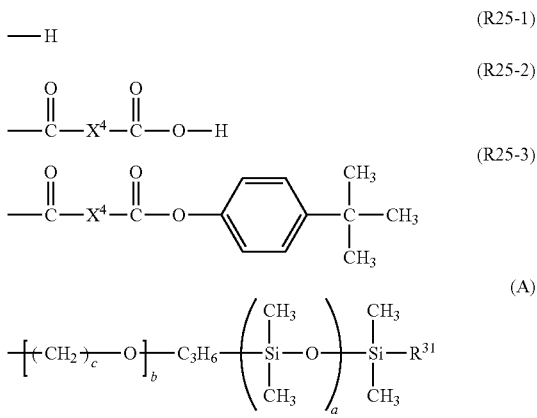

In the formulae (R25-2) and (R25-3): $X^4$ represents an m-phenylene group, a p-phenylene group, or a bivalent group having two p-phenylene groups bonded via an oxygen atom. In the formula (A): "a", "b", and "c" each represent the number of repetitions of a structure within brackets, an average of "a" in the resin B and the resin C ranges from 10 to 100, an average of "b" in the resin B and the resin C ranges from 1 to 3, and an average of "c" in the resin B and the resin C ranges from 2 to 4; and $R^{31}$ represents an alkyl group having 1 to 4 carbon atoms.

The resin B and resin C of the present invention are preferably contained in a content of not less than 5% by mass and not more than 100% by mass relative to the total mass of the resins in the surface layer. If the content is not less than 5% by mass and not more than 100% by mass, the effect of relieving contact stress is sufficiently exhibited.

"A" in the formula (B) or the formula (C) is described. "A" contains a siloxane moiety and is represented by the above-mentioned formula (A). "a" in the formula (A) represents the number of repetitions of a structure within the brackets, and an average of "a" in the resin B and the resin C is preferably 10 or more to 100 or less. If the average of "a" is less than 10, the effect of relieving contact stress is not sufficiently exhibited because the number of the siloxane moiety is small. Meanwhile, if the average of "a" is more than 100, film peeling is liable to occur, resulting in an insufficient effect of suppressing film peeling because the number of the siloxane moiety is large. In addition, the average of "a" is more preferably 20 or more to 40 or less. Further, the number of repetitions "a" of a structure within the brackets in each structural unit preferably falls within the range of ±10% of a value represented as the average of the number of repetitions "a" because the effects of the present invention can be exhibited stably. "b" represents the number of repetitions of a structure within the brackets, and an average of "b" in the resin B and the resin C is 1 or more to 3 or less. In addition, a difference between the maximum value and the minimum value of the number of repetitions "b" of a structure within the brackets in each structural unit is 0 or more to 2 or less. "c" represents the number of repetitions of a structure within the brackets, and an average of "c" in the resin B and the resin C is 2 or more to 4 or less. Further, a difference between the maximum value and the minimum value of the number of repetitions "c" of a structure within the brackets in each structural unit is 0 or more to 2 or less. $R^{31}$ represents an alkyl group having 1 to 4 carbon atoms. Examples of the alkyl group include a methyl group, an ethyl group, a propyl group, and a butyl group. Of those, a methyl group and a t-butyl group (tertiary butyl group) are preferred.

Table 1 shows examples of the structure represented by the formula (A), Comparative Structure Example (A-15) in which the average of "a" in the formula (A) is 5, and Comparative Structure Example (A-16) in which the average of "a" is 150.

TABLE 1

| Structure represented by formula (A) | a | b | c | R31 |
|---|---|---|---|---|
| Structure Example (A-1) | 30 | 1 | 2 | t-Butyl group |
| Structure Example (A-2) | 10 | 1 | 2 | t-Butyl group |
| Structure Example (A-3) | 20 | 1 | 2 | t-Butyl group |
| Structure Example (A-4) | 40 | 1 | 2 | t-Butyl group |
| Structure Example (A-5) | 50 | 1 | 2 | t-Butyl group |
| Structure Example (A-6) | 100 | 1 | 2 | t-Butyl group |
| Structure Example (A-7) | 30 | 1 | 3 | t-Butyl group |
| Structure Example (A-8) | 30 | 1 | 4 | t-Butyl group |
| Structure Example (A-9) | 30 | 2 | 2 | t-Butyl group |
| Structure Example (A-10) | 30 | 3 | 2 | t-Butyl group |
| Structure Example (A-11) | 30 | 3 | 3 | t-Butyl group |
| Structure Example (A-12) | 10 | 1 | 2 | Methyl group |
| Structure Example (A-13) | 30 | 1 | 2 | Methyl group |
| Structure Example (A-14) | 100 | 1 | 2 | Methyl group |
| Comparative Structure Example (A-15) | 5 | 1 | 2 | t-Butyl group |
| Comparative Structure Example (A-16) | 150 | 1 | 2 | t-Butyl group |

The resin B having the structure represented by the above-mentioned formula (B) is described. The resin B having the structure represented by the above-mentioned formula (B) has a siloxane moiety and has a structure represented by the above-mentioned formula (A) at both terminals of the resin. The respective repeating structural units in a structure within the brackets in the formula (B) may be of the same or different structures.

"k" in the above-mentioned formula (B) represents the number of repetitions of a structure within the brackets. An average of "k" in the resin B is preferably 5 or more to 400 or less. "k" correlates with a weight-average molecular weight (hereinafter, referred to as "Mw"), and the Mw of the resin B is preferably 5,000 or more to 200,000 or less. "k" is adjusted by controlling the weight-average molecular weight of the resin B and the average of the number of repetitions "a" of the structure within the brackets in the formula (A).

In the present invention, the weight-average molecular weight of the resins refers to a weight-average molecular weight in terms of polystyrene measured according to a conventional procedure by a method described in Japanese Patent Application Laid-Open No. 2007-79555.

Hereinafter, specific examples of the structure within the brackets in the structure represented by the above-mentioned formula (B) are shown.

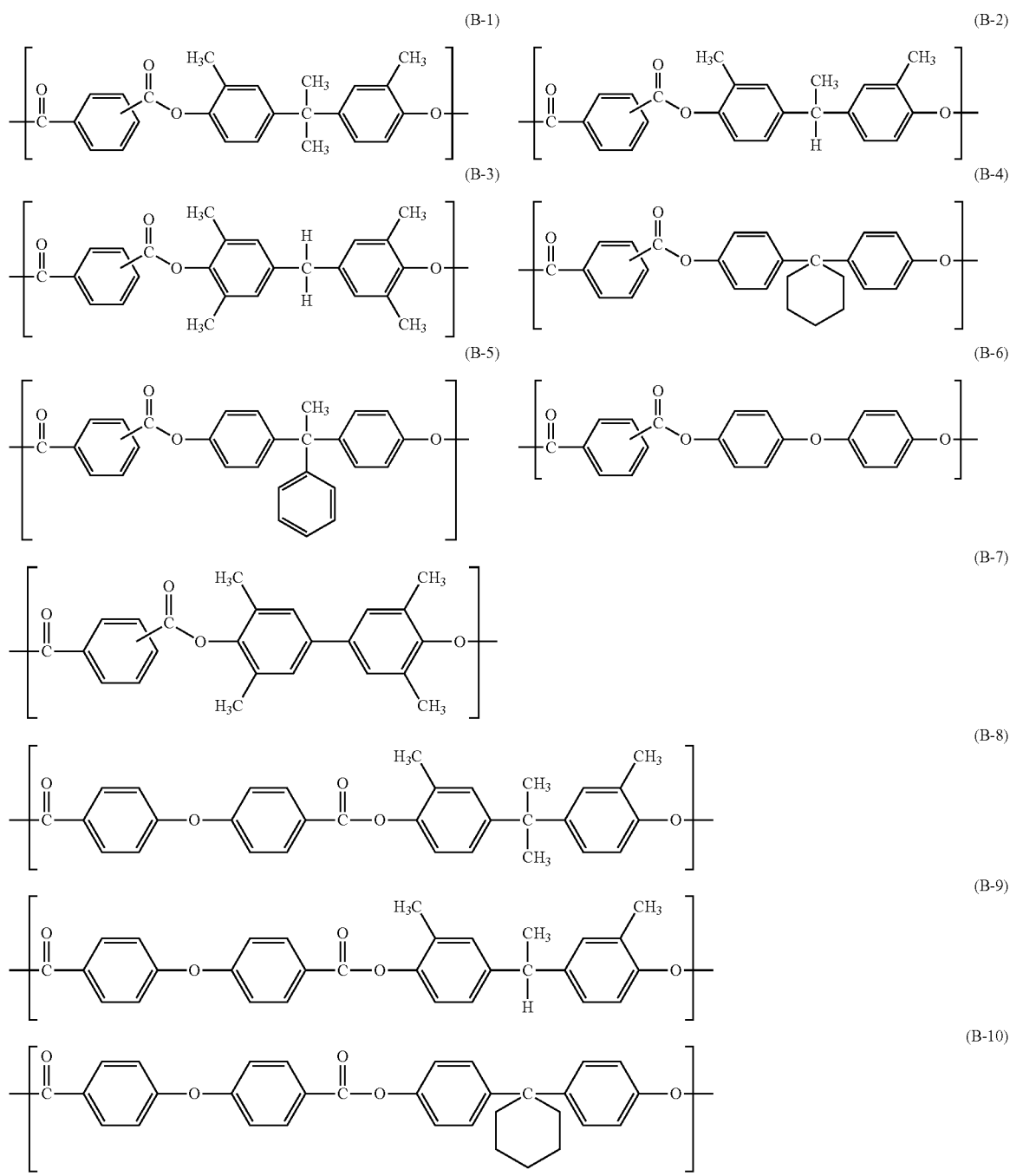

Of those, a repeating structural unit represented by the above-mentioned formula (B-1), (B-2), (B-3), (B-5), or (B-9) is preferred.

The resin B having the structure represented by the formula (B) contains the siloxane moiety in a content of 10% by mass or more to 50% by mass or less with respect to the total mass of the resin B. The content of the siloxane moiety with respect to the total mass of the resin B is preferably 10% by mass or more to 50% by mass or less from the viewpoint that both of the effect of relieving contact stress and the effect of suppressing film peeling can be exhibited. This is probably because the effect of suppressing contact stress can be sufficiently exhibited by incorporating the siloxane moiety into the resin B in a content as high as 10% by mass or more to 50% by mass or less. This is also probably because, although the resin containing the siloxane moiety in a high content tends to migrate to the interface of the surface layer and is liable to cause film peeling, the film peeling is suppressed by an interaction of the ether structure at the terminals of the resin B and the carbonyl group of the resin in the lower layer. Thus, both of the effect of relieving contact stress and the effect of suppressing film peeling can be exhibited with use of the resin B.

In the present invention, the siloxane moiety is a moiety including: silicon atoms at both terminals constructing the siloxane moiety and groups bonded to the atoms; and oxygen atoms and silicon atoms between the silicon atoms at the both terminals and groups bonded to the atoms. Specifically, in the case of a structure represented by the following formula (B-S), the siloxane moiety is the following moiety surrounded by the dashed line.

by the above-mentioned formula (A) having a siloxane moiety. The respective repeating structural units in a structure within brackets in the formula (C) may be the same or different structures.

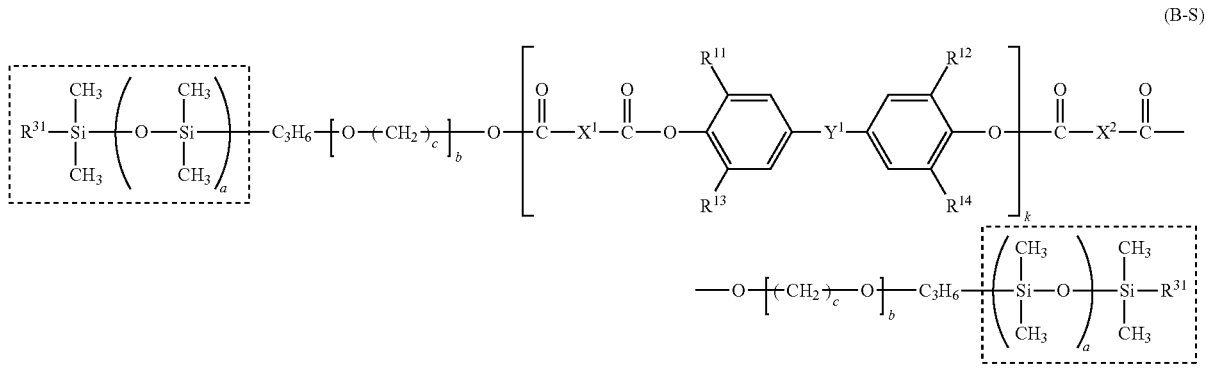

(B-S)

That is, the structural formula shown below represents the siloxane moiety.
Siloxane Moiety

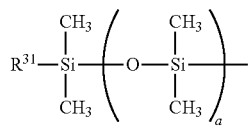

The resin C having the structure represented by the above-mentioned formula (C) is described. The resin C having the structure represented by the above-mentioned formula (C) has, at only one terminal of the resin, the structure represented "l" in the above-mentioned formula (C) represents the number of repetitions of a structure within brackets. An average of "l" in the resin C is preferably from 5 or more to 400 or less. "l" correlates with a weight-average molecular weight (hereinafter, referred to as "Mw"), and the Mw of the resin C is preferably from 5,000 or more to 200,000 or less. "l" is adjusted by the weight-average molecular weight of the resin C and the average of the number of repetitions "a" of the structure within the brackets in the formula (A).

Hereinafter, specific examples of the structure within the brackets in the structure represented by the formula (C) are shown.

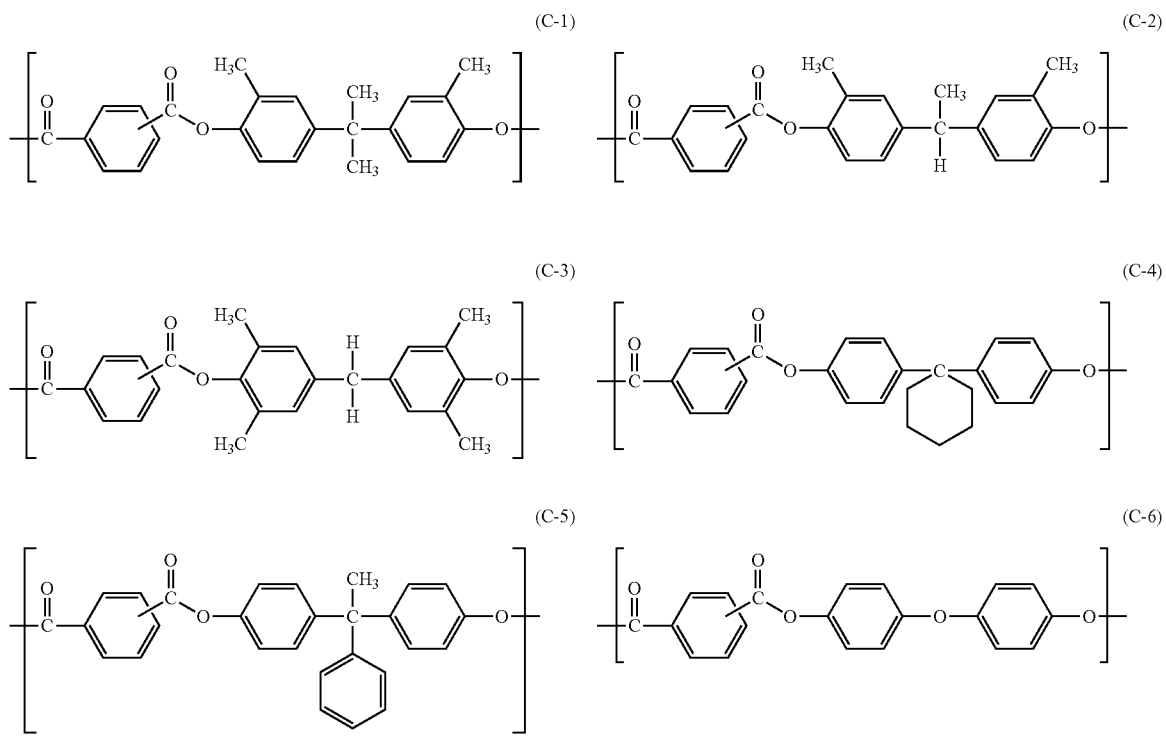

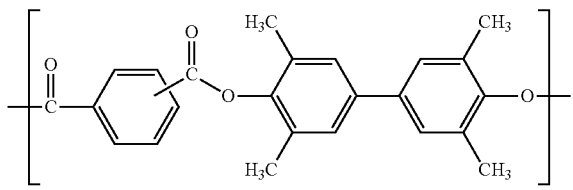
(C-7)

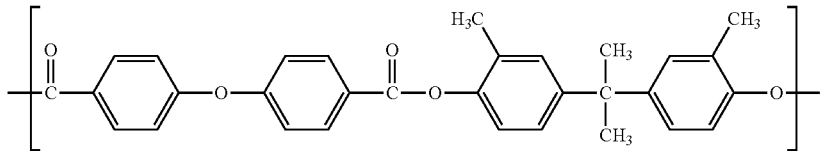
(C-8)

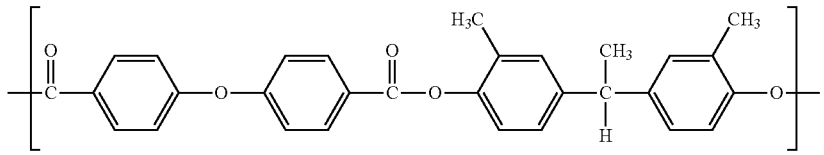
(C-9)

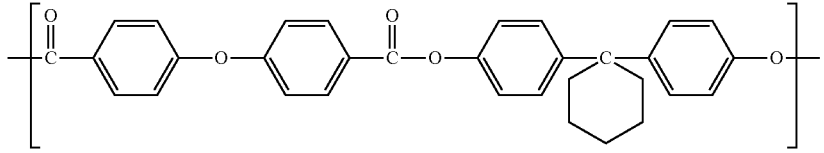
(C-10)

Of those, a structure represented by the above-mentioned formula (C-1), (C-2), (C-3), (C-5), or (C-9) is preferred.

The resin C having the structure represented by the formula (C) contains the siloxane moiety in a content of 5% by mass or more to 25% by mass or less with respect to the total mass of the resin C. The content of the siloxane moiety with respect to the total mass of the resin C is preferably 5% by mass or more to 25% by mass or less from the viewpoint that both of the effect of relieving contact stress and the effect of suppressing film peeling can be exhibited. This is probably because the effect of suppressing contact stress can be sufficiently exhibited by incorporating the siloxane moiety into the resin C in a content as high as 5% by mass or more to 25% by mass or less. This is also probably because, although the resin containing the siloxane moiety in a high content tends to migrate to the interface of the surface layer and is liable to cause film peeling, the film peeling is suppressed by an interaction of the ether structure at the terminal of the resin C and the carbonyl group of the resin in the lower layer. Thus, both of the effect of relieving contact stress and the effect of suppressing film peeling can be exhibited with use of the resin C.

In the present invention, the siloxane moiety is as mentioned above. Specifically, for example, in the case of a structure represented by the following formula (C-S), the siloxane moiety in the resin C having the structure represented by the formula (C) is the following moiety surrounded by the dashed line.

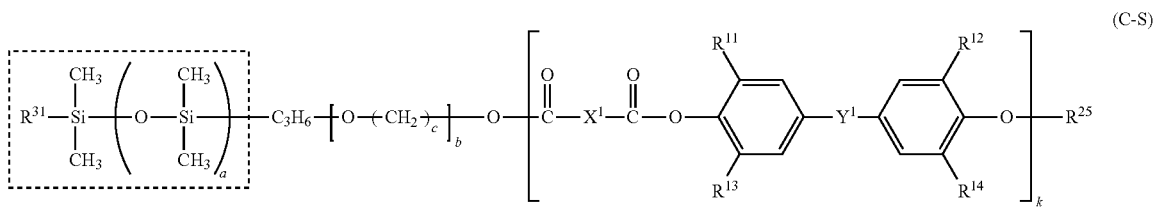
(C-S)

That is, the structural formula shown below represents the siloxane moiety.

Siloxane Moiety

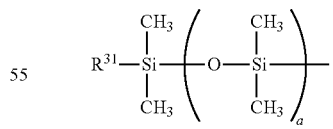

The content of the siloxane moiety with respect to the total mass of the resin B and resin C of the present invention can be analyzed by a general analysis technique. An example of the analysis technique is shown below.

First, the surface layer of the electrophotographic photosensitive member is dissolved with a solvent. After that, a variety of materials included in the surface layer are fractionated using a fractionation apparatus capable of separating and collecting components, such as size exclusion chromatography or high-performance liquid chromatography. Constituent materials and contents of the materials in the resin B and the resin C fractionated can be determined by peak positions of hydrogen atoms (hydrogen atoms which constitute the resins) determined by $^1$H-NMR measurement and a conversion method based on peak area ratios. The number of repetitions of the siloxane moiety and molar ratio are calculated from the results and converted into a content (mass ratio). Moreover, the fractionated resin B and resin C are hydrolyzed, for example, in the presence of an alkali to extract an alcohol moiety having a polysiloxane group or a phenol moiety having a polysiloxane group. Nuclear magnetic resonance spectrum analysis or mass spectrometry is performed for the resultant phenol moiety having a polysiloxane group to calculate the number of repetitions of the siloxane moiety and the molar ratio, which are converted into a content (mass ratio).

In the present invention, the siloxane moiety contents in the resin B and the resin C were measured by the above-mentioned technique.

Further, the siloxane moiety contents in the resin B and the resin C each have a relationship with the amount of a raw material of a monomer unit containing the siloxane moiety in polymerization. Thus, the amount of the raw material used was adjusted to achieve a desired siloxane moiety content.

The terminal siloxane-containing polyester resin used in the present invention can be manufactured by selecting an appropriate method from known methods including a transesterification method, an interfacial polymerization method, and a direct polymerization method.

Synthesis examples of the resin B and the resin C used in the present invention are shown below.

Synthesis of resin B(1) having structures represented by formulae (A-1) and (B-3)

4.6 g of isophthalic acid chloride and 4.6 g of terephthalic acid chloride were dissolved in dichloromethane to prepare an acid halide solution. In addition to the acid halide solution, 0.7 g of a siloxane derivative represented by the following formula (1) and 11.44 g of a diol represented by the following formula (2) were dissolved in a 10% aqueous solution of sodium hydroxide. Tributylbenzylammonium chloride was further added thereto as a polymerization catalyst, and the mixture was stirred to prepare a diol compound solution.

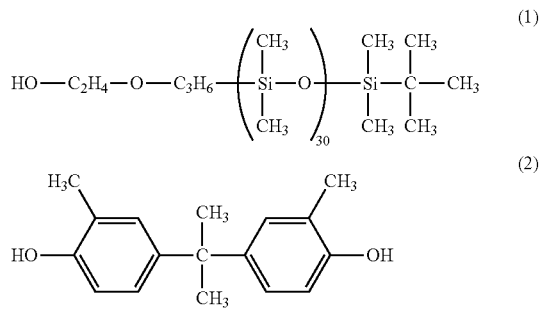

Next, the above-mentioned acid halide solution was added to the above-mentioned diol compound solution with stirring to initiate polymerization. A polymerization reaction was performed with stirring for 3 hours while keeping the reaction temperature at 25° C. or less. After that, the polymerization reaction was quenched by adding acetic acid, and washing with water was repeated until the aqueous phase became neutral. Subsequently, the resin was fractionated and separated by size exclusion chromatography, and $^1$H-NMR measurement was performed for the fractionated components. A resin composition was determined based on a relative ratio of the siloxane moiety in the resin, to thereby obtain a resin B(1) of interest. The siloxane moiety content in the resin B(1) was calculated as above and found to be 30% by mass. Meanwhile, the weight-average molecular weight of the resin B(1) was found to be 20,000.

The resin B having the structure represented by the formula (B) shown in Table 2 and the resin C having the structure represented by the formula (C) shown in Table 3 were synthesized using raw materials appropriate for the structures represented by the formulae (A), (B), and (C) by the synthesis method shown in the above-mentioned synthesis example. Tables 2 and 3 show the weight-average molecular weights of the synthesized terminal siloxane-containing polyester resins (resin B and resin C) and the siloxane moiety contents of the terminal siloxane-containing polyester resins.

TABLE 2

| | Resin B | Example of structure represented by formula (A) | Structure in brackets represented by formula (B) | Siloxane moiety content in resin B (wt %) | Weight-average molecular weight Mw |
|---|---|---|---|---|---|
| Synthesis Example 1 | Resin B(1) | A-1 | B-3 | 30 | 20,000 |
| Synthesis Example 2 | Resin B(2) | A-2 | B-3 | 30 | 10,000 |
| Synthesis Example 3 | Resin B(3) | A-3 | B-3 | 30 | 10,000 |
| Synthesis Example 4 | Resin B(4) | A-4 | B-3 | 30 | 20,000 |
| Synthesis Example 5 | Resin B(5) | A-5 | B-3 | 30 | 30,000 |
| Synthesis Example 6 | Resin B(6) | A-6 | B-3 | 30 | 50,000 |
| Synthesis Example 7 | Resin B(7) | A-7 | B-3 | 30 | 20,000 |
| Synthesis Example 8 | Resin B(8) | A-8 | B-3 | 30 | 20,000 |
| Synthesis Example 9 | Resin B(9) | A-9 | B-3 | 30 | 20,000 |
| Synthesis Example 10 | Resin B(10) | A-10 | B-3 | 30 | 20,000 |

TABLE 2-continued

| | Resin B | Example of structure represented by formula (A) | Structure in brackets represented by formula (B) | Siloxane moiety content in resin B (wt %) | Weight-average molecular weight Mw |
|---|---|---|---|---|---|
| Synthesis Example 11 | Resin B(11) | A-11 | B-3 | 30 | 20,000 |
| Synthesis Example 12 | Resin B(12) | A-12 | B-3 | 30 | 10,000 |
| Synthesis Example 13 | Resin B(13) | A-13 | B-3 | 30 | 20,000 |
| Synthesis Example 14 | Resin B(14) | A-14 | B-3 | 30 | 50,000 |
| Synthesis Example 15 | Resin B(15) | A-3 | B-3 | 10 | 30,000 |
| Synthesis Example 16 | Resin B(16) | A-1 | B-3 | 10 | 50,000 |
| Synthesis Example 17 | Resin B(17) | A-1 | B-3 | 50 | 10,000 |
| Synthesis Example 18 | Resin B(18) | A-4 | B-3 | 10 | 60,000 |
| Synthesis Example 19 | Resin B(19) | A-5 | B-3 | 20 | 40,000 |
| Synthesis Example 20 | Resin B(20) | A-6 | B-3 | 10 | 150,000 |
| Synthesis Example 21 | Resin B(21) | A-6 | B-3 | 50 | 30,000 |
| Synthesis Example 22 | Resin B(22) | A-1 | B-1 | 30 | 20,000 |
| Synthesis Example 23 | Resin B(23) | A-1 | B-2 | 30 | 20,000 |
| Synthesis Example 24 | Resin B(24) | A-1 | B-4 | 30 | 20,000 |
| Synthesis Example 25 | Resin B(25) | A-1 | B-5 | 30 | 20,000 |
| Synthesis Example 26 | Resin B(26) | A-1 | B-6 | 30 | 20,000 |
| Synthesis Example 27 | Resin B(27) | A-1 | B-7 | 30 | 20,000 |
| Synthesis Example 28 | Resin B(28) | A-1 | B-8 | 30 | 20,000 |
| Synthesis Example 29 | Resin B(29) | A-1 | B-9 | 30 | 20,000 |
| Synthesis Example 30 | Resin B(30) | A-1 | B-10 | 30 | 20,000 |
| Synthesis Example 31 | Resin B(31) | A-2 | B-1 | 30 | 10,000 |
| Synthesis Example 32 | Resin B(32) | A-6 | B-1 | 30 | 50,000 |
| Synthesis Example 33 | Resin B(33) | A-2 | B-2 | 30 | 10,000 |
| Synthesis Example 34 | Resin B(34) | A-6 | B-2 | 30 | 50,000 |
| Synthesis Example 35 | Resin B(35) | A-12 | B-2 | 30 | 10,000 |
| Synthesis Example 36 | Resin B(36) | A-14 | B-2 | 30 | 50,000 |
| Synthesis Example 37 | Resin B(37) | A-13 | B-2 | 20 | 20,000 |
| Synthesis Example 38 | Resin B(38) | A-13 | B-2 | 50 | 10,000 |
| Synthesis Example 39 | Resin B(39) | A-2 | B-5 | 30 | 10,000 |
| Synthesis Example 40 | Resin B(40) | A-6 | B-5 | 30 | 50,000 |
| Synthesis Example 41 | Resin B(41) | A-2 | B-9 | 30 | 10,000 |
| Synthesis Example 42 | Resin B(42) | A-6 | B-9 | 30 | 50,000 |
| Synthesis Example 43 | Resin B(43) | A-3 | B-1 | 30 | 10,000 |
| Synthesis Example 44 | Resin B(44) | A-4 | B-1 | 30 | 20,000 |
| Synthesis Example 45 | Resin B(45) | A-3 | B-2 | 30 | 10,000 |
| Synthesis Example 46 | Resin B(46) | A-4 | B-2 | 30 | 20,000 |
| Synthesis Example 47 | Resin B(47) | A-3 | B-5 | 30 | 10,000 |

TABLE 2-continued

| | Resin B | Example of structure represented by formula (A) | Structure in brackets represented by formula (B) | Siloxane moiety content in resin B (wt %) | Weight-average molecular weight Mw |
|---|---|---|---|---|---|
| Synthesis Example 48 | Resin B(48) | A-4 | B-5 | 30 | 20,000 |
| Synthesis Example 49 | Resin B(49) | A-3 | B-9 | 30 | 10,000 |
| Synthesis Example 50 | Resin B(50) | A-4 | B-9 | 30 | 20,000 |
| Comparative Production Example 1 | Resin B(51) | A-15 | B-3 | 30 | 5,000 |
| Comparative Production Example 2 | Resin B(52) | A-16 | B-3 | 30 | 70,000 |

TABLE 3

| | Resin C | Example of structure represented by formula (A) | Structure in brackets represented by formula (C) | R25 in the formula (C) | Siloxane moiety content in resin C (wt %) | Weight-average molecular weight Mw |
|---|---|---|---|---|---|---|
| Synthesis Example 51 | Resin C (1) | A-1 | C-3 | R25-2 | 15 | 20,000 |
| Synthesis Example 52 | Resin C (2) | A-2 | C-3 | R25-2 | 15 | 10,000 |
| Synthesis Example 53 | Resin C (3) | A-3 | C-3 | R25-2 | 15 | 10,000 |
| Synthesis Example 54 | Resin C (4) | A-4 | C-3 | R25-2 | 15 | 20,000 |
| Synthesis Example 55 | Resin C (5) | A-5 | C-3 | R25-2 | 15 | 30,000 |
| Synthesis Example 56 | Resin C (6) | A-6 | C-3 | R25-2 | 15 | 40,000 |
| Synthesis Example 57 | Resin C (7) | A-7 | C-3 | R25-2 | 15 | 20,000 |
| Synthesis Example 58 | Resin C (8) | A-8 | C-3 | R25-2 | 15 | 20,000 |
| Synthesis Example 59 | Resin C (9) | A-9 | C-3 | R25-2 | 15 | 20,000 |
| Synthesis Example 60 | Resin C (10) | A-10 | C-3 | R25-2 | 15 | 20,000 |
| Synthesis Example 61 | Resin C (11) | A-11 | C-3 | R25-2 | 15 | 20,000 |
| Synthesis Example 62 | Resin C (12) | A-12 | C-3 | R25-2 | 15 | 10,000 |
| Synthesis Example 63 | Resin C (13) | A-13 | C-3 | R25-2 | 15 | 20,000 |
| Synthesis Example 64 | Resin C (14) | A-14 | C-3 | R25-2 | 15 | 40,000 |
| Synthesis Example 65 | Resin C (15) | A-3 | C-3 | R25-2 | 5 | 30,000 |
| Synthesis Example 66 | Resin C (16) | A-1 | C-3 | R25-2 | 5 | 50,000 |
| Synthesis Example 67 | Resin C (17) | A-1 | C-3 | R25-2 | 25 | 10,000 |
| Synthesis Example 68 | Resin C (18) | A-4 | C-3 | R25-2 | 5 | 60,000 |
| Synthesis Example 69 | Resin C (19) | A-5 | C-3 | R25-2 | 10 | 40,000 |
| Synthesis Example 70 | Resin C (20) | A-6 | C-3 | R25-2 | 5 | 140,000 |
| Synthesis Example 71 | Resin C (21) | A-6 | C-3 | R25-2 | 25 | 20,000 |
| Synthesis Example 72 | Resin C (22) | A-1 | C-1 | R25-2 | 15 | 20,000 |
| Synthesis Example 73 | Resin C (23) | A-1 | C-2 | R25-2 | 15 | 20,000 |
| Synthesis Example 74 | Resin C (24) | A-1 | C-4 | R25-2 | 15 | 20,000 |
| Synthesis Example 75 | Resin C (25) | A-1 | C-5 | R25-2 | 15 | 20,000 |

TABLE 3-continued

| | Resin C | Example of structure represented by formula (A) | Structure in brackets represented by formula (C) | R25 in the formula (C) | Siloxane moiety content in resin C (wt %) | Weight-average molecular weight Mw |
|---|---|---|---|---|---|---|
| Synthesis Example 76 | Resin C (26) | A-1 | C-6 | R25-2 | 15 | 20,000 |
| Synthesis Example 77 | Resin C(27) | A-1 | C-7 | R25-2 | 15 | 20,000 |
| Synthesis Example 78 | Resin C (28) | A-1 | C-8 | R25-2 | 15 | 20,000 |
| Synthesis Example 79 | Resin C (29) | A-1 | C-9 | R25-2 | 15 | 20,000 |
| Synthesis Example 80 | Resin C (30) | A-1 | C-10 | R25-2 | 15 | 20,000 |
| Synthesis Example 81 | Resin C (31) | A-2 | C-1 | R25-2 | 15 | 10,000 |
| Synthesis Example 82 | Resin C (32) | A-6 | C-1 | R25-2 | 15 | 40,000 |
| Synthesis Example 83 | Resin C (33) | A-2 | C-2 | R25-2 | 15 | 10,000 |
| Synthesis Example 84 | Resin C (34) | A-6 | C-2 | R25-2 | 15 | 40,000 |
| Synthesis Example 85 | Resin C (35) | A-12 | C-2 | R25-2 | 15 | 10,000 |
| Synthesis Example 86 | Resin C (36) | A-14 | C-2 | R25-2 | 15 | 40,000 |
| Synthesis Example 87 | Resin C (37) | A-13 | C-2 | R25-2 | 10 | 20,000 |
| Synthesis Example 88 | Resin C (38) | A-13 | C-2 | R25-2 | 25 | 10,000 |
| Synthesis Example 89 | Resin C (39) | A-2 | C-5 | R25-2 | 15 | 10,000 |
| Synthesis Example 90 | Resin C (40) | A-6 | C-5 | R25-2 | 15 | 40,000 |
| Synthesis Example 91 | Resin C (41) | A-2 | C-9 | R25-2 | 15 | 10,000 |
| Synthesis Example 92 | Resin C (42) | A-6 | C-9 | R25-2 | 15 | 40,000 |
| Synthesis Example 93 | Resin C (43) | A-3 | C-1 | R25-2 | 15 | 10,000 |
| Synthesis Example 94 | Resin C (44) | A-4 | C-1 | R25-2 | 15 | 20,000 |
| Synthesis Example 95 | Resin C (45) | A-3 | C-2 | R25-2 | 15 | 10,000 |
| Synthesis Example 96 | Resin C (46) | A-4 | C-2 | R25-2 | 15 | 20,000 |
| Synthesis Example 97 | Resin C (47) | A-3 | C-5 | R25-2 | 15 | 10,000 |
| Synthesis Example 98 | Resin C (48) | A-4 | C-5 | R25-2 | 15 | 20,000 |
| Synthesis Example 99 | Resin C (49) | A-3 | C-9 | R25-2 | 15 | 10,000 |
| Synthesis Example 100 | Resin C (50) | A-4 | C-9 | R25-2 | 15 | 20,000 |
| Synthesis Example 101 | Resin C (51) | A-1 | C-3 | R25-1 | 15 | 20,000 |
| Synthesis Example 102 | Resin C (52) | A-1 | C-3 | R25-3 | 15 | 20,000 |
| Synthesis Example 103 | Resin C (53) | A-2 | C-3 | R25-1 | 15 | 10,000 |
| Synthesis Example 104 | Resin C (54) | A-2 | C-3 | R25-3 | 15 | 10,000 |
| Synthesis Example 105 | Resin C (55) | A-6 | C-3 | R25-1 | 15 | 40,000 |
| Synthesis Example 106 | Resin C (56) | A-6 | C-3 | R25-3 | 15 | 40,000 |
| Synthesis Example 107 | Resin C (57) | A-13 | C-3 | R25-1 | 15 | 20,000 |

TABLE 3-continued

| | Resin C | Example of structure represented by formula (A) | Structure in brackets represented by formula (C) | R25 in the formula (C) | Siloxane moiety content in resin C (wt %) | Weight-average molecular weight Mw |
|---|---|---|---|---|---|---|
| Synthesis Example 108 | Resin C (58) | A-13 | C-3 | R25-3 | 15 | 20,000 |
| Synthesis Example 109 | Resin C (59) | A-1 | C-1 | R25-1 | 15 | 20,000 |
| Synthesis Example 110 | Resin C (60) | A-1 | C-1 | R25-3 | 15 | 20,000 |
| Synthesis Example 111 | Resin C (61) | A-1 | C-2 | R25-1 | 15 | 20,000 |
| Synthesis Example 112 | Resin C (62) | A-1 | C-2 | R25-3 | 15 | 20,000 |
| Synthesis Example 113 | Resin C (63) | A-1 | C-5 | R25-1 | 15 | 20,000 |
| Synthesis Example 114 | Resin C (64) | A-1 | C-5 | R25-3 | 15 | 20,000 |
| Synthesis Example 115 | Resin C (65) | A-1 | C-9 | R25-1 | 15 | 20,000 |
| Synthesis Example 116 | Resin C (66) | A-1 | C-9 | R25-3 | 15 | 20,000 |
| Synthesis Example 117 | Resin C (67) | A-3 | C-3 | R25-1 | 5 | 30,000 |
| Synthesis Example 118 | Resin C (68) | A-3 | C-3 | R25-3 | 5 | 30,000 |
| Synthesis Example 119 | Resin C (69) | A-6 | C-3 | R25-1 | 25 | 20,000 |
| Synthesis Example 120 | Resin C (70) | A-6 | C-3 | R25-3 | 25 | 20,000 |
| Comparative Production Example 3 | Resin C (71) | A-15 | C-3 | R25-2 | 15 | 5,000 |
| Comparative Production Example 4 | Resin C (72) | A-16 | C-3 | R25-2 | 15 | 60,000 |

It should be noted that, in Structure Example (A-1), the maximum value and the minimum value of "a" were 32 and 28, respectively. A difference between the maximum value and the minimum value of "b" was 0, and a difference between the maximum value and the minimum value of "c" was 0. In Structure Example (A-2), the maximum value and the minimum value of "a" were 11 and 9, respectively. A difference between the maximum value and the minimum value of "b" was 0, and a difference between the maximum value and the minimum value of "c" was 0. In Structure Example (A-6), the maximum value and the minimum value of "a" were 105 and 95, respectively. A difference between the maximum value and the minimum value of "b" was 0, and a difference between the maximum value and the minimum value of "c" was 0.

Polycarbonate Resin D Having Repeating Structural Unit Represented by Formula (D)>

Next, a polycarbonate resin D having a repeating structural unit represented by the following formula (D) is described. The structure within the brackets in the following formula (D) may be the same or different in the resin.

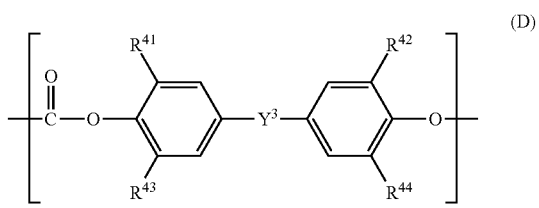

In the formula (D): $R^{41}$ to $R^{44}$ each independently represent a hydrogen atom or a methyl group; and $Y^3$ represents a single bond, a methylene group, an ethylidene group, a propylidene group, a phenylethylidene group, a cyclohexylidene group, or an oxygen atom. Further, the polycarbonate resin D has a hydroxyl group or a t-butylphenyl group at the terminals.

Hereinafter, specific examples of the structure within the brackets represented by the formula (D) are shown.

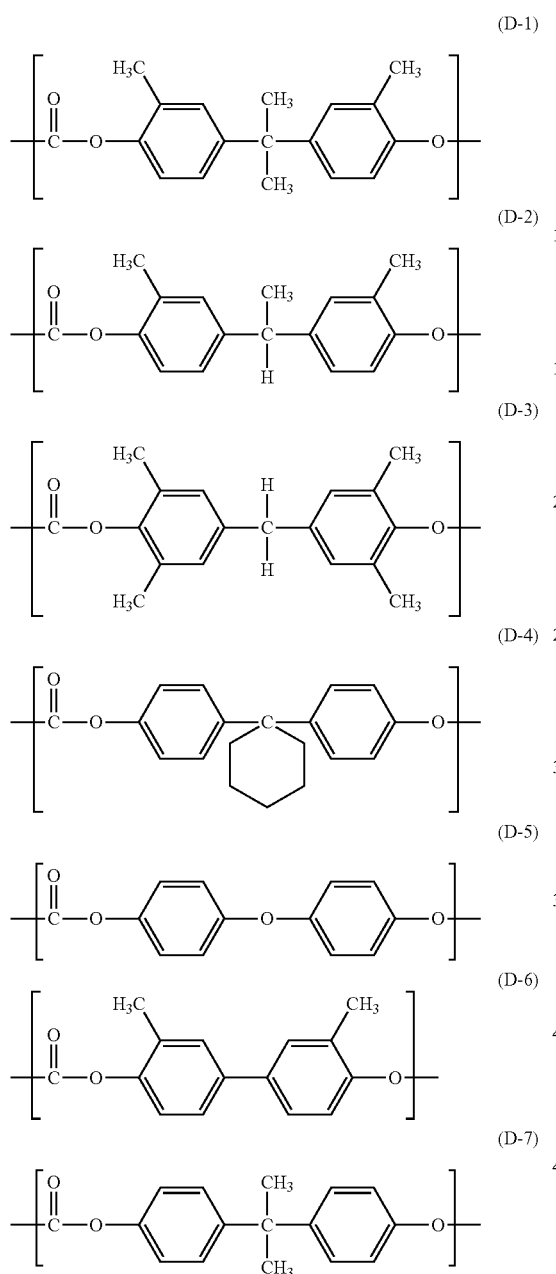

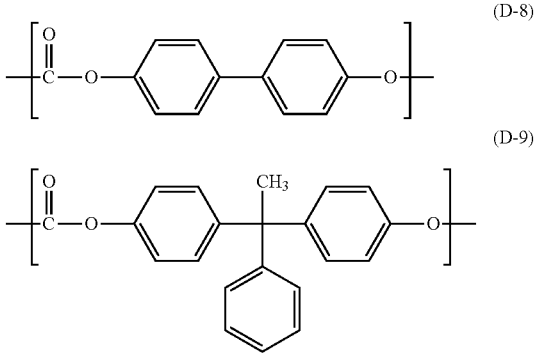

Of those, a repeating structural unit represented by the above-mentioned formula (D-1), (D-4), (D-7), (D-8), or (D-9) is preferred.

<Polyester Resin E Having Repeating Structural Unit Represented by Formula (E)>

Next, a polyester resin E having a repeating structural unit represented by the formula (E) is described. The structure within the brackets in the following formula (E) may be the same or different in the resin.

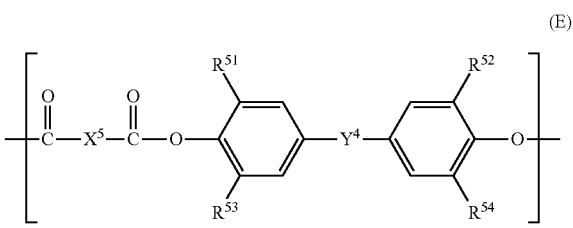

In the formula (E): $R^{51}$ to $R^{54}$ each independently represent a hydrogen atom or a methyl group; $X^5$ represents an m-phenylene group, a p-phenylene group, or a bivalent group having two p-phenylene groups bonded via an oxygen atom; and $Y^4$ represents a single bond, a methylene group, an ethylidene group, a propylidene group, a phenylethylidene group, a cyclohexylidene group, or an oxygen atom. Further, the polyester resin E has a hydroxyl group or a t-butylphenyl group at the terminals.

Hereinafter, specific examples of the structure within the brackets represented by the formula (E) are shown.

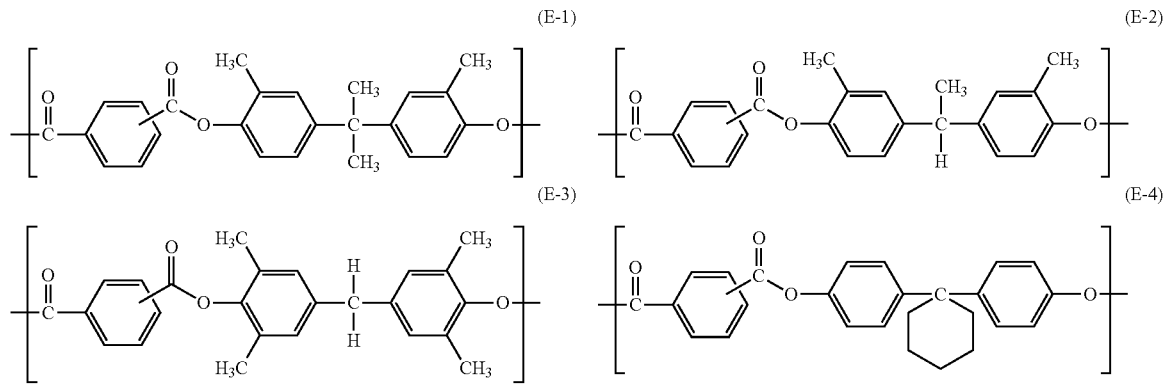

-continued

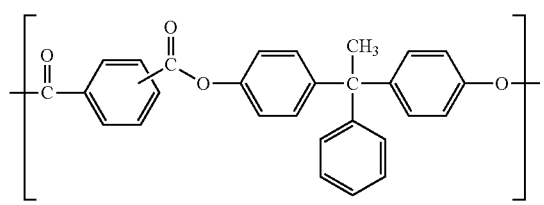
(E-5)

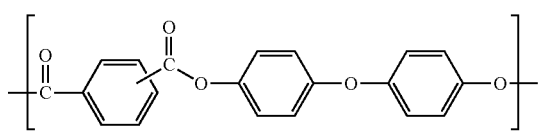
(E-6)

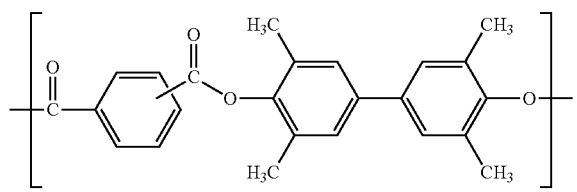
(E-7)

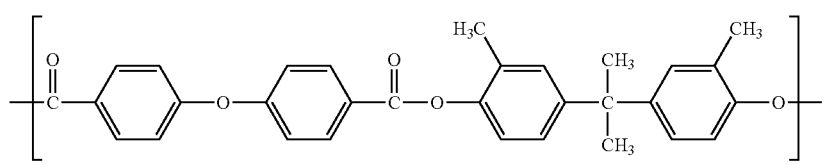
(E-8)

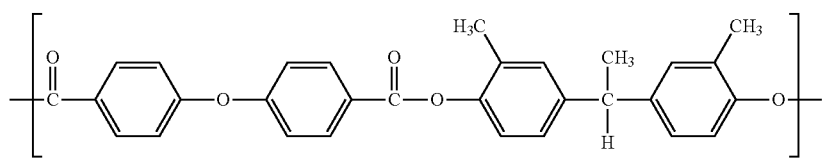
(E-9)

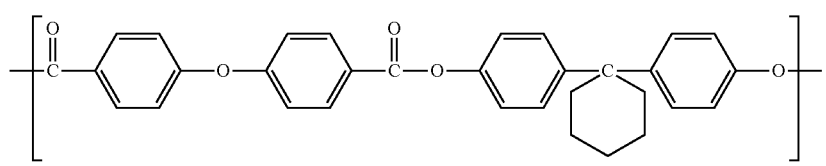
(E-10)

Of those, a repeating structural unit represented by the above-mentioned formula (E-1), (E-2), (E-3), (E-5), or (E-9) is preferred.

<Polyvinyl Acetal Resin F>

Next, a polyvinyl acetal resin F having a repeating structural unit represented by the following formula (F-A), a repeating structural unit represented by the following formula (F-B), and a repeating structural unit represented by the following formula (F-C) is described.

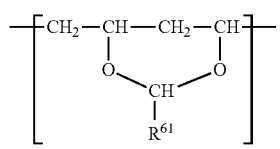
(F-A)

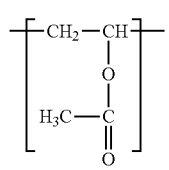
(F-B)

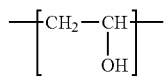
(F-C)

In the formula (F-A), $R^{61}$ represents an alkyl group having 1 to 4 carbon atoms, and may be the same or different in the resin. Examples of the alkyl group include a methyl group, an ethyl group, a propyl group, and a butyl group. Further, the polyvinyl acetal resin F has a hydroxyl group or a t-butylphenyl group at the terminals.

Table 4 shows examples of structures of the above-mentioned polyvinyl acetal resin.

TABLE 4

| Example of structure of acetal resin | R61 | Molar ratio (mol %) | | | Polymerization degree |
|---|---|---|---|---|---|
| | | (F-A) | (F-B) | (F-C) | |
| Resin (F-1) | Methyl group/Propyl group = 1/1 | 60 | 3 | 37 | Approximately 2,000 |
| Resin (F-2) | Methyl group/Propyl group = 1/1 | 75 | 3 | 22 | Approximately 2,000 |
| Resin (F-3) | Methyl group/Propyl group = 1/1 | 50 | 3 | 47 | Approximately 2,000 |
| Resin (F-4) | Methyl group/Propyl group = 1/1 | 60 | 1 | 39 | Approximately 2,000 |
| Resin (F-5) | Methyl group/Propyl group = 1/1 | 50 | 10 | 40 | Approximately 2,000 |
| Resin (F-6) | Propyl group | 60 | 3 | 37 | Approximately 2,000 |
| Resin (F-7) | Methyl group | 60 | 3 | 37 | Approximately 2,000 |
| Resin (F-8) | Methyl group/Propyl group = 1/1 | 60 | 3 | 37 | Approximately 800 |
| Resin (F-9) | Methyl group/Propyl group = 1/1 | 60 | 3 | 37 | Approximately 3,000 |

In the electrophotographic photosensitive member of the present invention, the lower layer in contact with the surface layer contains the polycarbonate resin D having the repeating structural unit represented by the above-mentioned formula (D), the polyester resin E having the repeating structural unit represented by the above-mentioned formula (E), or the polyvinyl acetal resin F having the repeating structural unit represented by the above-mentioned formula (F-A), the repeating structural unit represented by the above-mentioned formula (F-B), and the repeating structural unit represented by the above-mentioned formula (F-C). An additional resin may further be mixed before use. Examples of the additional resin which may be mixed before use include a polycarbonate resin, a polyester resin, and a polyvinyl acetal resin.

Examples of the charge-transporting substance included in the charge-transporting layer of the electrophotographic photosensitive member of the present invention include a triarylamine compound, a hydrazone compound, a styryl compound, a stilbene compound, a pyrazoline compound, an oxazole compound, a thiazole compound, and a triarylmethane compound. One kind of those charge-transporting substances may be used alone, or two or more kinds thereof may be used. Of those, a triarylamine compound is preferably used as the charge-transporting substance in terms of improving electrophotographic properties. In addition, of the triarylamine compounds, a compound represented by the following formula (G) is preferred.

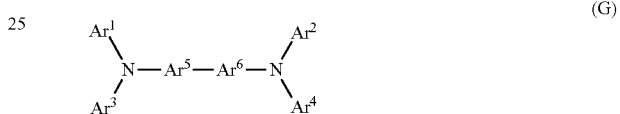

(G)

In the formula (G): $Ar^1$ to $Ar^4$ each independently represent a phenyl group, a tolyl group, a xylyl group, a naphthylene group, or a phenylene group having an unsaturated bond; and $Ar^5$ and $Ar^6$ each represent a phenylene group.

Examples of the compound represented by the above-mentioned formula (G) are shown below.

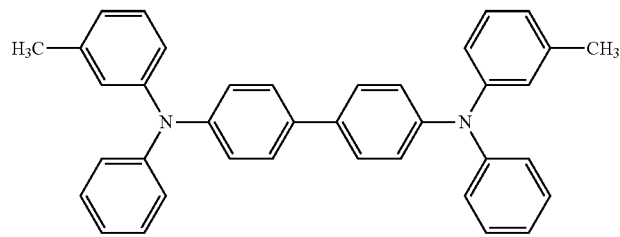

(G-1)

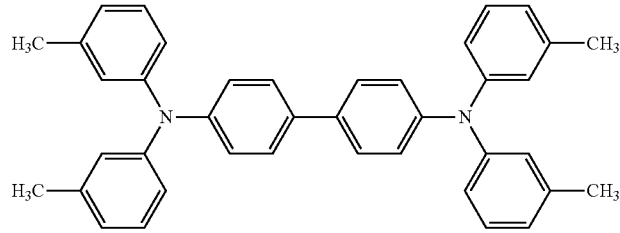

(G-2)

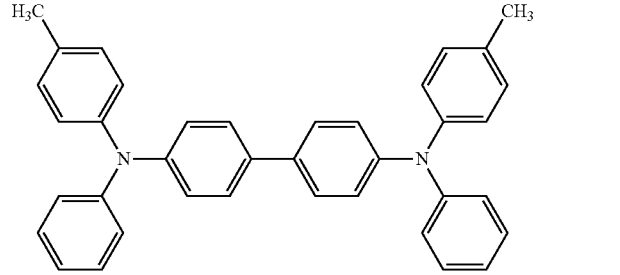

(G-3)

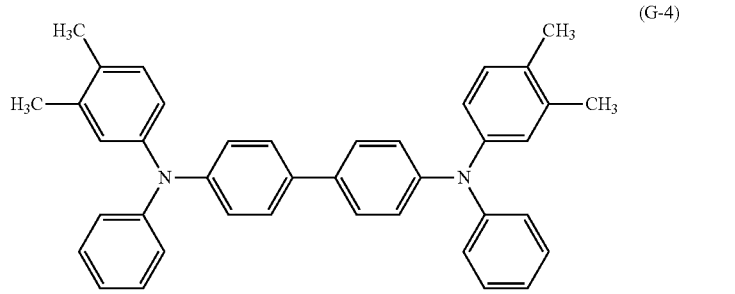

(G-4)

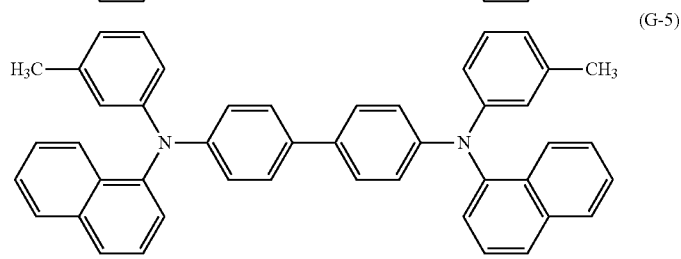

(G-5)

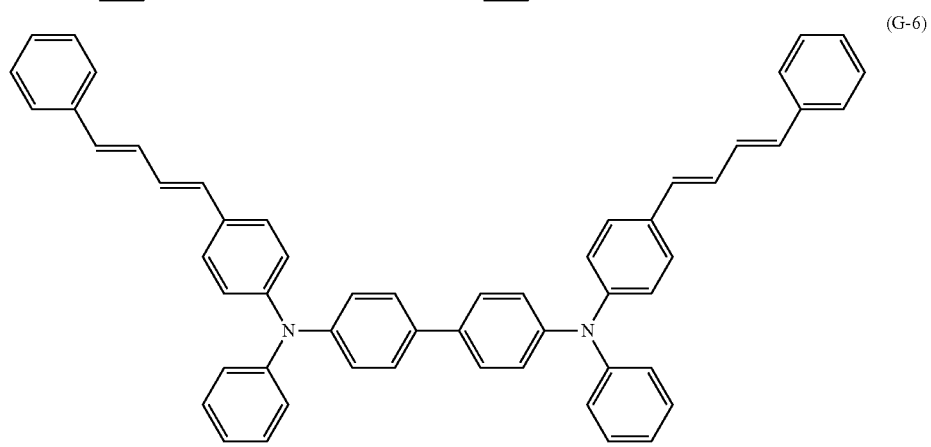

(G-6)

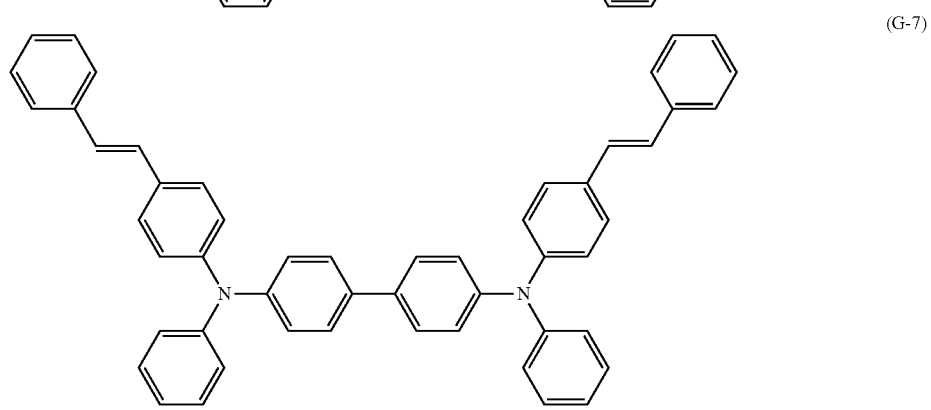

(G-7)

Of those, (G-1) or (G-7) is preferred.

Next, the construction of the electrophotographic photosensitive member of the present invention is described.

The electrophotographic photosensitive member of the present invention contains at least one resin selected from the group consisting of the resin B and resin C of the present invention in the surface layer of the electrophotographic photosensitive member. The surface layer may contain the charge-transporting substance. The surface layer of the electrophotographic photosensitive member of the present invention contains the resin B and resin C of the present invention, but an additional resin may further be mixed before use. Examples of the additional resin which may be mixed before use include an acrylic resin, a polyester resin, and a polycarbonate resin.

In the case where the lower layer in contact with the surface layer is a charge-transporting layer, the charge-transporting layer preferably contains the polycarbonate resin D having the repeating structural unit represented by the above-mentioned formula (D) or the polyester resin E having the repeating structural unit represented by the above-mentioned formula (E) of the present invention. In the case where the lower layer in contact with the surface layer is a charge-generating layer, the charge-generating layer preferably contains the polyvinyl acetal resin F having the repeating structural unit represented by the above-mentioned formula (F-A), the repeating structural unit represented by the above-mentioned formula (F-B), and the repeating structural unit represented by the above-mentioned formula (F-C) of the present invention.

In general, as the electrophotographic photosensitive member, a cylindrical electrophotographic photosensitive member produced by forming a photosensitive layer on a cylindrical support is widely used, but the member may also be formed into a belt or sheet shape.

Support

The support to be used in the electrophotographic photosensitive member of the present invention is preferably conductive (conductive support) and is, for example, one made of aluminum or an aluminum alloy. In the case of a support made of aluminum or an aluminum alloy, the support used may be an ED tube or an EI tube or one obtained by subjecting the tube to cutting, electrolytic compound polishing, or a wet- or dry-honing process. Further examples thereof include a metal support and a resin support each having formed thereon a thin film of a conductive material such as aluminum, an aluminum alloy, or an indium oxide-tin oxide alloy. The surface of the support may be subjected to, for example, cutting treatment, roughening treatment, or alumite treatment.

Further, in order to suppress an interference fringe, it is preferred to adequately make the surface of the support rough. Specifically, a support obtained by processing the surface of the above-mentioned support by honing, blast, cutting, or electrical field polishing, or a support having a conductive layer which includes conductive particles and a resin on a support made of aluminum or an aluminum alloy is preferably used. In order to suppress generation of an interference fringe in an output image due to interference of light reflected on the surface of the conductive layer, a surface roughness-imparting agent for making the surface of the conductive layer rough may be added to the conductive layer.

Conductive Layer

The electrophotographic photosensitive member of the present invention may include a conductive layer having conductive particles and a resin on the support. In a method of forming a conductive layer having conductive particles and a resin on a support, powder containing the conductive particles is contained in the conductive layer.

Examples of the conductive particles include carbon black, acetylene black, metal powders made of, for example, aluminum, nickel, iron, nichrome, copper, zinc, and silver, and metal oxide powders made of, for example, conductive tin oxide and ITO.

Examples of the resin to be used in the conductive layer include a polyester resin, a polycarbonate resin, a polyvinyl butyral resin, an acrylic resin, a silicone resin, an epoxy resin, a melamine resin, a urethane resin, a phenol resin, and an alkyd resin. Those resins may be used each alone or in combination of two or more kinds thereof.

Examples of the solvent for a conductive-layer coating solution include an ether-based solvent, an alcohol-based solvent, a ketone-based solvent, and an aromatic hydrocarbon solvent. The thickness of the conductive layer is preferably 0.2 μm or more to 40 μm or less, more preferably 1 μm or more to 35 μm or less, still more preferably 5 μm or more to 30 μm or less.

Intermediate Layer

The electrophotographic photosensitive member of the present invention may include an intermediate layer between the support or the conductive layer and the charge-generating layer.

The intermediate layer can be formed by applying an intermediate-layer coating solution containing a resin on the support or conductive layer and drying or hardening the coating solution.

Examples of the resin in the intermediate layer include polyacrylic acids, methylcellulose, ethylcellulose, a polyamide resin, a polyimide resin, a polyamideimide resin, a polyamide acid resin, a melamine resin, an epoxy resin, and a polyurethane resin. The resin to be used in the intermediate layer is preferably a thermoplastic resin, and specifically, a thermoplastic polyamide resin is preferred. The polyamide resin is preferably copolymer nylon with low crystallinity or no crystallinity which can be applied in a solution form.

The thickness of the intermediate layer is preferably 0.05 μm or more to 40 μm or less, more preferably 0.1 μm or more to 2 μm or less.

The intermediate layer may further contain semiconductive particles, an electron-transporting substance, or an electron-accepting substance.

Charge-generating layer and charge-transporting layer In the electrophotographic photosensitive member of the present invention, the charge-generating layer is provided on the support, conductive layer, or intermediate layer, and the charge-transporting layer is provided on the charge-generating layer. The charge-transporting layer may have a laminate structure. The case where the lower layer in contact with the surface layer is the charge-generating layer and the case where the lower layer in contact with the surface layer is the charge-transporting layer are described.

The case where the lower layer in contact with the charge-transporting layer which is the surface layer is the charge-generating layer is described.

Examples of the charge-generating substance to be used in the electrophotographic photosensitive member of the present invention include azo pigments, phthalocyanine pigments, indigo pigments, and perylene pigments. One kind of those charge-generating substances may be used alone, or two or more kinds thereof may be used. Of those, oxytitanium phthalocyanine, hydroxygallium phthalocyanine, and chlorogallium phthalocyanine are particularly preferred because of their high sensitivity.

The resin to be used in the charge-generating layer in contact with the surface layer includes at least one resin selected from the group consisting of the polycarbonate resin D, polyester resin E, and polyvinyl acetal resin F of the present invention. Of those, the polyvinyl acetal resin F of the present invention is preferred. An additional resin may further be mixed before use. Examples of the additional resin which may be mixed before use include a polycarbonate resin, a polyester resin, a polyvinyl acetal resin, a butyral resin, an acrylic resin, a vinyl acetate resin, and a urea resin. One kind of those resins may be used alone, or two or more kinds thereof may be used as a mixture or as a copolymer.

The charge-generating layer can be formed by applying a charge-generating-layer coating solution, which is prepared by dispersing a charge-generating substance together with a resin and a solvent, and then drying the coating solution. Further, the charge-generating layer may also be a deposited film of a charge-generating substance.

Examples of the dispersion method include a method using a homogenizer, an ultrasonic wave, a ball mill, a sand mill, an attritor, or a roll mill.

A ratio between the charge-generating substance and the resin is preferably 0.1 part by mass or more to 10 parts by mass or less, particularly preferably 1 part by mass or more to 3 parts by mass or less of the charge-generating substance with respect to 1 part by mass of the resin.

Examples of the solvent to be used in the charge-generating-layer coating solution include an alcohol-based solvent, a sulfoxide-based solvent, a ketone-based solvent, an ether-based solvent, an ester-based solvent, and an aromatic hydrocarbon solvent.

The thickness of the charge-generating layer is preferably 0.01 μm or more to 5 μm or less, more preferably 0.1 μm or more to 2 μm or less. Further, any of various sensitizers, antioxidants, UV absorbents, plasticizers, and the like may be added to the charge-generating layer, if required. An electron-transporting substance or an electron-accepting substance may also be incorporated into the charge-generating layer to prevent the flow of charge from being disrupted in the charge-generating layer.

The charge-transporting layer (surface layer) is provided on the charge-generating layer.

The charge-transporting layer which is the surface layer of the electrophotographic photosensitive member of the present invention contains the resin B and resin C of the present invention. An additional resin may further be mixed before use. The additional resin which may be mixed before use is as described above.

The charge-transporting layer can be formed by applying a charge-transporting-layer coating solution obtained by dissolving a charge-transporting substance and the above-mentioned resins into a solvent and then drying the coating solution. A ratio between the charge-transporting substance and the resins is preferably 0.4 part by mass or more to 2 parts by mass or less, more preferably 0.5 part by mass or more to 1.2 parts by mass or less of the charge-transporting substance with respect to 1 part by mass of the resins.

Examples of the solvent to be used for the charge-transporting-layer coating solution include ketone-based solvents, ester-based solvents, ether-based solvents, and aromatic hydrocarbon solvents. Those solvents may be used each alone or as a mixture of two or more kinds thereof. Of those solvents, it is preferred to use any of the ether-based solvents and the aromatic hydrocarbon solvents from the viewpoint of resin solubility.

The charge-transporting layer has a thickness of preferably 5 μm or more to 50 μm or less, more preferably 10 μm or more to 35 μm or less. Further, any of antioxidants, UV absorbers, plasticizers, and the like may be added to the charge-transporting layer, if required.

The case where the lower layer in contact with the charge-transporting layer which is the surface layer is the charge-transporting layer (second charge-transporting layer) is described.

In the case where the lower layer in contact with the surface layer is the second charge-transporting layer, the charge-generating layer which is the lower layer of the second charge-transporting layer is as described for the case where the lower layer in contact with the surface layer is the charge-generating layer except for the kinds of resins to be used in the charge-generating layer. That is, it is not necessary to use the polycarbonate resin D, polyester resin E, and polyvinyl acetal resin F of the present invention as the resins, and an additional resin may be used. Examples of the additional resin include a polycarbonate resin, a polyester resin, a polyvinyl acetal resin, a butyral resin, an acrylic resin, a vinyl acetate resin, and a urea resin. One kind of those resins may be used alone, or two or more kinds thereof may be used as a mixture or as a copolymer.

The second charge-transporting layer is provided on the charge-generating layer as the lower layer in contact with the surface layer.

In the case where the lower layer in contact with the surface layer is the second charge-transporting layer, the resin to be used in the second charge-transporting layer includes at least one resin selected from the group consisting of the polycarbonate resin D, polyester resin E, and polyvinyl acetal resin F of the present invention. Of those, the polycarbonate resin D or polyester resin E of the present invention is preferred. An additional resin may further be mixed before use. Examples of the additional resin which may be mixed before use include a polycarbonate resin, a polyester resin, a polyvinyl acetal resin, a butyral resin, an acrylic resin, a vinyl acetate resin, and a urea resin.

The electrophotographic photosensitive member of the present invention contains the terminal siloxane-containing polyester resin of the present invention and the charge-transporting substance in the charge-transporting layer which is the surface layer. An additional resin may further be mixed before use. Examples of the additional resin which may be mixed before use include a polycarbonate resin, a polyester resin, a polyvinyl acetal resin, a butyral resin, an acrylic resin, a vinyl acetate resin, and a urea resin.

A variety of additives may be added to each layer of the electrophotographic photosensitive member of the present invention. Examples of the additives include: an antidegradant such as an antioxidant, a UV absorber, or a light stabilizer; and fine particles such as organic fine particles or inorganic fine particles. Examples of the antidegradant include a hindered phenol-based antioxidant, a hindered amine-based light stabilizer, a sulfur atom-containing antioxidant, and a phosphorus atom-containing antioxidant. Examples of the organic fine particles include polymer resin particles such as fluorine atom-containing resin particles, polystyrene fine particles, and polyethylene resin particles. Examples of the inorganic fine particles include metal oxides such as silica and alumina.

For the application of each of the coating solutions corresponding to the above-mentioned respective layers, any of the application methods can be employed, such as dip coating, spraying coating, spinner coating, roller coating, Mayer bar coating, and blade coating.

Electrophotographic Apparatus

FIG. 1 schematically illustrates an example of the construction of an electrophotographic apparatus including a process cartridge including the electrophotographic photosensitive member of the present invention.

In FIG. 1, a cylindrical electrophotographic photosensitive member 1 can be driven to rotate around an axis 2 in the direction indicated by the arrow at a predetermined peripheral speed. The surface of the electrophotographic photosensitive member 1 driven to rotate is uniformly charged at a predetermined negative potential by a charging device (primary charging device: such as a charging roller) 3 during the process of rotation. Subsequently, the surface of the electrophotographic photosensitive member 1 receives exposure light (image exposure light) 4 which is emitted from an exposing device (not shown) such as a slit exposure or a laser-beam scanning exposure and which is intensity-modulated according to a time-series electric digital image signal of image information of interest. In this way, electrostatic latent images corresponding to the image information of interest are sequentially formed on the surface of the electrophotographic photosensitive member 1.

The electrostatic latent images formed on the surface of the electrophotographic photosensitive member 1 are converted into toner images by reversal development with toner included in a developer of a developing device 5. Subsequently, the toner images being formed and held on the surface of the electrophotographic photosensitive member 1 are sequentially transferred to a transfer material (such as paper) P by a transfer bias from a transferring device (such as transfer roller) 6. It should be noted that the transfer material P is taken from a transfer material supplying device (not shown) in synchronization with the rotation of the electrophotographic photosensitive member 1 and fed to a portion (abutment part) between the electrophotographic photosensitive member 1 and the transferring device 6.

The transfer material P which has received the transfer of the toner images is dissociated from the surface of the electrophotographic photosensitive member 1 and then introduced to a fixing device 8. The transfer material P is subjected to an image fixation of the toner images and then printed as an image-formed product (print or copy) out of the apparatus.

The surface of the electrophotographic photosensitive member 1 after the transfer of the toner images is cleaned by removal of the remaining developer (remaining toner after transfer) after the transfer by a cleaning device (such as cleaning blade) 7. Subsequently, the surface of the electrophotographic photosensitive member 1 is subjected to a neutralization process with pre-exposure light (not shown) from a pre-exposing device (not shown) and then repeatedly used in image formation. It should be noted that, as shown in FIG. 1, further, when the charging device 3 is a contact-charging device using a charging roller or the like, the pre-exposure is not always required.

In the present invention, of the structural components including the electrophotographic photosensitive member 1, the charging device 3, the developing device 5, the transferring device 6, and the cleaning device 7 as described above, a plurality of them may be selected and housed in a container and then integrally supported as a process cartridge. In addition, the process cartridge may be removably mounted onto the main body of an electrophotographic apparatus such as a copying machine or a laser beam printer. In FIG. 1, the electrophotographic photosensitive member 1, the charging device 3, the developing device 5, and the cleaning device 7 are integrally supported and placed in a cartridge, thereby forming a process cartridge 9. The process cartridge 9 is removably mounted onto the main body of the electrophotographic apparatus using a guiding device 10 such as a rail of the main body of the electrophotographic apparatus.

EXAMPLES

Hereinafter, the present invention is described in more detail with reference to examples and comparative examples. However, the present invention is not limited in any way to the following examples. In addition, "part(s)" means "part(s) by mass" in the examples.

Example 1

An aluminum cylinder with a diameter of 30 mm and a length of 357 mm was used as a support. Next, 10 parts of $SnO_2$-coated barium sulfate (conductive particle), 2 parts of titanium oxide (pigment for controlling resistance), 6 parts of a phenol resin, and 0.001 part of silicone oil (leveling agent) were used together with a mixed solvent of 4 parts of methanol and 16 parts of methoxypropanol, to thereby prepare a conductive-layer coating solution. The conductive-layer coating solution was applied on the above-mentioned aluminum cylinder by dip coating and hardened (thermally hardened) at 140° C. for 30 minutes, to thereby form a conductive layer with a thickness of 15 μm.

Next, 3 parts of N-methoxymethylated nylon and 3 parts of copolymer nylon were dissolved in a mixed solvent of 65 parts of methanol and 30 parts of n-butanol, to thereby prepare an intermediate-layer coating solution. The intermediate-layer coating solution was applied on the above-mentioned conductive layer by dip coating and dried at 100° C. for 10 minutes, to thereby form an intermediate layer with a thickness of 0.7 μm.

Next, 10 parts of crystalline hydroxygallium phthalocyanine (charge-generating substance) having a crystal structure showing intense peaks at Bragg angles) ($2\theta\pm0.2°$) of 7.5°, 9.9°, 16.3°, 18.6°, 25.1°, and 28.3° in CuKα characteristic X-ray diffraction were prepared. 250 parts of cyclohexanone and 5 parts of a polyvinyl butyral resin (manufactured by Denki Kagaku Kogyo Kabushiki Kaisha, product name #6000C) were mixed with the crystalline hydroxygallium phthalocyanine, and the resultant mixture was dispersed by a sand mill apparatus using glass beads with a diameter of 1 mm under a 23±3° C. atmosphere for 1 hour. After dispersion, 250 parts of ethyl acetate were added to prepare a charge-generating-layer coating solution. The charge-generating-layer coating solution was applied on the above-mentioned intermediate layer by dip coating and dried at 100° C. for 10 minutes, to thereby form a charge-generating layer with a thickness of 0.26 μm.

Next, 10 parts of the charge-transporting substance having the structure represented by the above-mentioned formula (G-7), 1 part of a resin containing the resin B(1) synthesized in Synthesis Example 1 and the resin C(1) synthesized in Synthesis Example 51 at a ratio of 95:5, and 9 parts of a polyester resin (weight-average molecular weight: 50,000) having the repeating structural unit represented by the above-mentioned formula (E-2) were dissolved in a mixed solvent of 20 parts of tetrahydrofuran and 60 parts of toluene, to thereby prepare a charge-transporting-layer coating solution. The charge-transporting-layer coating solution was applied on the above-mentioned charge-generating layer by dip coating and dried at 110° C. for 1 hour, to thereby form a charge-transporting layer (surface layer) with a thickness of 16 μm.

Table 5 shows the terminal siloxane-containing polyester resins (resin B and resin C) and additional resin included in the charge-transporting layer (surface layer), mixing ratio of the terminal siloxane-containing polyester resins and the additional resin, charge-transporting substance, and resin included in the lower layer in contact with the surface layer.

Next, evaluation is described.

Evaluation was performed for a torque relative value in initial use and adhesion of the surface layer. Evaluation was performed using a copier GP-40 manufactured by Canon Inc. as an evaluation apparatus under an environment of a temperature of 23° C. and a relative humidity of 50%.

<Evaluation of Torque Relative Value>

A driving current (current A) of a rotary motor for the electrophotographic photosensitive member was measured. This evaluation was performed for evaluating an amount of contact stress between the electrophotographic photosensitive member and the cleaning blade. The resultant current shows how large the amount of contact stress between the electrophotographic photosensitive member and the cleaning blade is.

Moreover, an electrophotographic photosensitive member for comparison of a torque relative value was produced by the following method. The electrophotographic photosensitive member was produced in the same manner as in Example 1 except that the resin B(1) and resin C(1) used in the surface layer of the electrophotographic photosensitive member of Example 1 were changed to a polyester resin (weight-average molecular weight: 60,000) having the repeating structure represented by the formula (E-2), and only the polyester resin having the repeating structure represented by the formula (E-2) was used as the resin. The electrophotographic photosensitive member was used as the electrophotographic photosensitive member for comparison. The electrophotographic photosensitive member thus produced was used to measure a driving current (current B) of a rotary motor for the electrophotographic photosensitive member in the same manner as in Example 1.

A ratio of the driving current (current A) of the rotary motor for the electrophotographic photosensitive member containing the resin B and resin C according to the present invention to the driving current (current B) of the rotary motor for the electrophotographic photosensitive member not containing the resin B and resin C was calculated. The resultant value of (current A)/(current B) was compared as a torque relative value. The torque relative value represents a degree of reduction in the contact stress between the electrophotographic photosensitive member and the cleaning blade by use of the rein B and resin C. As the torque relative value becomes smaller, the degree of reduction in the contact stress between the electrophotographic photosensitive member and the cleaning blade becomes larger. The results are shown in the column "Initial torque relative value" in Table 13.

<Evaluation of Peeling Resistance of Surface Layer>

Peeling resistance was evaluated by a cross-cut tape method specified in JIS K 5400. Evaluation was performed according to the specification of JIS unless otherwise designated. A procedure of measurement is shown below.

1. The electrophotographic photosensitive member produced in each example is fixed at a predetermined position and then cross-cut with a cutter knife in an area in its central portion using a cutter guide or the like at an interval prescribed in a product specification for a sample. The resulting cut lines are at an interval of 1 mm, and the number of cross-cuts is 100 as a standard. Cross-cuts having been peeled off at the interface part other than the interface between the surface layer and the lower layer in contact with the surface layer are excluded from measurement. However, in the case where more than half of the cross-cuts are excluded from measurement, the interval between the cross-cuts of the cut lines is increased sequentially by 1 mm, and measurement is performed at an interval of the cut lines which enables measurement.
2. As the cutter knife for cutting the photosensitive member, new one is always used, and the knife is used so as to maintain a constant angle within the range of 35 to 45 degrees relative to the surface of the coating.
3. The cut lines are made by drawing the knife at a constant speed over about 0.5 second for one cut line so that the cut line penetrates the coating film and reaches the conductive support.
4. A cellophane pressure-sensitive adhesive tape is attached onto the cross-cuts so that the adhesion part of the tape is about 50 mm in length, and the tape is firmly attached to the coating by rubbing the tape with an eraser.
5. One or two minutes after adhesion of the tape, the one end of the tape is held up so as to be at a right angle to the surface of the coating and is forcibly peeled off in a moment.
6. The coating surface and tape are observed to determine the number of the cross-cuts peeled at the interface between the surface layer and the lower layer in contact with the surface layer and to calculate a ratio of the peeled area. A test for the peeling resistance was performed for the above-mentioned photosensitive member by a cross-cut adhesion test according to a method specified in JIS, and the number of the residual, not-peeled off cross-cuts out of 100 cross-cuts was counted. The residual ratio was calculated from the following equation and evaluated. In the present invention, Symbols "A", "B", and "C" of the following evaluation criteria are judged as levels which can provide the effects of the present invention, and Symbol "D" is judged as a level which cannot provide any effects of the present invention. Table 13 shows the evaluation results.

Residual ratio(%)=Number of unpeeled cross-cuts/ total number of cross-cuts(100 cross-cuts)

A: 90%<Residual ratio≤100%
B: 75%<Residual ratio≤90%
C: 60%<Residual ratio≤75%
D: 0%≤Residual ratio≤60%

Examples 2 to 397

Electrophotographic photosensitive members were produced and evaluated in the same manner as in Example 1 except that the terminal siloxane-containing polyester resins (resin B and resin C) and additional resin included in the charge-transporting layer (surface layer), mixing ratio of the terminal siloxane-containing polyester resins and the additional resin, charge-transporting substance, and resin included in the lower layer of the surface layer in Example 1 were changed as shown in Tables 5 to 10. Tables 13 and 14 show the results.

Example 398

In the above-mentioned synthesis examples, i.e., in synthesis of the resin B(1) and resin C(1) having the structures represented by the above-mentioned formulae (A-1) and (B-3) or (C-3), polymerization reactions were quenched. After that, washing with water was repeated until the aqueous phase became neutral, and the product was purified without separating the resin B(1) and the resin C(1) and added dropwise to methanol with stirring to precipitate a polymerized product. The polymerized product was vacuum-dried, to thereby obtain a mixture of the resin B(1) and resin C(1). The mixture is called a resin M. The mixing ratio of the resin B(1) to the resin C(1) in the resin M was measured and found to be 95/5, and the siloxane moiety contents in the resin B(1) and resin C(1) were calculated as above and found to be 30% by mass for the resin B(1) and 15% by mass for the resin C(1). The weight-average molecular weight of the polyester resin M was found to be 20,000.

An electrophotographic photosensitive members was produced and evaluated in the same manner as in Example 1 except that the resin B(1) and resin C(1) used in the surface layer of the electrophotographic photosensitive member of Example 1 were changed to the resin M. Table 14 shows the results.

Example 399

A conductive layer, an intermediate layer, and a charge-generating layer were formed in the same manner as in Example 1. Next, 10 parts of the charge-transporting substance having the structure represented by the above-mentioned formula (G-1) and 10 parts of the polyester resin (weight-average molecular weight: 60,000) having the repeating structural unit represented by the above-mentioned formula (E-2) were dissolved in a mixed solvent of 20 parts of tetrahydrofuran and 60 parts of toluene, to thereby prepare a charge-transporting layer coating solution. The charge-transporting-layer coating solution was applied on the charge-generating layer by dip coating and dried at 110° C. for 1 hour, to thereby form a charge-transporting layer with a thickness of 16 μm. Next, 10 parts of the charge-transporting substance having the structural unit represented by the above-mentioned formula (G-1), 5 parts of the resin containing the resin B(1) synthesized in Synthesis Example 1 and the resin C(1) synthesized in Synthesis Example 51 at a ratio of 95:5, and 5 parts of the polyester resin (weight-average molecular weight: 50,000) having the repeating structural unit represented by the above-mentioned formula (E-2) were dissolved in a mixed solvent of 20 parts of tetrahydrofuran and 60 parts of toluene, to thereby prepare a surface-layer coating solution. The surface-layer coating solution was applied on the charge-generating layer by spray coating and dried at 110° C. for 1 hour, to thereby form a surface layer with a thickness of 5 μm.

Table 11 shows the terminal siloxane-containing polyester resins (resin B and resin C) and additional resin included in the surface layer, mixing ratio of the terminal siloxane-containing polyester resins and the additional resin, charge-transporting substance, and resin included in the lower layer of the surface layer. Evaluation was performed in the same manner as in Example 1, and Table 14 shows the results.

Examples 400 to 488

Electrophotographic photosensitive members were produced and evaluated in the same manner as in Example 399 except that the terminal siloxane-containing polyester resins (resin B and resin C) and additional resins included in the surface layer, mixing ratios of the terminal siloxane-containing polyester resins and the additional resins, charge-transporting substances, and resins included in the lower layer of the surface layer in Example 399 were changed as shown in Tables 11 and 12. Table 14 shows the results.

Example 489

An electrophotographic photosensitive member was produced and evaluated in the same manner as in Example 399 except that the resin B(1) and the resin C(1) used in the surface layer of the electrophotographic photosensitive member of Example 399 were changed to the resin M. Table 14 shows the results.

Comparative Examples 1 to 39

Electrophotographic photosensitive members were produced and evaluated in the same manner as in Example 1 except that the terminal siloxane-containing polyester resins (resin B and resin C) and additional resin included in the surface layer, mixing ratio of the terminal siloxane-containing polyester resins and the additional resin, charge-transporting substance, and resin included in the lower layer of the surface layer in Example 1 were changed as shown in Table 15. Table 17 shows the results.

Comparative Examples 40 to 58

Electrophotographic photosensitive members were produced and evaluated in the same manner as in Example 1 except that, in Example 1, the resin B and the resin C were changed to a resin H having the structure described in Patent Literature 1 and having the repeating structural unit represented by the following formula (J-1), and other modifications were made as shown in Table 15. Table 17 shows the results.

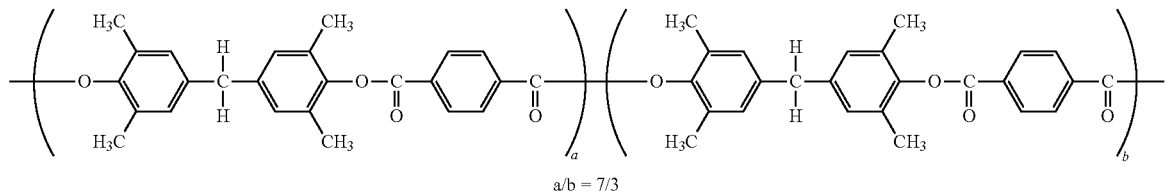

Terminal:

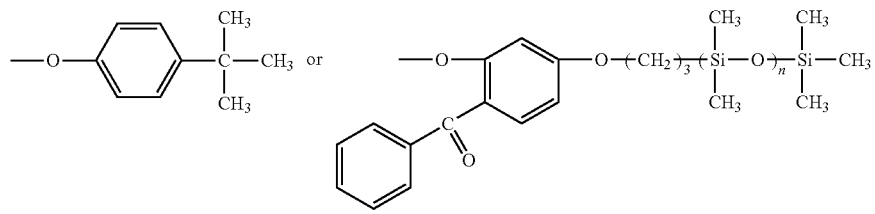

Comparative Examples 59 to 77

Electrophotographic photosensitive members were produced and evaluated in the same manner as in Example 1 except that, in Example 1, the resin B and the resin C were changed to a resin I having the structure described in Patent Literature 1 and having the repeating structural unit represented by the following formula (J-2), and other modifications were made as shown in Table 15. Table 17 shows the results.

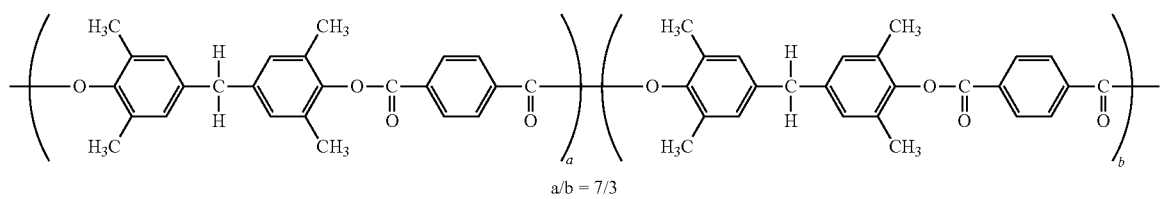

(J-2)

Terminal:

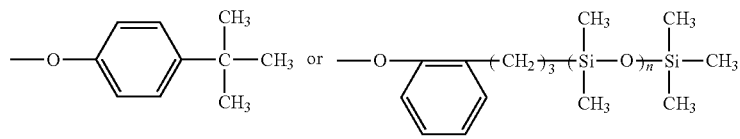

Comparative Examples 78 to 100

Electrophotographic photosensitive members were produced and evaluated in the same manner as in Example 399 except that the terminal siloxane-containing polyester resins (resin B and resin C) and additional resin in the surface layer, mixing ratio of the terminal siloxane-containing polyester resins and the additional resin, charge-transporting substance, and resin included in the lower layer of the surface layer in Example 399 were changed as shown in Table 16. Table 17 shows the results.

Comparative Examples 101 to 115

Electrophotographic photosensitive members were produced and evaluated in the same manner as in Example 399 except that, in Example 399, the terminal siloxane-containing polyester resins (resin B and resin C) were changed to a resin H having the structure described in Patent Literature 1 and having the repeating structural unit represented by the above-mentioned formula (J-1), and other modifications were made as shown in Table 16. Table 17 shows the results.

Comparative Examples 116 to 130

Electrophotographic photosensitive members were produced and evaluated in the same manner as in Example 399 except that, in Example 399, the terminal siloxane-containing polyester resins (resin B and resin C) were changed to a resin I having the structure described in Patent Literature 1 and having the repeating structural unit represented by the above-mentioned formula (J-2), and other modifications were made as shown in Table 16. Table 17 shows the results.

Comparative Example 131

Electrophotographic photosensitive members were produced and evaluated in the same manner as in Example 1 except that, in Example 1, the resin B and the resin C were changed to a resin K having the structure described in Patent Literature 2 and having the repeating structural unit represented by the following formula (K), and other modifications were made as shown in Table 16. Table 17 shows the results.

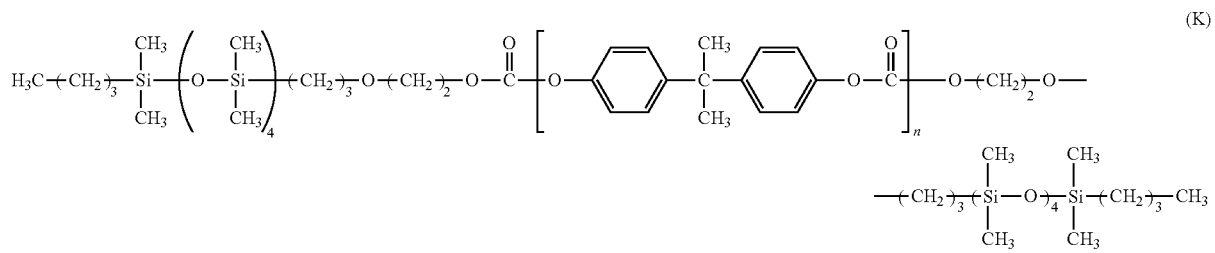

TABLE 5

| | Siloxane-containing polyester resins | | | Additional resin | Mixing ratio of siloxane-containing polyester resins to additional resin | CTM | Resin included in lower layer in contact with surface layer |
|---|---|---|---|---|---|---|---|
| Example | Resin B | Resin C | Mixing ratio of resin B to resin C | | | | |
| Example 1 | Resin B (1) | Resin C (1) | B/C = 95/5 | E-2 | 10/90 | G-7 | F-1 |
| Example 2 | Resin B (1) | Resin C (51) | B/C = 95/5 | E-2 | 10/90 | G-7 | F-1 |

TABLE 5-continued

| Example | Resin B | Resin C | Mixing ratio of resin B to resin C | Additional resin | Mixing ratio of siloxane-containing polyester resins to additional resin | CTM | Resin included in lower layer in contact with surface layer |
|---|---|---|---|---|---|---|---|
| Example 3 | Resin B (1) | Resin C (52) | B/C = 95/5 | E-2 | 10/90 | G-7 | F-1 |
| Example 4 | Resin B (2) | Resin C (2) | B/C = 95/5 | E-2 | 10/90 | G-7 | F-1 |
| Example 5 | Resin B (2) | Resin C (53) | B/C = 95/5 | E-2 | 10/90 | G-7 | F-1 |
| Example 6 | Resin B (2) | Resin C (54) | B/C = 95/5 | E-2 | 10/90 | G-7 | F-1 |
| Example 7 | Resin B (3) | Resin C (3) | B/C = 95/5 | E-2 | 10/90 | G-7 | F-1 |
| Example 8 | Resin B (4) | Resin C (4) | B/C = 95/5 | E-2 | 10/90 | G-7 | F-1 |
| Example 9 | Resin B (5) | Resin C (5) | B/C = 95/5 | E-2 | 10/90 | G-7 | F-1 |
| Example 10 | Resin B (6) | Resin C (6) | B/C = 95/5 | E-2 | 10/90 | G-7 | F-1 |
| Example 11 | Resin B (6) | Resin C (55) | B/C = 95/5 | E-2 | 10/90 | G-7 | F-1 |
| Example 12 | Resin B (6) | Resin C (56) | B/C = 95/5 | E-2 | 10/90 | G-7 | F-1 |
| Example 13 | Resin B (7) | Resin C (7) | B/C = 95/5 | E-2 | 10/90 | G-7 | F-1 |
| Example 14 | Resin B (8) | Resin C (8) | B/C = 95/5 | E-2 | 10/90 | G-7 | F-1 |
| Example 15 | Resin B (9) | Resin C (9) | B/C = 95/5 | E-2 | 10/90 | G-7 | F-1 |
| Example 16 | Resin B (10) | Resin C (10) | B/C = 95/5 | E-2 | 10/90 | G-7 | F-1 |
| Example 17 | Resin B (11) | Resin C (11) | B/C = 95/5 | E-2 | 10/90 | G-7 | F-1 |
| Example 18 | Resin B (12) | Resin C (12) | B/C = 95/5 | E-2 | 10/90 | G-7 | F-1 |
| Example 19 | Resin B (13) | Resin C (13) | B/C = 95/5 | E-2 | 10/90 | G-7 | F-1 |
| Example 20 | Resin B (13) | Resin C (57) | B/C = 95/5 | E-2 | 10/90 | G-7 | F-1 |
| Example 21 | Resin B (13) | Resin C (58) | B/C = 95/5 | E-2 | 10/90 | G-7 | F-1 |
| Example 22 | Resin B (14) | Resin C (14) | B/C = 95/5 | E-2 | 10/90 | G-7 | F-1 |
| Example 23 | Resin B (15) | Resin C (15) | B/C = 95/5 | E-2 | 10/90 | G-7 | F-1 |
| Example 24 | Resin B (15) | Resin C (67) | B/C = 95/5 | E-2 | 10/90 | G-7 | F-1 |
| Example 25 | Resin B (15) | Resin C (68) | B/C = 95/5 | E-2 | 10/90 | G-7 | F-1 |
| Example 26 | Resin B (16) | Resin C (16) | B/C = 95/5 | E-2 | 10/90 | G-7 | F-1 |
| Example 27 | Resin B (17) | Resin C (17) | B/C = 95/5 | E-2 | 10/90 | G-7 | F-1 |
| Example 28 | Resin B (18) | Resin C (18) | B/C = 95/5 | E-2 | 10/90 | G-7 | F-1 |
| Example 29 | Resin B (19) | Resin C (19) | B/C = 95/5 | E-2 | 10/90 | G-7 | F-1 |
| Example 30 | Resin B (20) | Resin C (20) | B/C = 95/5 | E-2 | 10/90 | G-7 | F-1 |
| Example 31 | Resin B (21) | Resin C (21) | B/C = 95/5 | E-2 | 10/90 | G-7 | F-1 |
| Example 32 | Resin B (21) | Resin C (69) | B/C = 95/5 | E-2 | 10/90 | G-7 | F-1 |
| Example 33 | Resin B (21) | Resin C (70) | B/C = 95/5 | E-2 | 10/90 | G-7 | F-1 |
| Example 34 | Resin B (22) | Resin C (22) | B/C = 95/5 | E-2 | 10/90 | G-7 | F-1 |
| Example 35 | Resin B (22) | Resin C (59) | B/C = 95/5 | E-2 | 10/90 | G-7 | F-1 |
| Example 36 | Resin B (22) | Resin C (60) | B/C = 95/5 | E-2 | 10/90 | G-7 | F-1 |
| Example 37 | Resin B (23) | Resin C (23) | B/C = 95/5 | E-2 | 10/90 | G-7 | F-1 |
| Example 38 | Resin B (23) | Resin C (61) | B/C = 95/5 | E-2 | 10/90 | G-7 | F-1 |
| Example 39 | Resin B (23) | Resin C (62) | B/C = 95/5 | E-2 | 10/90 | G-7 | F-1 |
| Example 40 | Resin B (24) | Resin C (24) | B/C = 95/5 | E-2 | 10/90 | G-7 | F-1 |
| Example 41 | Resin B (25) | Resin C (25) | B/C = 95/5 | E-2 | 10/90 | G-7 | F-1 |
| Example 42 | Resin B (25) | Resin C (63) | B/C = 95/5 | E-2 | 10/90 | G-7 | F-1 |
| Example 43 | Resin B (25) | Resin C (64) | B/C = 95/5 | E-2 | 10/90 | G-7 | F-1 |
| Example 44 | Resin B (26) | Resin C (26) | B/C = 95/5 | E-2 | 10/90 | G-7 | F-1 |
| Example 45 | Resin B (27) | Resin C (27) | B/C = 95/5 | E-2 | 10/90 | G-7 | F-1 |
| Example 46 | Resin B (28) | Resin C (28) | B/C = 95/5 | E-2 | 10/90 | G-7 | F-1 |
| Example 47 | Resin B (29) | Resin C (29) | B/C = 95/5 | E-2 | 10/90 | G-7 | F-1 |
| Example 48 | Resin B (29) | Resin C (65) | B/C = 95/5 | E-2 | 10/90 | G-7 | F-1 |
| Example 49 | Resin B (29) | Resin C (66) | B/C = 95/5 | E-2 | 10/90 | G-7 | F-1 |
| Example 50 | Resin B (30) | Resin C (30) | B/C = 95/5 | E-2 | 10/90 | G-7 | F-1 |
| Example 51 | Resin B (31) | Resin C (31) | B/C = 95/5 | E-2 | 10/90 | G-7 | F-1 |
| Example 52 | Resin B (32) | Resin C (32) | B/C = 95/5 | E-2 | 10/90 | G-7 | F-1 |
| Example 53 | Resin B (33) | Resin C (33) | B/C = 95/5 | E-2 | 10/90 | G-7 | F-1 |
| Example 54 | Resin B (34) | Resin C (34) | B/C = 95/5 | E-2 | 10/90 | G-7 | F-1 |
| Example 55 | Resin B (35) | Resin C (35) | B/C = 95/5 | E-2 | 10/90 | G-7 | F-1 |
| Example 56 | Resin B (36) | Resin C (36) | B/C = 95/5 | E-2 | 10/90 | G-7 | F-1 |
| Example 57 | Resin B (37) | Resin C (37) | B/C = 95/5 | E-2 | 10/90 | G-7 | F-1 |
| Example 58 | Resin B (38) | Resin C (38) | B/C = 95/5 | E-2 | 10/90 | G-7 | F-1 |
| Example 59 | Resin B (39) | Resin C (39) | B/C = 95/5 | E-2 | 10/90 | G-7 | F-1 |
| Example 60 | Resin B (40) | Resin C (40) | B/C = 95/5 | E-2 | 10/90 | G-7 | F-1 |
| Example 61 | Resin B (41) | Resin C (41) | B/C = 95/5 | E-2 | 10/90 | G-7 | F-1 |
| Example 62 | Resin B (42) | Resin C (42) | B/C = 95/5 | E-2 | 10/90 | G-7 | F-1 |
| Example 63 | Resin B (43) | Resin C (43) | B/C = 95/5 | E-2 | 10/90 | G-7 | F-1 |
| Example 64 | Resin B (44) | Resin C (44) | B/C = 95/5 | E-2 | 10/90 | G-7 | F-1 |
| Example 65 | Resin B (45) | Resin C (45) | B/C = 95/5 | E-2 | 10/90 | G-7 | F-1 |
| Example 66 | Resin B (46) | Resin C (46) | B/C = 95/5 | E-2 | 10/90 | G-7 | F-1 |
| Example 67 | Resin B (47) | Resin C (47) | B/C = 95/5 | E-2 | 10/90 | G-7 | F-1 |
| Example 68 | Resin B (48) | Resin C (48) | B/C = 95/5 | E-2 | 10/90 | G-7 | F-1 |
| Example 69 | Resin B (49) | Resin C (49) | B/C = 95/5 | E-2 | 10/90 | G-7 | F-1 |
| Example 70 | Resin B (50) | Resin C (50) | B/C = 95/5 | E-2 | 10/90 | G-7 | F-1 |
| Example 71 | Resin B (1) | Resin C (1) | B/C = 95/5 | E-3 | 10/90 | G-7 | F-1 |
| Example 72 | Resin B (1) | Resin C (51) | B/C = 95/5 | E-3 | 10/90 | G-7 | F-1 |

TABLE 5-continued

| Example | Siloxane-containing polyester resins | | Mixing ratio of resin B to resin C | Additional resin | Mixing ratio of siloxane-containing polyester resins to additional resin | CTM | Resin included in lower layer in contact with surface layer |
|---|---|---|---|---|---|---|---|
| | Resin B | Resin C | | | | | |
| Example 73 | Resin B (1) | Resin C (52) | B/C = 95/5 | E-3 | 10/90 | G-7 | F-1 |
| Example 74 | Resin B (2) | Resin C (2) | B/C = 95/5 | E-3 | 10/90 | G-7 | F-1 |
| Example 75 | Resin B (6) | Resin C (6) | B/C = 95/5 | E-3 | 10/90 | G-7 | F-1 |

TABLE 6

| Example | Siloxane-containing polyester resins | | Mixing ratio of resin B to resin C | Additional resin | Mixing ratio of siloxane-containing polyester resins to additional resin | CTM | Resin included in lower layer in contact with surface layer |
|---|---|---|---|---|---|---|---|
| | Resin B | Resin C | | | | | |
| Example 76 | Resin B (13) | Resin C (13) | B/C = 95/5 | E-3 | 10/90 | G-7 | F-1 |
| Example 77 | Resin B (22) | Resin C (22) | B/C = 95/5 | E-3 | 10/90 | G-7 | F-1 |
| Example 78 | Resin B (23) | Resin C (23) | B/C = 95/5 | E-3 | 10/90 | G-7 | F-1 |
| Example 79 | Resin B (25) | Resin C (25) | B/C = 95/5 | E-3 | 10/90 | G-7 | F-1 |
| Example 80 | Resin B (29) | Resin C (29) | B/C = 95/5 | E-3 | 10/90 | G-7 | F-1 |
| Example 81 | Resin B (37) | Resin C (37) | B/C = 95/5 | E-3 | 10/90 | G-7 | F-1 |
| Example 82 | Resin B (38) | Resin C (38) | B/C = 95/5 | E-3 | 10/90 | G-7 | F-1 |
| Example 83 | Resin B (1) | Resin C (1) | B/C = 95/5 | E-9 | 10/90 | G-7 | F-1 |
| Example 84 | Resin B (1) | Resin C (51) | B/C = 95/5 | E-9 | 10/90 | G-7 | F-1 |
| Example 85 | Resin B (1) | Resin C (52) | B/C = 95/5 | E-9 | 10/90 | G-7 | F-1 |
| Example 86 | Resin B (2) | Resin C (2) | B/C = 95/5 | E-9 | 10/90 | G-7 | F-1 |
| Example 87 | Resin B (6) | Resin C (6) | B/C = 95/5 | E-9 | 10/90 | G-7 | F-1 |
| Example 88 | Resin B (13) | Resin C (13) | B/C = 95/5 | E-9 | 10/90 | G-7 | F-1 |
| Example 89 | Resin B (22) | Resin C (22) | B/C = 95/5 | E-9 | 10/90 | G-7 | F-1 |
| Example 90 | Resin B (23) | Resin C (23) | B/C = 95/5 | E-9 | 10/90 | G-7 | F-1 |
| Example 91 | Resin B (25) | Resin C (25) | B/C = 95/5 | E-9 | 10/90 | G-7 | F-1 |
| Example 92 | Resin B (29) | Resin C (29) | B/C = 95/5 | E-9 | 10/90 | G-7 | F-1 |
| Example 93 | Resin B (37) | Resin C (37) | B/C = 95/5 | E-9 | 10/90 | G-7 | F-1 |
| Example 94 | Resin B (38) | Resin C (38) | B/C = 95/5 | E-9 | 10/90 | G-7 | F-1 |
| Example 95 | Resin B (1) | Resin C (1) | B/C = 95/5 | D-7 | 10/90 | G-7 | F-1 |
| Example 96 | Resin B (1) | Resin C (51) | B/C = 95/5 | D-7 | 10/90 | G-7 | F-1 |
| Example 97 | Resin B (1) | Resin C (52) | B/C = 95/5 | D-7 | 10/90 | G-7 | F-1 |
| Example 98 | Resin B (2) | Resin C (2) | B/C = 95/5 | D-7 | 10/90 | G-7 | F-1 |
| Example 99 | Resin B (2) | Resin C (53) | B/C = 95/5 | D-7 | 10/90 | G-7 | F-1 |
| Example 100 | Resin B (2) | Resin C (54) | B/C = 95/5 | D-7 | 10/90 | G-7 | F-1 |
| Example 101 | Resin B (6) | Resin C (6) | B/C = 95/5 | D-7 | 10/90 | G-7 | F-1 |
| Example 102 | Resin B (6) | Resin C (55) | B/C = 95/5 | D-7 | 10/90 | G-7 | F-1 |
| Example 103 | Resin B (6) | Resin C (56) | B/C = 95/5 | D-7 | 10/90 | G-7 | F-1 |
| Example 104 | Resin B (13) | Resin C (13) | B/C = 95/5 | D-7 | 10/90 | G-7 | F-1 |
| Example 105 | Resin B (13) | Resin C (57) | B/C = 95/5 | D-7 | 10/90 | G-7 | F-1 |
| Example 106 | Resin B (13) | Resin C (58) | B/C = 95/5 | D-7 | 10/90 | G-7 | F-1 |
| Example 107 | Resin B (22) | Resin C (22) | B/C = 95/5 | D-7 | 10/90 | G-7 | F-1 |
| Example 108 | Resin B (22) | Resin C (59) | B/C = 95/5 | D-7 | 10/90 | G-7 | F-1 |
| Example 109 | Resin B (22) | Resin C (60) | B/C = 95/5 | D-7 | 10/90 | G-7 | F-1 |
| Example 110 | Resin B (23) | Resin C (23) | B/C = 95/5 | D-7 | 10/90 | G-7 | F-1 |
| Example 111 | Resin B (23) | Resin C (61) | B/C = 95/5 | D-7 | 10/90 | G-7 | F-1 |
| Example 112 | Resin B (23) | Resin C (62) | B/C = 95/5 | D-7 | 10/90 | G-7 | F-1 |
| Example 113 | Resin B (25) | Resin C (25) | B/C = 95/5 | D-7 | 10/90 | G-7 | F-1 |
| Example 114 | Resin B (25) | Resin C (63) | B/C = 95/5 | D-7 | 10/90 | G-7 | F-1 |
| Example 115 | Resin B (25) | Resin C (64) | B/C = 95/5 | D-7 | 10/90 | G-7 | F-1 |
| Example 116 | Resin B (29) | Resin C (29) | B/C = 95/5 | D-7 | 10/90 | G-7 | F-1 |
| Example 117 | Resin B (29) | Resin C (65) | B/C = 95/5 | D-7 | 10/90 | G-7 | F-1 |
| Example 118 | Resin B (29) | Resin C (66) | B/C = 95/5 | D-7 | 10/90 | G-7 | F-1 |
| Example 119 | Resin B (37) | Resin C (37) | B/C = 95/5 | D-7 | 10/90 | G-7 | F-1 |
| Example 120 | Resin B (38) | Resin C (38) | B/C = 95/5 | D-7 | 10/90 | G-7 | F-1 |
| Example 121 | Resin B (1) | Resin C (1) | B/C = 95/5 | D-1 | 10/90 | G-7 | F-1 |
| Example 122 | Resin B (1) | Resin C (51) | B/C = 95/5 | D-1 | 10/90 | G-7 | F-1 |
| Example 123 | Resin B (1) | Resin C (52) | B/C = 95/5 | D-1 | 10/90 | G-7 | F-1 |
| Example 124 | Resin B (2) | Resin C (2) | B/C = 95/5 | D-1 | 10/90 | G-7 | F-1 |
| Example 125 | Resin B (6) | Resin C (6) | B/C = 95/5 | D-1 | 10/90 | G-7 | F-1 |
| Example 126 | Resin B (13) | Resin C (13) | B/C = 95/5 | D-1 | 10/90 | G-7 | F-1 |
| Example 127 | Resin B (22) | Resin C (22) | B/C = 95/5 | D-1 | 10/90 | G-7 | F-1 |

TABLE 6-continued

| Example | Siloxane-containing polyester resins | | | Additional resin | Mixing ratio of siloxane-containing polyester resins to additional resin | CTM | Resin included in lower layer in contact with surface layer |
| | Resin B | Resin C | Mixing ratio of resin B to resin C | | | | |
|---|---|---|---|---|---|---|---|
| Example 128 | Resin B (23) | Resin C (23) | B/C = 95/5 | D-1 | 10/90 | G-7 | F-1 |
| Example 129 | Resin B (25) | Resin C (25) | B/C = 95/5 | D-1 | 10/90 | G-7 | F-1 |
| Example 130 | Resin B (29) | Resin C (29) | B/C = 95/5 | D-1 | 10/90 | G-7 | F-1 |
| Example 131 | Resin B (37) | Resin C (37) | B/C = 95/5 | D-1 | 10/90 | G-7 | F-1 |
| Example 132 | Resin B (38) | Resin C (38) | B/C = 95/5 | D-1 | 10/90 | G-7 | F-1 |
| Example 133 | Resin B (1) | Resin C (1) | B/C = 95/5 | D-9 | 10/90 | G-7 | F-1 |
| Example 134 | Resin B (1) | Resin C (51) | B/C = 95/5 | D-9 | 10/90 | G-7 | F-1 |
| Example 135 | Resin B (1) | Resin C (52) | B/C = 95/5 | D-9 | 10/90 | G-7 | F-1 |
| Example 136 | Resin B (2) | Resin C (2) | B/C = 95/5 | D-9 | 10/90 | G-7 | F-1 |
| Example 137 | Resin B (6) | Resin C (6) | B/C = 95/5 | D-9 | 10/90 | G-7 | F-1 |
| Example 138 | Resin B (13) | Resin C (13) | B/C = 95/5 | D-9 | 10/90 | G-7 | F-1 |
| Example 139 | Resin B (22) | Resin C (22) | B/C = 95/5 | D-9 | 10/90 | G-7 | F-1 |
| Example 140 | Resin B (23) | Resin C (23) | B/C = 95/5 | D-9 | 10/90 | G-7 | F-1 |
| Example 141 | Resin B (25) | Resin C (25) | B/C = 95/5 | D-9 | 10/90 | G-7 | F-1 |
| Example 142 | Resin B (29) | Resin C (29) | B/C = 95/5 | D-9 | 10/90 | G-7 | F-1 |
| Example 143 | Resin B (37) | Resin C (37) | B/C = 95/5 | D-9 | 10/90 | G-7 | F-1 |
| Example 144 | Resin B (38) | Resin C (38) | B/C = 95/5 | D-9 | 10/90 | G-7 | F-1 |
| Example 145 | Resin B (1) | Resin C (1) | B/C = 95/5 | D-4 | 10/90 | G-7 | F-1 |
| Example 146 | Resin B (1) | Resin C (51) | B/C = 95/5 | D-4 | 10/90 | G-7 | F-1 |
| Example 147 | Resin B (1) | Resin C (52) | B/C = 95/5 | D-4 | 10/90 | G-7 | F-1 |
| Example 148 | Resin B (2) | Resin C (2) | B/C = 95/5 | D-4 | 10/90 | G-7 | F-1 |
| Example 149 | Resin B (6) | Resin C (6) | B/C = 95/5 | D-4 | 10/90 | G-7 | F-1 |
| Example 150 | Resin B (13) | Resin C (13) | B/C = 95/5 | D-4 | 10/90 | G-7 | F-1 |

TABLE 7

| Example | Siloxane-containing polyester resins | | | Additional resin | Mixing ratio of siloxane-containing polyester resins to additional resin | CTM | Resin included in lower layer in contact with surface layer |
| | Resin B | Resin C | Mixing ratio of resin B to resin C | | | | |
|---|---|---|---|---|---|---|---|
| Example 151 | Resin B(22) | Resin C(22) | B/C = 95/5 | D-4 | 10/90 | G-7 | F-1 |
| Example 152 | Resin B(23) | Resin C(23) | B/C = 95/5 | D-4 | 10/90 | G-7 | F-1 |
| Example 153 | Resin B(25) | Resin C(25) | B/C = 95/5 | D-4 | 10/90 | G-7 | F-1 |
| Example 154 | Resin B(29) | Resin C(29) | B/C = 95/5 | D-4 | 10/90 | G-7 | F-1 |
| Example 155 | Resin B(37) | Resin C(37) | B/C = 95/5 | D-4 | 10/90 | G-7 | F-1 |
| Example 156 | Resin B(38) | Resin C(38) | B/C = 95/5 | D-4 | 10/90 | G-7 | F-1 |
| Example 157 | Resin B(1) | Resin C(1) | B/C = 95/5 | D-8 | 10/90 | G-7 | F-1 |
| Example 158 | Resin B(1) | Resin C(51) | B/C = 95/5 | D-8 | 10/90 | G-7 | F-1 |
| Example 159 | Resin B(1) | Resin C(52) | B/C = 95/5 | D-8 | 10/90 | G-7 | F-1 |
| Example 160 | Resin B(2) | Resin C(2) | B/C = 95/5 | D-8 | 10/90 | G-7 | F-1 |
| Example 161 | Resin B(6) | Resin C(6) | B/C = 95/5 | D-8 | 10/90 | G-7 | F-1 |
| Example 162 | Resin B(13) | Resin C(13) | B/C = 95/5 | D-8 | 10/90 | G-7 | F-1 |
| Example 163 | Resin B(22) | Resin C(22) | B/C = 95/5 | D-8 | 10/90 | G-7 | F-1 |
| Example 164 | Resin B(23) | Resin C(23) | B/C = 95/5 | D-8 | 10/90 | G-7 | F-1 |
| Example 165 | Resin B(25) | Resin C(25) | B/C = 95/5 | D-8 | 10/90 | G-7 | F-1 |
| Example 166 | Resin B(29) | Resin C(29) | B/C = 95/5 | D-8 | 10/90 | G-7 | F-1 |
| Example 167 | Resin B(37) | Resin C(37) | B/C = 95/5 | D-8 | 10/90 | G-7 | F-1 |
| Example 168 | Resin B(38) | Resin C(38) | B/C = 95/5 | D-8 | 10/90 | G-7 | F-1 |
| Example 169 | Resin B(1) | Resin C(1) | B/C = 95/5 | E-2 | 1/99 | G-7 | F-1 |
| Example 170 | Resin B(2) | Resin C(2) | B/C = 95/5 | E-2 | 1/99 | G-7 | F-1 |
| Example 171 | Resin B(15) | Resin C(15) | B/C = 95/5 | E-2 | 1/99 | G-7 | F-1 |
| Example 172 | Resin B(16) | Resin C(16) | B/C = 95/5 | E-2 | 1/99 | G-7 | F-1 |
| Example 173 | Resin B(1) | Resin C(1) | B/C = 95/5 | E-2 | 5/95 | G-7 | F-1 |
| Example 174 | Resin B(2) | Resin C(2) | B/C = 95/5 | E-2 | 5/95 | G-7 | F-1 |
| Example 175 | Resin B(15) | Resin C(15) | B/C = 95/5 | E-2 | 5/95 | G-7 | F-1 |
| Example 176 | Resin B(16) | Resin C(16) | B/C = 95/5 | E-2 | 5/95 | G-7 | F-1 |
| Example 177 | Resin B(1) | Resin C(1) | B/C = 95/5 | E-2 | 50/50 | G-7 | F-1 |
| Example 178 | Resin B(6) | Resin C(6) | B/C = 95/5 | E-2 | 50/50 | G-7 | F-1 |
| Example 179 | Resin B(17) | Resin C(17) | B/C = 95/5 | E-2 | 50/50 | G-7 | F-1 |
| Example 180 | Resin B(19) | Resin C(19) | B/C = 95/5 | E-2 | 50/50 | G-7 | F-1 |
| Example 181 | Resin B(21) | Resin C(21) | B/C = 95/5 | E-2 | 50/50 | G-7 | F-1 |
| Example 182 | Resin B(1) | Resin C(1) | B/C = 95/5 | — | 100/0 | G-7 | F-1 |
| Example 183 | Resin B(6) | Resin C(6) | B/C = 95/5 | — | 100/0 | G-7 | F-1 |
| Example 184 | Resin B(17) | Resin C(17) | B/C = 95/5 | — | 100/0 | G-7 | F-1 |
| Example 185 | Resin B(19) | Resin C(19) | B/C = 95/5 | — | 100/0 | G-7 | F-1 |
| Example 186 | Resin B(21) | Resin C(21) | B/C = 95/5 | — | 100/0 | G-7 | F-1 |

TABLE 7-continued

| Example | Siloxane-containing polyester resins | | | Additional resin | Mixing ratio of siloxane-containing polyester resins to additional resin | CTM | Resin included in lower layer in contact with surface layer |
| --- | --- | --- | --- | --- | --- | --- | --- |
| | Resin B | Resin C | Mixing ratio of resin B to resin C | | | | |
| Example 187 | Resin B(1) | Resin C(1) | B/C = 95/5 | E-2 | 10/90 | G-1 | F-1 |
| Example 188 | Resin B(1) | Resin C(51) | B/C = 95/5 | E-2 | 10/90 | G-1 | F-1 |
| Example 189 | Resin B(1) | Resin C(52) | B/C = 95/5 | E-2 | 10/90 | G-1 | F-1 |
| Example 190 | Resin B(2) | Resin C(2) | B/C = 95/5 | E-2 | 10/90 | G-1 | F-1 |
| Example 191 | Resin B(2) | Resin C(53) | B/C = 95/5 | E-2 | 10/90 | G-1 | F-1 |
| Example 192 | Resin B(2) | Resin C(54) | B/C = 95/5 | E-2 | 10/90 | G-1 | F-1 |
| Example 193 | Resin B(6) | Resin C(6) | B/C = 95/5 | E-2 | 10/90 | G-1 | F-1 |
| Example 194 | Resin B(6) | Resin C(55) | B/C = 95/5 | E-2 | 10/90 | G-1 | F-1 |
| Example 195 | Resin B(6) | Resin C(56) | B/C = 95/5 | E-2 | 10/90 | G-1 | F-1 |
| Example 196 | Resin B(13) | Resin C(13) | B/C = 95/5 | E-2 | 10/90 | G-1 | F-1 |
| Example 197 | Resin B(13) | Resin C(57) | B/C = 95/5 | E-2 | 10/90 | G-1 | F-1 |
| Example 198 | Resin B(13) | Resin C(58) | B/C = 95/5 | E-2 | 10/90 | G-1 | F-1 |
| Example 199 | Resin B(22) | Resin C(22) | B/C = 95/5 | E-2 | 10/90 | G-1 | F-1 |
| Example 200 | Resin B(22) | Resin C(59) | B/C = 95/5 | E-2 | 10/90 | G-1 | F-1 |
| Example 201 | Resin B(22) | Resin C(60) | B/C = 95/5 | E-2 | 10/90 | G-1 | F-1 |
| Example 202 | Resin B(23) | Resin C(23) | B/C = 95/5 | E-2 | 10/90 | G-1 | F-1 |
| Example 203 | Resin B(23) | Resin C(61) | B/C = 95/5 | E-2 | 10/90 | G-1 | F-1 |
| Example 204 | Resin B(23) | Resin C(62) | B/C = 95/5 | E-2 | 10/90 | G-1 | F-1 |
| Example 205 | Resin B(25) | Resin C(25) | B/C = 95/5 | E-2 | 10/90 | G-1 | F-1 |
| Example 206 | Resin B(25) | Resin C(63) | B/C = 95/5 | E-2 | 10/90 | G-1 | F-1 |
| Example 207 | Resin B(25) | Resin C(64) | B/C = 95/5 | E-2 | 10/90 | G-1 | F-1 |
| Example 208 | Resin B(29) | Resin C(29) | B/C = 95/5 | E-2 | 10/90 | G-1 | F-1 |
| Example 209 | Resin B(29) | Resin C(65) | B/C = 95/5 | E-2 | 10/90 | G-1 | F-1 |
| Example 210 | Resin B(29) | Resin C(66) | B/C = 95/5 | E-2 | 10/90 | G-1 | F-1 |
| Example 211 | Resin B(37) | Resin C(37) | B/C = 95/5 | E-2 | 10/90 | G-1 | F-1 |
| Example 212 | Resin B(38) | Resin C(38) | B/C = 95/5 | E-2 | 10/90 | G-1 | F-1 |
| Example 213 | Resin B(1) | Resin C(1) | B/C = 95/5 | E-3 | 10/90 | G-1 | F-1 |
| Example 214 | Resin B(1) | Resin C(51) | B/C = 95/5 | E-3 | 10/90 | G-1 | F-1 |
| Example 215 | Resin B(1) | Resin C(52) | B/C = 95/5 | E-3 | 10/90 | G-1 | F-1 |
| Example 216 | Resin B(2) | Resin C(2) | B/C = 95/5 | E-3 | 10/90 | G-1 | F-1 |
| Example 217 | Resin B(6) | Resin C(6) | B/C = 95/5 | E-3 | 10/90 | G-1 | F-1 |
| Example 218 | Resin B(13) | Resin C(13) | B/C = 95/5 | E-3 | 10/90 | G-1 | F-1 |
| Example 219 | Resin B(22) | Resin C(22) | B/C = 95/5 | E-3 | 10/90 | G-1 | F-1 |
| Example 220 | Resin B(23) | Resin C(23) | B/C = 95/5 | E-3 | 10/90 | G-1 | F-1 |
| Example 221 | Resin B(25) | Resin C(25) | B/C = 95/5 | E-3 | 10/90 | G-1 | F-1 |
| Example 222 | Resin B(29) | Resin C(29) | B/C = 95/5 | E-3 | 10/90 | G-1 | F-1 |
| Example 223 | Resin B(37) | Resin C(37) | B/C = 95/5 | E-3 | 10/90 | G-1 | F-1 |
| Example 224 | Resin B(38) | Resin C(38) | B/C = 95/5 | E-3 | 10/90 | G-1 | F-1 |
| Example 225 | Resin B(1) | Resin C(1) | B/C = 95/5 | E-9 | 10/90 | G-1 | F-1 |

TABLE 8

| Example | Siloxane-containing polyester resins | | | Additional resin | Mixing ratio of siloxane-containing polyester resins to additional resin | CTM | Resin included in lower layer in contact with surface layer |
| --- | --- | --- | --- | --- | --- | --- | --- |
| | Resin B | Resin C | Mixing ratio of resin B to resin C | | | | |
| Example 226 | Resin B(1) | Resin C(51) | B/C = 95/5 | E-9 | 10/90 | G-1 | F-1 |
| Example 227 | Resin B(1) | Resin C(52) | B/C = 95/5 | E-9 | 10/90 | G-1 | F-1 |
| Example 228 | Resin B(2) | Resin C(2) | B/C = 95/5 | E-9 | 10/90 | G-1 | F-1 |
| Example 229 | Resin B(6) | Resin C(6) | B/C = 95/5 | E-9 | 10/90 | G-1 | F-1 |
| Example 230 | Resin B(13) | Resin C(13) | B/C = 95/5 | E-9 | 10/90 | G-1 | F-1 |
| Example 231 | Resin B(22) | Resin C(22) | B/C = 95/5 | E-9 | 10/90 | G-1 | F-1 |
| Example 232 | Resin B(23) | Resin C(23) | B/C = 95/5 | E-9 | 10/90 | G-1 | F-1 |
| Example 233 | Resin B(25) | Resin C(25) | B/C = 95/5 | E-9 | 10/90 | G-1 | F-1 |
| Example 234 | Resin B(29) | Resin C(29) | B/C = 95/5 | E-9 | 10/90 | G-1 | F-1 |
| Example 235 | Resin B(37) | Resin C(37) | B/C = 95/5 | E-9 | 10/90 | G-1 | F-1 |
| Example 236 | Resin B(38) | Resin C(38) | B/C = 95/5 | E-9 | 10/90 | G-1 | F-1 |
| Example 237 | Resin B(1) | Resin C(1) | B/C = 95/5 | D-7 | 10/90 | G-1 | F-1 |
| Example 238 | Resin B(1) | Resin C(51) | B/C = 95/5 | D-7 | 10/90 | G-1 | F-1 |
| Example 239 | Resin B(1) | Resin C(52) | B/C = 95/5 | D-7 | 10/90 | G-1 | F-1 |
| Example 240 | Resin B(2) | Resin C(2) | B/C = 95/5 | D-7 | 10/90 | G-1 | F-1 |
| Example 241 | Resin B(6) | Resin C(6) | B/C = 95/5 | D-7 | 10/90 | G-1 | F-1 |
| Example 242 | Resin B(13) | Resin C(13) | B/C = 95/5 | D-7 | 10/90 | G-1 | F-1 |
| Example 243 | Resin B(22) | Resin C(22) | B/C = 95/5 | D-7 | 10/90 | G-1 | F-1 |
| Example 244 | Resin B(23) | Resin C(23) | B/C = 95/5 | D-7 | 10/90 | G-1 | F-1 |
| Example 245 | Resin B(25) | Resin C(25) | B/C = 95/5 | D-7 | 10/90 | G-1 | F-1 |
| Example 246 | Resin B(29) | Resin C(29) | B/C = 95/5 | D-7 | 10/90 | G-1 | F-1 |
| Example 247 | Resin B(37) | Resin C(37) | B/C = 95/5 | D-7 | 10/90 | G-1 | F-1 |
| Example 248 | Resin B(38) | Resin C(38) | B/C = 95/5 | D-7 | 10/90 | G-1 | F-1 |

TABLE 8-continued

| | Siloxane-containing polyester resins | | | | Mixing ratio of | | Resin included |
|---|---|---|---|---|---|---|---|
| Example | Resin B | Resin C | Mixing ratio of resin B to resin C | Additional resin | siloxane-containing polyester resins to additional resin | CTM | in lower layer in contact with surface layer |
| Example 249 | Resin B(1) | Resin C(1) | B/C = 95/5 | D-1 | 10/90 | G-1 | F-1 |
| Example 250 | Resin B(1) | Resin C(51) | B/C = 95/5 | D-1 | 10/90 | G-1 | F-1 |
| Example 251 | Resin B(1) | Resin C(52) | B/C = 95/5 | D-1 | 10/90 | G-1 | F-1 |
| Example 252 | Resin B(2) | Resin C(2) | B/C = 95/5 | D-1 | 10/90 | G-1 | F-1 |
| Example 253 | Resin B(6) | Resin C(6) | B/C = 95/5 | D-1 | 10/90 | G-1 | F-1 |
| Example 254 | Resin B(13) | Resin C(13) | B/C = 95/5 | D-1 | 10/90 | G-1 | F-1 |
| Example 255 | Resin B(22) | Resin C(22) | B/C = 95/5 | D-1 | 10/90 | G-1 | F-1 |
| Example 256 | Resin B(23) | Resin C(23) | B/C = 95/5 | D-1 | 10/90 | G-1 | F-1 |
| Example 257 | Resin B(25) | Resin C(25) | B/C = 95/5 | D-1 | 10/90 | G-1 | F-1 |
| Example 258 | Resin B(29) | Resin C(29) | B/C = 95/5 | D-1 | 10/90 | G-1 | F-1 |
| Example 259 | Resin B(37) | Resin C(37) | B/C = 95/5 | D-1 | 10/90 | G-1 | F-1 |
| Example 260 | Resin B(38) | Resin C(38) | B/C = 95/5 | D-1 | 10/90 | G-1 | F-1 |
| Example 261 | Resin B(1) | Resin C(1) | B/C = 95/5 | D-9 | 10/90 | G-1 | F-1 |
| Example 262 | Resin B(1) | Resin C(51) | B/C = 95/5 | D-9 | 10/90 | G-1 | F-1 |
| Example 263 | Resin B(1) | Resin C(52) | B/C = 95/5 | D-9 | 10/90 | G-1 | F-1 |
| Example 264 | Resin B(2) | Resin C(2) | B/C = 95/5 | D-9 | 10/90 | G-1 | F-1 |
| Example 265 | Resin B(6) | Resin C(6) | B/C = 95/5 | D-9 | 10/90 | G-1 | F-1 |
| Example 266 | Resin B(13) | Resin C(13) | B/C = 95/5 | D-9 | 10/90 | G-1 | F-1 |
| Example 267 | Resin B(22) | Resin C(22) | B/C = 95/5 | D-9 | 10/90 | G-1 | F-1 |
| Example 268 | Resin B(23) | Resin C(23) | B/C = 95/5 | D-9 | 10/90 | G-1 | F-1 |
| Example 269 | Resin B(25) | Resin C(25) | B/C = 95/5 | D-9 | 10/90 | G-1 | F-1 |
| Example 270 | Resin B(29) | Resin C(29) | B/C = 95/5 | D-9 | 10/90 | G-1 | F-1 |
| Example 271 | Resin B(37) | Resin C(37) | B/C = 95/5 | D-9 | 10/90 | G-1 | F-1 |
| Example 272 | Resin B(38) | Resin C(38) | B/C = 95/5 | D-9 | 10/90 | G-1 | F-1 |
| Example 273 | Resin B(1) | Resin C(1) | B/C = 95/5 | D-4 | 10/90 | G-1 | F-1 |
| Example 274 | Resin B(1) | Resin C(51) | B/C = 95/5 | D-4 | 10/90 | G-1 | F-1 |
| Example 275 | Resin B(1) | Resin C(52) | B/C = 95/5 | D-4 | 10/90 | G-1 | F-1 |
| Example 276 | Resin B(2) | Resin C(2) | B/C = 95/5 | D-4 | 10/90 | G-1 | F-1 |
| Example 277 | Resin B(6) | Resin C(6) | B/C = 95/5 | D-4 | 10/90 | G-1 | F-1 |
| Example 278 | Resin B(13) | Resin C(13) | B/C = 95/5 | D-4 | 10/90 | G-1 | F-1 |
| Example 279 | Resin B(22) | Resin C(22) | B/C = 95/5 | D-4 | 10/90 | G-1 | F-1 |
| Example 280 | Resin B(23) | Resin C(23) | B/C = 95/5 | D-4 | 10/90 | G-1 | F-1 |
| Example 281 | Resin B(25) | Resin C(25) | B/C = 95/5 | D-4 | 10/90 | G-1 | F-1 |
| Example 282 | Resin B(29) | Resin C(29) | B/C = 95/5 | D-4 | 10/90 | G-1 | F-1 |
| Example 283 | Resin B(37) | Resin C(37) | B/C = 95/5 | D-4 | 10/90 | G-1 | F-1 |
| Example 284 | Resin B(38) | Resin C(38) | B/C = 95/5 | D-4 | 10/90 | G-1 | F-1 |
| Example 285 | Resin B(1) | Resin C(1) | B/C = 95/5 | D-8 | 10/90 | G-1 | F-1 |
| Example 286 | Resin B(1) | Resin C(51) | B/C = 95/5 | D-8 | 10/90 | G-1 | F-1 |
| Example 287 | Resin B(1) | Resin C(52) | B/C = 95/5 | D-8 | 10/90 | G-1 | F-1 |
| Example 288 | Resin B(2) | Resin C(2) | B/C = 95/5 | D-8 | 10/90 | G-1 | F-1 |
| Example 289 | Resin B(6) | Resin C(6) | B/C = 95/5 | D-8 | 10/90 | G-1 | F-1 |
| Example 290 | Resin B(13) | Resin C(13) | B/C = 95/5 | D-8 | 10/90 | G-1 | F-1 |
| Example 291 | Resin B(22) | Resin C(22) | B/C = 95/5 | D-8 | 10/90 | G-1 | F-1 |
| Example 292 | Resin B(23) | Resin C(23) | B/C = 95/5 | D-8 | 10/90 | G-1 | F-1 |
| Example 293 | Resin B(25) | Resin C(25) | B/C = 95/5 | D-8 | 10/90 | G-1 | F-1 |
| Example 294 | Resin B(29) | Resin C(29) | B/C = 95/5 | D-8 | 10/90 | G-1 | F-1 |
| Example 295 | Resin B(37) | Resin C(37) | B/C = 95/5 | D-8 | 10/90 | G-1 | F-1 |
| Example 296 | Resin B(38) | Resin C(38) | B/C = 95/5 | D-8 | 10/90 | G-1 | F-1 |
| Example 297 | Resin B(1) | Resin C(1) | B/C = 95/5 | E-2 | 5/95 | G-1 | F-1 |
| Example 298 | Resin B(1) | Resin C(1) | B/C = 95/5 | E-2 | 50/50 | G-1 | F-1 |
| Example 299 | Resin B(1) | Resin C(1) | B/C = 95/5 | — | 100/0 | G-1 | F-1 |
| Example 300 | Resin B(1) | Resin C(1) | B/C = 95/5 | E-2 | 10/90 | G-1 | F-2 |

TABLE 9

| | Siloxane-containing polyester resins | | | | Mixing ratio of | | Resin included |
|---|---|---|---|---|---|---|---|
| Example | Resin B | Resin C | Mixing ratio of resin B to resin C | Additional resin | siloxane-containing polyester resins to additional resin | CTM | in lower layer in contact with surface layer |
| Example 301 | Resin B(1) | Resin C(51) | B/C = 95/5 | E-2 | 10/90 | G-1 | F-2 |
| Example 302 | Resin B(1) | Resin C(52) | B/C = 95/5 | E-2 | 10/90 | G-1 | F-2 |
| Example 303 | Resin B(2) | Resin C(2) | B/C = 95/5 | E-2 | 10/90 | G-1 | F-2 |
| Example 304 | Resin B(6) | Resin C(6) | B/C = 95/5 | E-2 | 10/90 | G-1 | F-2 |
| Example 305 | Resin B(13) | Resin C(13) | B/C = 95/5 | E-2 | 10/90 | G-1 | F-2 |
| Example 306 | Resin B(22) | Resin C(22) | B/C = 95/5 | E-2 | 10/90 | G-1 | F-2 |
| Example 307 | Resin B(23) | Resin C(23) | B/C = 95/5 | E-2 | 10/90 | G-1 | F-2 |
| Example 308 | Resin B(25) | Resin C(25) | B/C = 95/5 | E-2 | 10/90 | G-1 | F-2 |
| Example 309 | Resin B(29) | Resin C(29) | B/C = 95/5 | E-2 | 10/90 | G-1 | F-2 |
| Example 310 | Resin B(37) | Resin C(37) | B/C = 95/5 | E-2 | 10/90 | G-1 | F-2 |

TABLE 9-continued

| | Siloxane-containing polyester resins | | | | Mixing ratio of | | Resin included |
| | | | Mixing ratio of resin B to resin C | Additional resin | siloxane-containing polyester resins to additional resin | | in lower layer in contact with surface layer |
| Example | Resin B | Resin C | | | | CTM | |
| --- | --- | --- | --- | --- | --- | --- | --- |
| Example 311 | Resin B(38) | Resin C(38) | B/C = 95/5 | E-2 | 10/90 | G-1 | F-2 |
| Example 312 | Resin B(1) | Resin C(1) | B/C = 95/5 | E-2 | 10/90 | G-1 | F-3 |
| Example 313 | Resin B(1) | Resin C(51) | B/C = 95/5 | E-2 | 10/90 | G-1 | F-3 |
| Example 314 | Resin B(1) | Resin C(52) | B/C = 95/5 | E-2 | 10/90 | G-1 | F-3 |
| Example 315 | Resin B(2) | Resin C(2) | B/C = 95/5 | E-2 | 10/90 | G-1 | F-3 |
| Example 316 | Resin B(6) | Resin C(6) | B/C = 95/5 | E-2 | 10/90 | G-1 | F-3 |
| Example 317 | Resin B(13) | Resin C(13) | B/C = 95/5 | E-2 | 10/90 | G-1 | F-3 |
| Example 318 | Resin B(22) | Resin C(22) | B/C = 95/5 | E-2 | 10/90 | G-1 | F-3 |
| Example 319 | Resin B(23) | Resin C(23) | B/C = 95/5 | E-2 | 10/90 | G-1 | F-3 |
| Example 320 | Resin B(25) | Resin C(25) | B/C = 95/5 | E-2 | 10/90 | G-1 | F-3 |
| Example 321 | Resin B(29) | Resin C(29) | B/C = 95/5 | E-2 | 10/90 | G-1 | F-3 |
| Example 322 | Resin B(37) | Resin C(37) | B/C = 95/5 | E-2 | 10/90 | G-1 | F-3 |
| Example 323 | Resin B(38) | Resin C(38) | B/C = 95/5 | E-2 | 10/90 | G-1 | F-3 |
| Example 324 | Resin B(1) | Resin C(1) | B/C = 95/5 | E-2 | 10/90 | G-7 | F-4 |
| Example 325 | Resin B(1) | Resin C(51) | B/C = 95/5 | E-2 | 10/90 | G-7 | F-4 |
| Example 326 | Resin B(1) | Resin C(52) | B/C = 95/5 | E-2 | 10/90 | G-7 | F-4 |
| Example 327 | Resin B(2) | Resin C(2) | B/C = 95/5 | E-2 | 10/90 | G-7 | F-4 |
| Example 328 | Resin B(6) | Resin C(6) | B/C = 95/5 | E-2 | 10/90 | G-7 | F-4 |
| Example 329 | Resin B(13) | Resin C(13) | B/C = 95/5 | E-2 | 10/90 | G-7 | F-4 |
| Example 330 | Resin B(22) | Resin C(22) | B/C = 95/5 | E-2 | 10/90 | G-7 | F-4 |
| Example 331 | Resin B(23) | Resin C(23) | B/C = 95/5 | E-2 | 10/90 | G-7 | F-4 |
| Example 332 | Resin B(25) | Resin C(25) | B/C = 95/5 | E-2 | 10/90 | G-7 | F-4 |
| Example 333 | Resin B(29) | Resin C(29) | B/C = 95/5 | E-2 | 10/90 | G-7 | F-4 |
| Example 334 | Resin B(37) | Resin C(37) | B/C = 95/5 | E-2 | 10/90 | G-7 | F-4 |
| Example 335 | Resin B(38) | Resin C(38) | B/C = 95/5 | E-2 | 10/90 | G-7 | F-4 |
| Example 336 | Resin B(1) | Resin C(1) | B/C = 95/5 | E-2 | 10/90 | G-7 | F-5 |
| Example 337 | Resin B(1) | Resin C(51) | B/C = 95/5 | E-2 | 10/90 | G-7 | F-5 |
| Example 338 | Resin B(1) | Resin C(52) | B/C = 95/5 | E-2 | 10/90 | G-7 | F-5 |
| Example 339 | Resin B(2) | Resin C(2) | B/C = 95/5 | E-2 | 10/90 | G-7 | F-5 |
| Example 340 | Resin B(6) | Resin C(6) | B/C = 95/5 | E-2 | 10/90 | G-7 | F-5 |
| Example 341 | Resin B(13) | Resin C(13) | B/C = 95/5 | E-2 | 10/90 | G-7 | F-5 |
| Example 342 | Resin B(22) | Resin C(22) | B/C = 95/5 | E-2 | 10/90 | G-7 | F-5 |
| Example 343 | Resin B(23) | Resin C(23) | B/C = 95/5 | E-2 | 10/90 | G-7 | F-5 |
| Example 344 | Resin B(25) | Resin C(25) | B/C = 95/5 | E-2 | 10/90 | G-7 | F-5 |
| Example 345 | Resin B(29) | Resin C(29) | B/C = 95/5 | E-2 | 10/90 | G-7 | F-5 |
| Example 346 | Resin B(37) | Resin C(37) | B/C = 95/5 | E-2 | 10/90 | G-7 | F-5 |
| Example 347 | Resin B(38) | Resin C(38) | B/C = 95/5 | E-2 | 10/90 | G-7 | F-5 |
| Example 348 | Resin B(1) | Resin C(1) | B/C = 95/5 | E-2 | 10/90 | G-7 | F-6 |
| Example 349 | Resin B(1) | Resin C(51) | B/C = 95/5 | E-2 | 10/90 | G-7 | F-6 |
| Example 350 | Resin B(1) | Resin C(52) | B/C = 95/5 | E-2 | 10/90 | G-7 | F-6 |
| Example 351 | Resin B(2) | Resin C(2) | B/C = 95/5 | E-2 | 10/90 | G-7 | F-6 |
| Example 352 | Resin B(6) | Resin C(6) | B/C = 95/5 | E-2 | 10/90 | G-7 | F-6 |
| Example 353 | Resin B(13) | Resin C(13) | B/C = 95/5 | E-2 | 10/90 | G-7 | F-6 |
| Example 354 | Resin B(22) | Resin C(22) | B/C = 95/5 | E-2 | 10/90 | G-7 | F-6 |
| Example 355 | Resin B(23) | Resin C(23) | B/C = 95/5 | E-2 | 10/90 | G-7 | F-6 |
| Example 356 | Resin B(25) | Resin C(25) | B/C = 95/5 | E-2 | 10/90 | G-7 | F-6 |
| Example 357 | Resin B(29) | Resin C(29) | B/C = 95/5 | E-2 | 10/90 | G-7 | F-6 |
| Example 358 | Resin B(37) | Resin C(37) | B/C = 95/5 | E-2 | 10/90 | G-7 | F-6 |
| Example 359 | Resin B(38) | Resin C(38) | B/C = 95/5 | E-2 | 10/90 | G-7 | F-6 |
| Example 360 | Resin B(1) | Resin C(1) | B/C = 95/5 | E-2 | 10/90 | G-7 | F-7 |
| Example 361 | Resin B(1) | Resin C(51) | B/C = 95/5 | E-2 | 10/90 | G-7 | F-7 |
| Example 362 | Resin B(1) | Resin C(52) | B/C = 95/5 | E-2 | 10/90 | G-7 | F-7 |
| Example 363 | Resin B(2) | Resin C(2) | B/C = 95/5 | E-2 | 10/90 | G-7 | F-7 |
| Example 364 | Resin B(6) | Resin C(6) | B/C = 95/5 | E-2 | 10/90 | G-7 | F-7 |
| Example 365 | Resin B(13) | Resin C(13) | B/C = 95/5 | E-2 | 10/90 | G-7 | F-7 |
| Example 366 | Resin B(22) | Resin C(22) | B/C = 95/5 | E-2 | 10/90 | G-7 | F-7 |
| Example 367 | Resin B(23) | Resin C(23) | B/C = 95/5 | E-2 | 10/90 | G-7 | F-7 |
| Example 368 | Resin B(25) | Resin C(25) | B/C = 95/5 | E-2 | 10/90 | G-7 | F-7 |
| Example 369 | Resin B(29) | Resin C(29) | B/C = 95/5 | E-2 | 10/90 | G-7 | F-7 |
| Example 370 | Resin B(37) | Resin C(37) | B/C = 95/5 | E-2 | 10/90 | G-7 | F-7 |
| Example 371 | Resin B(38) | Resin C(38) | B/C = 95/5 | E-2 | 10/90 | G-7 | F-7 |
| Example 372 | Resin B(1) | Resin C(1) | B/C = 95/5 | E-2 | 10/90 | G-7 | F-8 |
| Example 373 | Resin B(1) | Resin C(51) | B/C = 95/5 | E-2 | 10/90 | G-7 | F-8 |
| Example 374 | Resin B(1) | Resin C(52) | B/C = 95/5 | E-2 | 10/90 | G-7 | F-8 |
| Example 375 | Resin B(2) | Resin C(2) | B/C = 95/5 | E-2 | 10/90 | G-7 | F-8 |

TABLE 10

| Example | Siloxane-containing polyester resins | | | Additional resin | Mixing ratio of siloxane-containing polyester resins to additional resin | CTM | Resin included in lower layer in contact with surface layer |
|---|---|---|---|---|---|---|---|
| | Resin B | Resin C | Mixing ratio of resin B to resin C | | | | |
| Example 376 | Resin B(6) | Resin C(6) | B/C = 95/5 | E-2 | 10/90 | G-7 | F-8 |
| Example 377 | Resin B(13) | Resin C(13) | B/C = 95/5 | E-2 | 10/90 | G-7 | F-8 |
| Example 378 | Resin B(22) | Resin C(22) | B/C = 95/5 | E-2 | 10/90 | G-7 | F-8 |
| Example 379 | Resin B(23) | Resin C(23) | B/C = 95/5 | E-2 | 10/90 | G-7 | F-8 |
| Example 380 | Resin B(25) | Resin C(25) | B/C = 95/5 | E-2 | 10/90 | G-7 | F-8 |
| Example 381 | Resin B(29) | Resin C(29) | B/C = 95/5 | E-2 | 10/90 | G-7 | F-8 |
| Example 382 | Resin B(37) | Resin C(37) | B/C = 95/5 | E-2 | 10/90 | G-7 | F-8 |
| Example 383 | Resin B(38) | Resin C(38) | B/C = 95/5 | E-2 | 10/90 | G-7 | F-8 |
| Example 384 | Resin B(1) | Resin C(1) | B/C = 95/5 | E-2 | 10/90 | G-7 | F-9 |
| Example 385 | Resin B(1) | Resin C(51) | B/C = 95/5 | E-2 | 10/90 | G-7 | F-9 |
| Example 386 | Resin B(1) | Resin C(52) | B/C = 95/5 | E-2 | 10/90 | G-7 | F-9 |
| Example 387 | Resin B(2) | Resin C(2) | B/C = 95/5 | E-2 | 10/90 | G-7 | F-9 |
| Example 388 | Resin B(6) | Resin C(6) | B/C = 95/5 | E-2 | 10/90 | G-7 | F-9 |
| Example 389 | Resin B(13) | Resin C(13) | B/C = 95/5 | E-2 | 10/90 | G-7 | F-9 |
| Example 390 | Resin B(22) | Resin C(22) | B/C = 95/5 | E-2 | 10/90 | G-7 | F-9 |
| Example 391 | Resin B(23) | Resin C(23) | B/C = 95/5 | E-2 | 10/90 | G-7 | F-9 |
| Example 392 | Resin B(25) | Resin C(25) | B/C = 95/5 | E-2 | 10/90 | G-7 | F-9 |
| Example 393 | Resin B(29) | Resin C(29) | B/C = 95/5 | E-2 | 10/90 | G-7 | F-9 |
| Example 394 | Resin B(37) | Resin C(37) | B/C = 95/5 | E-2 | 10/90 | G-7 | F-9 |
| Example 395 | Resin B(38) | Resin C(38) | B/C = 95/5 | E-2 | 10/90 | G-7 | F-9 |
| Example 396 | Resin B(1) | Resin C(1) | B/C = 100/0 | E-2 | 10/90 | G-7 | F-1 |
| Example 397 | Resin B(1) | Resin C(1) | B/C = 0/100 | E-2 | 10/90 | G-7 | F-1 |
| Example 398 | | Resin M | | E-2 | 10/90 | G-7 | F-1 |

TABLE 11

| Example | Siloxane-containing polyester resins | | | Additional resin | Mixing ratio of siloxane-containing polyester resins to additional resin | CTM | Resin included in lower layer in contact with surface layer |
|---|---|---|---|---|---|---|---|
| | Resin B | Resin C | Mixing ratio of resin B to resin C | | | | |
| Example 399 | Resin B(1) | Resin C(1) | B/C = 95/5 | E-2 | 50/50 | G-1 | E-2 |
| Example 400 | Resin B(1) | Resin C(51) | B/C = 95/5 | E-2 | 50/50 | G-1 | E-2 |
| Example 401 | Resin B(1) | Resin C(52) | B/C = 95/5 | E-2 | 50/50 | G-1 | E-2 |
| Example 402 | Resin B(2) | Resin C(2) | B/C = 95/5 | E-2 | 50/50 | G-1 | E-2 |
| Example 403 | Resin B(2) | Resin C(53) | B/C = 95/5 | E-2 | 50/50 | G-1 | E-2 |
| Example 404 | Resin B(2) | Resin C(54) | B/C = 95/5 | E-2 | 50/50 | G-1 | E-2 |
| Example 405 | Resin B(3) | Resin C(3) | B/C = 95/5 | E-2 | 50/50 | G-1 | E-2 |
| Example 406 | Resin B(4) | Resin C(4) | B/C = 95/5 | E-2 | 50/50 | G-1 | E-2 |
| Example 407 | Resin B(5) | Resin C(5) | B/C = 95/5 | E-2 | 50/50 | G-1 | E-2 |
| Example 408 | Resin B(6) | Resin C(6) | B/C = 95/5 | E-2 | 50/50 | G-1 | E-2 |
| Example 409 | Resin B(6) | Resin C(55) | B/C = 95/5 | E-2 | 50/50 | G-1 | E-2 |
| Example 410 | Resin B(6) | Resin C(56) | B/C = 95/5 | E-2 | 50/50 | G-1 | E-2 |
| Example 411 | Resin B(13) | Resin C(13) | B/C = 95/5 | E-2 | 50/50 | G-1 | E-2 |
| Example 412 | Resin B(13) | Resin C(57) | B/C = 95/5 | E-2 | 50/50 | G-1 | E-2 |
| Example 413 | Resin B(13) | Resin C(58) | B/C = 95/5 | E-2 | 50/50 | G-1 | E-2 |
| Example 414 | Resin B(22) | Resin C(22) | B/C = 95/5 | E-2 | 50/50 | G-1 | E-2 |
| Example 415 | Resin B(22) | Resin C(59) | B/C = 95/5 | E-2 | 50/50 | G-1 | E-2 |
| Example 416 | Resin B(22) | Resin C(60) | B/C = 95/5 | E-2 | 50/50 | G-1 | E-2 |
| Example 417 | Resin B(23) | Resin C(23) | B/C = 95/5 | E-2 | 50/50 | G-1 | E-2 |
| Example 418 | Resin B(23) | Resin C(61) | B/C = 95/5 | E-2 | 50/50 | G-1 | E-2 |
| Example 419 | Resin B(23) | Resin C(62) | B/C = 95/5 | E-2 | 50/50 | G-1 | E-2 |
| Example 420 | Resin B(25) | Resin C(25) | B/C = 95/5 | E-2 | 50/50 | G-1 | E-2 |
| Example 421 | Resin B(25) | Resin C(63) | B/C = 95/5 | E-2 | 50/50 | G-1 | E-2 |
| Example 422 | Resin B(25) | Resin C(64) | B/C = 95/5 | E-2 | 50/50 | G-1 | E-2 |
| Example 423 | Resin B(29) | Resin C(29) | B/C = 95/5 | E-2 | 50/50 | G-1 | E-2 |
| Example 424 | Resin B(29) | Resin C(65) | B/C = 95/5 | E-2 | 50/50 | G-1 | E-2 |
| Example 425 | Resin B(29) | Resin C(66) | B/C = 95/5 | E-2 | 50/50 | G-1 | E-2 |
| Example 426 | Resin B(1) | Resin C(1) | B/C = 95/5 | E-3 | 50/50 | G-1 | E-2 |
| Example 427 | Resin B(13) | Resin C(13) | B/C = 95/5 | E-3 | 50/50 | G-1 | E-2 |
| Example 428 | Resin B(1) | Resin C(1) | B/C = 95/5 | E-9 | 50/50 | G-1 | E-2 |
| Example 429 | Resin B(13) | Resin C(13) | B/C = 95/5 | E-9 | 50/50 | G-1 | E-2 |
| Example 430 | Resin B(1) | Resin C(1) | B/C = 95/5 | D-1 | 50/50 | G-1 | E-2 |
| Example 431 | Resin B(13) | Resin C(13) | B/C = 95/5 | D-1 | 50/50 | G-1 | E-2 |
| Example 432 | Resin B(1) | Resin C(1) | B/C = 95/5 | D-4 | 50/50 | G-1 | E-2 |
| Example 433 | Resin B(13) | Resin C(13) | B/C = 95/5 | D-4 | 50/50 | G-1 | E-2 |
| Example 434 | Resin B(1) | Resin C(1) | B/C = 95/5 | D-8 | 50/50 | G-1 | E-2 |
| Example 435 | Resin B(13) | Resin C(13) | B/C = 95/5 | D-8 | 50/50 | G-1 | E-2 |
| Example 436 | Resin B(1) | Resin C(1) | B/C = 95/5 | E-2 | 10/90 | G-1 | E-2 |
| Example 437 | Resin B(1) | Resin C(1) | B/C = 95/5 | — | 100/0 | G-1 | E-2 |

TABLE 11-continued

| Example | Siloxane-containing polyester resins | | Mixing ratio of resin B to resin C | Additional resin | Mixing ratio of siloxane-containing polyester resins to additional resin | CTM | Resin included in lower layer in contact with surface layer |
| --- | --- | --- | --- | --- | --- | --- | --- |
| | Resin B | Resin C | | | | | |
| Example 438 | Resin B(13) | Resin C(13) | B/C = 95/5 | E-2 | 10/90 | G-1 | E-2 |
| Example 439 | Resin B(13) | Resin C(13) | B/C = 95/5 | — | 100/0 | G-1 | E-2 |
| Example 440 | Resin B(1) | Resin C(1) | B/C = 95/5 | E-2 | 50/50 | G-1 | E-3 |
| Example 441 | Resin B(1) | Resin C(1) | B/C = 95/5 | E-2 | 50/50 | G-1 | E-9 |
| Example 442 | Resin B(1) | Resin C(1) | B/C = 95/5 | E-2 | 50/50 | G-1 | D-7 |
| Example 443 | Resin B(1) | Resin C(51) | B/C = 95/5 | E-2 | 50/50 | G-1 | D-7 |
| Example 444 | Resin B(1) | Resin C(52) | B/C = 95/5 | E-2 | 50/50 | G-1 | D-7 |
| Example 445 | Resin B(1) | Resin C(1) | B/C = 95/5 | E-2 | 50/50 | G-1 | D-1 |
| Example 446 | Resin B(1) | Resin C(1) | B/C = 95/5 | E-2 | 50/50 | G-1 | D-9 |
| Example 447 | Resin B(1) | Resin C(1) | B/C = 95/5 | E-2 | 50/50 | G-1 | D-4 |
| Example 448 | Resin B(1) | Resin C(1) | B/C = 95/5 | E-2 | 50/50 | G-1 | D-8 |
| Example 449 | Resin B(1) | Resin C(1) | B/C = 95/5 | E-2 | 50/50 | G-7 | E-2 |
| Example 450 | Resin B(1) | Resin C(51) | B/C = 95/5 | E-2 | 50/50 | G-7 | E-2 |
| Example 451 | Resin B(1) | Resin C(52) | B/C = 95/5 | E-2 | 50/50 | G-7 | E-2 |
| Example 452 | Resin B(2) | Resin C(2) | B/C = 95/5 | E-2 | 50/50 | G-7 | E-2 |
| Example 453 | Resin B(3) | Resin C(3) | B/C = 95/5 | E-2 | 50/50 | G-7 | E-2 |
| Example 454 | Resin B(4) | Resin C(4) | B/C = 95/5 | E-2 | 50/50 | G-7 | E-2 |
| Example 455 | Resin B(5) | Resin C(5) | B/C = 95/5 | E-2 | 50/50 | G-7 | E-2 |
| Example 456 | Resin B(6) | Resin C(6) | B/C = 95/5 | E-2 | 50/50 | G-7 | E-2 |
| Example 457 | Resin B(13) | Resin C(13) | B/C = 95/5 | E-2 | 50/50 | G-7 | E-2 |
| Example 458 | Resin B(22) | Resin C(22) | B/C = 95/5 | E-2 | 50/50 | G-7 | E-2 |
| Example 459 | Resin B(23) | Resin C(23) | B/C = 95/5 | E-2 | 50/50 | G-7 | E-2 |
| Example 460 | Resin B(25) | Resin C(25) | B/C = 95/5 | E-2 | 50/50 | G-7 | E-2 |
| Example 461 | Resin B(29) | Resin C(29) | B/C = 95/5 | E-2 | 50/50 | G-7 | E-2 |
| Example 462 | Resin B(1) | Resin C(1) | B/C = 95/5 | E-3 | 50/50 | G-7 | E-2 |
| Example 463 | Resin B(13) | Resin C(13) | B/C = 95/5 | E-3 | 50/50 | G-7 | E-2 |
| Example 464 | Resin B(1) | Resin C(1) | B/C = 95/5 | E-9 | 50/50 | G-7 | E-2 |
| Example 465 | Resin B(13) | Resin C(13) | B/C = 95/5 | E-9 | 50/50 | G-7 | E-2 |
| Example 466 | Resin B(1) | Resin C(1) | B/C = 95/5 | D-1 | 50/50 | G-7 | E-2 |
| Example 467 | Resin B(1) | Resin C(51) | B/C = 95/5 | D-1 | 50/50 | G-7 | E-2 |
| Example 468 | Resin B(1) | Resin C(52) | B/C = 95/5 | D-1 | 50/50 | G-7 | E-2 |
| Example 469 | Resin B(13) | Resin C(13) | B/C = 95/5 | D-1 | 50/50 | G-7 | E-2 |
| Example 470 | Resin B(1) | Resin C(1) | B/C = 95/5 | D-4 | 50/50 | G-7 | E-2 |
| Example 471 | Resin B(13) | Resin C(13) | B/C = 95/5 | D-4 | 50/50 | G-7 | E-2 |
| Example 472 | Resin B(1) | Resin C(1) | B/C = 95/5 | D-8 | 50/50 | G-7 | E-2 |
| Example 473 | Resin B(13) | Resin C(13) | B/C = 95/5 | D-8 | 50/50 | G-7 | E-2 |

TABLE 12

| Example | Siloxane-containing polyester resins | | Mixing ratio of resin B to resin C | Additional resin | Mixing ratio of siloxane-containing polyester resins to additional resin | CTM | Resin included in lower layer in contact with surface layer |
| --- | --- | --- | --- | --- | --- | --- | --- |
| | Resin B | Resin C | | | | | |
| Example 474 | Resin B(1) | Resin C(1) | B/C = 95/5 | E-2 | 10/90 | G-7 | E-2 |
| Example 475 | Resin B(1) | Resin C(1) | B/C = 95/5 | — | 100/0 | G-7 | E-2 |
| Example 476 | Resin B(13) | Resin C(13) | B/C = 95/5 | E-2 | 10/90 | G-7 | E-2 |
| Example 477 | Resin B(13) | Resin C(13) | B/C = 95/5 | — | 100/0 | G-7 | E-2 |
| Example 478 | Resin B(1) | Resin C(1) | B/C = 95/5 | E-2 | 50/50 | G-7 | E-3 |
| Example 479 | Resin B(1) | Resin C(1) | B/C = 95/5 | E-2 | 50/50 | G-7 | E-9 |
| Example 480 | Resin B(1) | Resin C(1) | B/C = 95/5 | E-2 | 50/50 | G-7 | D-7 |
| Example 481 | Resin B(1) | Resin C(51) | B/C = 95/5 | E-2 | 50/50 | G-7 | D-7 |
| Example 482 | Resin B(1) | Resin C(52) | B/C = 95/5 | E-2 | 50/50 | G-7 | D-7 |
| Example 483 | Resin B(1) | Resin C(1) | B/C = 95/5 | E-2 | 50/50 | G-7 | D-1 |
| Example 484 | Resin B(1) | Resin C(1) | B/C = 95/5 | E-2 | 50/50 | G-7 | D-9 |
| Example 485 | Resin B(1) | Resin C(1) | B/C = 95/5 | E-2 | 50/50 | G-7 | D-4 |
| Example 486 | Resin B(1) | Resin C(1) | B/C = 95/5 | E-2 | 50/50 | G-7 | D-8 |
| Example 487 | Resin B(1) | Resin C(1) | B/C = 100/0 | E-2 | 50/50 | G-1 | E-2 |
| Example 488 | Resin B(1) | Resin C(1) | B/C = 0/100 | E-2 | 50/50 | G-1 | E-2 |
| Example 489 | | Resin M | | E-2 | 50/50 | G-1 | E-2 |

The phrase "Mixing ratio of resin B to resin C" in Tables 5 to 12 means a mass ratio.

The phrase "Mixing ratio of siloxane-containing polyester resins to additional resin" in Tables 5 to 12 means a mass ratio of siloxane-containing polyester resins to an additional resin containing no siloxane structure. The term "CTM" in Tables 5 to 12 refers to a charge-transporting substance.

TABLE 13

| Example | Initial torque relative value | Evaluation of peeling resistance |
|---|---|---|
| Example 1 | 0.75 | A |
| Example 2 | 0.75 | A |
| Example 3 | 0.75 | A |
| Example 4 | 0.81 | A |
| Example 5 | 0.81 | A |
| Example 6 | 0.81 | A |
| Example 7 | 0.77 | A |
| Example 8 | 0.73 | A |
| Example 9 | 0.73 | B |
| Example 10 | 0.71 | B |
| Example 11 | 0.71 | B |
| Example 12 | 0.71 | B |
| Example 13 | 0.75 | A |
| Example 14 | 0.75 | A |
| Example 15 | 0.75 | A |
| Example 16 | 0.75 | A |
| Example 17 | 0.75 | A |
| Example 18 | 0.81 | A |
| Example 19 | 0.75 | A |
| Example 20 | 0.75 | A |
| Example 21 | 0.75 | A |
| Example 22 | 0.71 | B |
| Example 23 | 0.78 | A |
| Example 24 | 0.78 | A |
| Example 25 | 0.78 | A |
| Example 26 | 0.77 | A |
| Example 27 | 0.73 | A |
| Example 28 | 0.76 | A |
| Example 29 | 0.75 | B |
| Example 30 | 0.74 | B |
| Example 31 | 0.69 | B |
| Example 32 | 0.69 | B |
| Example 33 | 0.69 | B |
| Example 34 | 0.75 | A |
| Example 35 | 0.75 | A |
| Example 36 | 0.75 | A |
| Example 37 | 0.75 | A |
| Example 38 | 0.75 | A |
| Example 39 | 0.75 | A |
| Example 40 | 0.75 | A |
| Example 41 | 0.75 | A |
| Example 42 | 0.75 | A |
| Example 43 | 0.75 | A |
| Example 44 | 0.75 | A |
| Example 45 | 0.75 | A |
| Example 46 | 0.75 | A |
| Example 47 | 0.75 | A |
| Example 48 | 0.75 | A |
| Example 49 | 0.75 | A |
| Example 50 | 0.75 | A |
| Example 51 | 0.81 | A |
| Example 52 | 0.71 | B |
| Example 53 | 0.81 | A |
| Example 54 | 0.71 | B |
| Example 55 | 0.81 | A |
| Example 56 | 0.71 | B |
| Example 57 | 0.77 | A |
| Example 58 | 0.73 | A |
| Example 59 | 0.81 | A |
| Example 60 | 0.71 | B |
| Example 61 | 0.81 | A |
| Example 62 | 0.71 | B |
| Example 63 | 0.77 | A |
| Example 64 | 0.73 | A |
| Example 65 | 0.77 | A |
| Example 66 | 0.73 | A |
| Example 67 | 0.77 | A |
| Example 68 | 0.73 | A |
| Example 69 | 0.77 | A |
| Example 70 | 0.73 | A |
| Example 71 | 0.75 | A |
| Example 72 | 0.75 | A |
| Example 73 | 0.75 | A |
| Example 74 | 0.81 | A |
| Example 75 | 0.71 | B |
| Example 76 | 0.75 | A |
| Example 77 | 0.75 | A |
| Example 78 | 0.75 | A |
| Example 79 | 0.75 | A |
| Example 80 | 0.75 | A |
| Example 81 | 0.77 | A |
| Example 82 | 0.73 | A |
| Example 83 | 0.75 | A |
| Example 84 | 0.75 | A |
| Example 85 | 0.75 | A |
| Example 86 | 0.81 | A |
| Example 87 | 0.71 | B |
| Example 88 | 0.75 | A |
| Example 89 | 0.75 | A |
| Example 90 | 0.75 | A |
| Example 91 | 0.75 | A |
| Example 92 | 0.75 | A |
| Example 93 | 0.77 | A |
| Example 94 | 0.73 | A |
| Example 95 | 0.75 | A |
| Example 96 | 0.75 | A |
| Example 97 | 0.75 | A |
| Example 98 | 0.81 | A |
| Example 99 | 0.81 | A |
| Example 100 | 0.81 | A |
| Example 101 | 0.71 | B |
| Example 102 | 0.71 | B |
| Example 103 | 0.71 | B |
| Example 104 | 0.75 | A |
| Example 105 | 0.75 | A |
| Example 106 | 0.75 | A |
| Example 107 | 0.75 | A |
| Example 108 | 0.75 | A |
| Example 109 | 0.75 | A |
| Example 110 | 0.75 | A |
| Example 111 | 0.75 | A |
| Example 112 | 0.75 | A |
| Example 113 | 0.75 | A |
| Example 114 | 0.75 | A |
| Example 115 | 0.75 | A |
| Example 116 | 0.75 | A |
| Example 117 | 0.75 | A |
| Example 118 | 0.75 | A |
| Example 119 | 0.77 | A |
| Example 120 | 0.73 | A |
| Example 121 | 0.75 | A |
| Example 122 | 0.75 | A |
| Example 123 | 0.75 | A |
| Example 124 | 0.81 | A |
| Example 125 | 0.71 | B |
| Example 126 | 0.75 | A |
| Example 127 | 0.75 | A |
| Example 128 | 0.75 | A |
| Example 129 | 0.75 | A |
| Example 130 | 0.75 | A |
| Example 131 | 0.77 | A |
| Example 132 | 0.73 | A |
| Example 133 | 0.75 | A |
| Example 134 | 0.75 | A |
| Example 135 | 0.75 | A |
| Example 136 | 0.81 | A |
| Example 137 | 0.71 | B |
| Example 138 | 0.75 | A |
| Example 139 | 0.75 | A |
| Example 140 | 0.75 | A |
| Example 141 | 0.75 | A |
| Example 142 | 0.75 | A |
| Example 143 | 0.77 | A |
| Example 144 | 0.73 | A |
| Example 145 | 0.75 | A |
| Example 146 | 0.75 | A |
| Example 147 | 0.75 | A |
| Example 148 | 0.81 | A |
| Example 149 | 0.71 | B |
| Example 150 | 0.75 | A |
| Example 151 | 0.75 | A |
| Example 152 | 0.75 | A |

TABLE 13-continued

| Example | Initial torque relative value | Evaluation of peeling resistance |
|---|---|---|
| Example 153 | 0.75 | A |
| Example 154 | 0.75 | A |
| Example 155 | 0.77 | A |
| Example 156 | 0.73 | A |
| Example 157 | 0.75 | A |
| Example 158 | 0.75 | A |
| Example 159 | 0.75 | A |
| Example 160 | 0.81 | A |
| Example 161 | 0.71 | B |
| Example 162 | 0.75 | A |
| Example 163 | 0.75 | A |
| Example 164 | 0.75 | A |
| Example 165 | 0.75 | A |
| Example 166 | 0.75 | A |
| Example 167 | 0.77 | A |
| Example 168 | 0.73 | A |
| Example 169 | 0.96 | A |
| Example 170 | 0.97 | A |
| Example 171 | 0.96 | A |
| Example 172 | 0.96 | A |
| Example 173 | 0.76 | A |
| Example 174 | 0.81 | A |
| Example 175 | 0.78 | A |
| Example 176 | 0.77 | A |
| Example 177 | 0.73 | B |
| Example 178 | 0.69 | B |
| Example 179 | 0.72 | B |
| Example 180 | 0.73 | B |
| Example 181 | 0.67 | B |
| Example 182 | 0.71 | B |
| Example 183 | 0.67 | C |
| Example 184 | 0.7 | B |
| Example 185 | 0.71 | C |
| Example 186 | 0.66 | C |
| Example 187 | 0.75 | B |
| Example 188 | 0.75 | B |
| Example 189 | 0.75 | B |
| Example 190 | 0.81 | B |
| Example 191 | 0.81 | B |
| Example 192 | 0.81 | B |
| Example 193 | 0.71 | B |
| Example 194 | 0.71 | B |
| Example 195 | 0.71 | B |
| Example 196 | 0.75 | A |
| Example 197 | 0.75 | A |
| Example 198 | 0.75 | A |
| Example 199 | 0.75 | A |
| Example 200 | 0.75 | A |
| Example 201 | 0.75 | A |
| Example 202 | 0.75 | A |
| Example 203 | 0.75 | A |
| Example 204 | 0.75 | A |
| Example 205 | 0.75 | A |
| Example 206 | 0.75 | A |
| Example 207 | 0.75 | A |
| Example 208 | 0.75 | A |
| Example 209 | 0.75 | A |
| Example 210 | 0.75 | A |
| Example 211 | 0.77 | A |
| Example 212 | 0.73 | A |
| Example 213 | 0.75 | A |
| Example 214 | 0.75 | A |
| Example 215 | 0.75 | A |
| Example 216 | 0.81 | A |
| Example 217 | 0.71 | B |
| Example 218 | 0.75 | A |
| Example 219 | 0.75 | A |
| Example 220 | 0.75 | A |
| Example 221 | 0.75 | A |
| Example 222 | 0.75 | A |
| Example 223 | 0.77 | A |
| Example 224 | 0.73 | A |
| Example 225 | 0.75 | A |
| Example 226 | 0.75 | A |
| Example 227 | 0.75 | A |
| Example 228 | 0.81 | A |
| Example 229 | 0.71 | B |
| Example 230 | 0.75 | A |
| Example 231 | 0.75 | A |
| Example 232 | 0.75 | A |
| Example 233 | 0.75 | A |
| Example 234 | 0.75 | A |
| Example 235 | 0.77 | A |
| Example 236 | 0.73 | A |
| Example 237 | 0.75 | A |
| Example 238 | 0.75 | A |
| Example 239 | 0.75 | A |
| Example 240 | 0.81 | A |
| Example 241 | 0.71 | B |
| Example 242 | 0.75 | A |
| Example 243 | 0.75 | A |
| Example 244 | 0.75 | A |
| Example 245 | 0.75 | A |
| Example 246 | 0.75 | A |
| Example 247 | 0.77 | A |
| Example 248 | 0.73 | A |
| Example 249 | 0.75 | A |
| Example 250 | 0.75 | A |
| Example 251 | 0.75 | A |
| Example 252 | 0.81 | A |
| Example 253 | 0.71 | B |
| Example 254 | 0.75 | A |
| Example 255 | 0.75 | A |
| Example 256 | 0.75 | A |
| Example 257 | 0.75 | A |
| Example 258 | 0.75 | A |
| Example 259 | 0.77 | A |
| Example 260 | 0.73 | A |
| Example 261 | 0.75 | A |
| Example 262 | 0.75 | A |
| Example 263 | 0.75 | A |
| Example 264 | 0.81 | A |
| Example 265 | 0.71 | B |
| Example 266 | 0.75 | A |
| Example 267 | 0.75 | A |
| Example 268 | 0.75 | A |
| Example 269 | 0.75 | A |
| Example 270 | 0.75 | A |
| Example 271 | 0.77 | A |
| Example 272 | 0.73 | A |
| Example 273 | 0.75 | A |
| Example 274 | 0.75 | A |
| Example 275 | 0.75 | A |
| Example 276 | 0.81 | A |
| Example 277 | 0.71 | B |
| Example 278 | 0.75 | A |
| Example 279 | 0.75 | A |
| Example 280 | 0.75 | A |
| Example 281 | 0.75 | A |
| Example 282 | 0.75 | A |
| Example 283 | 0.77 | A |
| Example 284 | 0.73 | A |
| Example 285 | 0.75 | A |
| Example 286 | 0.75 | A |
| Example 287 | 0.75 | A |
| Example 288 | 0.81 | A |
| Example 289 | 0.71 | B |
| Example 290 | 0.75 | A |
| Example 291 | 0.75 | A |
| Example 292 | 0.75 | A |
| Example 293 | 0.75 | A |
| Example 294 | 0.75 | A |
| Example 295 | 0.77 | A |
| Example 296 | 0.73 | A |
| Example 297 | 0.75 | A |
| Example 298 | 0.73 | B |
| Example 299 | 0.71 | C |
| Example 300 | 0.75 | A |

TABLE 14

| Example | Initial torque relative value | Evaluation of peeling resistance |
|---|---|---|
| Example 301 | 0.75 | A |
| Example 302 | 0.75 | A |
| Example 303 | 0.81 | A |
| Example 304 | 0.71 | B |
| Example 305 | 0.75 | A |
| Example 306 | 0.75 | A |
| Example 307 | 0.75 | A |
| Example 308 | 0.75 | A |
| Example 309 | 0.75 | A |
| Example 310 | 0.77 | A |
| Example 311 | 0.73 | A |
| Example 312 | 0.75 | A |
| Example 313 | 0.75 | A |
| Example 314 | 0.75 | A |
| Example 315 | 0.81 | A |
| Example 316 | 0.71 | B |
| Example 317 | 0.75 | A |
| Example 318 | 0.75 | A |
| Example 319 | 0.75 | A |
| Example 320 | 0.75 | A |
| Example 321 | 0.75 | A |
| Example 322 | 0.77 | A |
| Example 323 | 0.73 | A |
| Example 324 | 0.75 | A |
| Example 325 | 0.75 | A |
| Example 326 | 0.75 | A |
| Example 327 | 0.81 | A |
| Example 328 | 0.71 | B |
| Example 329 | 0.75 | A |
| Example 330 | 0.75 | A |
| Example 331 | 0.75 | A |
| Example 332 | 0.75 | A |
| Example 333 | 0.75 | A |
| Example 334 | 0.77 | A |
| Example 335 | 0.73 | A |
| Example 336 | 0.75 | A |
| Example 337 | 0.75 | A |
| Example 338 | 0.75 | A |
| Example 339 | 0.81 | A |
| Example 340 | 0.71 | B |
| Example 341 | 0.75 | A |
| Example 342 | 0.75 | A |
| Example 343 | 0.75 | A |
| Example 344 | 0.75 | A |
| Example 345 | 0.75 | A |
| Example 346 | 0.77 | A |
| Example 347 | 0.73 | A |
| Example 348 | 0.75 | A |
| Example 349 | 0.75 | A |
| Example 350 | 0.75 | A |
| Example 351 | 0.81 | A |
| Example 352 | 0.71 | B |
| Example 353 | 0.75 | A |
| Example 354 | 0.75 | A |
| Example 355 | 0.75 | A |
| Example 356 | 0.75 | A |
| Example 357 | 0.75 | A |
| Example 358 | 0.77 | A |
| Example 359 | 0.73 | A |
| Example 360 | 0.75 | A |
| Example 361 | 0.75 | A |
| Example 362 | 0.75 | A |
| Example 363 | 0.81 | A |
| Example 364 | 0.71 | B |
| Example 365 | 0.75 | A |
| Example 366 | 0.75 | A |
| Example 367 | 0.75 | A |
| Example 368 | 0.75 | A |
| Example 369 | 0.75 | A |
| Example 370 | 0.77 | A |
| Example 371 | 0.73 | A |
| Example 372 | 0.75 | A |
| Example 373 | 0.75 | A |
| Example 374 | 0.75 | A |
| Example 375 | 0.81 | A |
| Example 376 | 0.71 | B |
| Example 377 | 0.75 | A |
| Example 378 | 0.75 | A |
| Example 379 | 0.75 | A |
| Example 380 | 0.75 | A |
| Example 381 | 0.75 | A |
| Example 382 | 0.77 | A |
| Example 383 | 0.73 | A |
| Example 384 | 0.75 | A |
| Example 385 | 0.75 | A |
| Example 386 | 0.75 | A |
| Example 387 | 0.81 | A |
| Example 388 | 0.71 | B |
| Example 389 | 0.75 | A |
| Example 390 | 0.75 | A |
| Example 391 | 0.75 | A |
| Example 392 | 0.75 | A |
| Example 393 | 0.75 | A |
| Example 394 | 0.77 | A |
| Example 395 | 0.73 | A |
| Example 396 | 0.75 | A |
| Example 397 | 0.77 | A |
| Example 398 | 0.75 | A |
| Example 399 | 0.73 | A |
| Example 400 | 0.73 | A |
| Example 401 | 0.73 | A |
| Example 402 | 0.8 | A |
| Example 403 | 0.8 | A |
| Example 404 | 0.8 | A |
| Example 405 | 0.76 | A |
| Example 406 | 0.72 | A |
| Example 407 | 0.71 | B |
| Example 408 | 0.69 | B |
| Example 409 | 0.69 | B |
| Example 410 | 0.69 | B |
| Example 411 | 0.73 | A |
| Example 412 | 0.73 | A |
| Example 413 | 0.73 | A |
| Example 414 | 0.73 | A |
| Example 415 | 0.73 | A |
| Example 416 | 0.73 | A |
| Example 417 | 0.73 | A |
| Example 418 | 0.73 | A |
| Example 419 | 0.73 | A |
| Example 420 | 0.73 | A |
| Example 421 | 0.73 | A |
| Example 422 | 0.73 | A |
| Example 423 | 0.73 | A |
| Example 424 | 0.73 | A |
| Example 425 | 0.73 | A |
| Example 426 | 0.73 | A |
| Example 427 | 0.73 | A |
| Example 428 | 0.73 | A |
| Example 429 | 0.73 | A |
| Example 430 | 0.73 | A |
| Example 431 | 0.73 | A |
| Example 432 | 0.73 | A |
| Example 433 | 0.73 | A |
| Example 434 | 0.73 | A |
| Example 435 | 0.73 | A |
| Example 436 | 0.75 | A |
| Example 437 | 0.71 | B |
| Example 438 | 0.75 | A |
| Example 439 | 0.71 | B |
| Example 440 | 0.73 | A |
| Example 441 | 0.73 | A |
| Example 442 | 0.73 | A |
| Example 443 | 0.73 | A |
| Example 444 | 0.73 | A |
| Example 445 | 0.73 | A |
| Example 446 | 0.73 | A |
| Example 447 | 0.73 | A |
| Example 448 | 0.73 | A |
| Example 449 | 0.73 | A |
| Example 450 | 0.73 | A |
| Example 451 | 0.73 | A |
| Example 452 | 0.8 | A |

TABLE 14-continued

| Example | Initial torque relative value | Evaluation of peeling resistance |
|---|---|---|
| Example 453 | 0.76 | A |
| Example 454 | 0.72 | A |
| Example 455 | 0.71 | B |
| Example 456 | 0.69 | B |
| Example 457 | 0.73 | A |
| Example 458 | 0.73 | A |
| Example 459 | 0.73 | A |
| Example 460 | 0.73 | A |
| Example 461 | 0.73 | A |
| Example 462 | 0.73 | A |
| Example 463 | 0.73 | A |
| Example 464 | 0.73 | A |
| Example 465 | 0.73 | A |
| Example 466 | 0.73 | A |
| Example 467 | 0.73 | A |
| Example 468 | 0.73 | A |
| Example 469 | 0.73 | A |
| Example 470 | 0.73 | A |
| Example 471 | 0.73 | A |
| Example 472 | 0.73 | A |
| Example 473 | 0.73 | A |
| Example 474 | 0.75 | A |
| Example 475 | 0.71 | B |
| Example 476 | 0.75 | A |
| Example 477 | 0.71 | B |
| Example 478 | 0.73 | A |
| Example 479 | 0.73 | A |
| Example 480 | 0.73 | A |
| Example 481 | 0.73 | A |
| Example 482 | 0.73 | A |
| Example 483 | 0.73 | A |
| Example 484 | 0.73 | A |
| Example 485 | 0.73 | A |
| Example 486 | 0.73 | A |
| Example 487 | 0.73 | A |
| Example 488 | 0.75 | A |
| Example 489 | 0.73 | A |

TABLE 15

| Comparative Example | Siloxane-containing polyester resins | | Mixing ratio of resin B to resin C | Additional resin | Mixing ratio of siloxane-containing polyester resins to additional resin | CTM | Resin included in lower layer in contact with surface layer |
|---|---|---|---|---|---|---|---|
| | Resin B | Resin C | | | | | |
| Comparative Example 1 | Resin B(51) | Resin C(71) | B/C = 95/5 | E-2 | 10/90 | G-7 | F-1 |
| Comparative Example 2 | Resin B(51) | Resin C(71) | B/C = 95/5 | E-2 | 10/90 | G-7 | F-2 |
| Comparative Example 3 | Resin B(51) | Resin C(71) | B/C = 95/5 | E-2 | 10/90 | G-7 | F-3 |
| Comparative Example 4 | Resin B(51) | Resin C(71) | B/C = 95/5 | E-2 | 10/90 | G-7 | F-4 |
| Comparative Example 5 | Resin B(51) | Resin C(71) | B/C = 95/5 | E-2 | 10/90 | G-7 | F-5 |
| Comparative Example 6 | Resin B(51) | Resin C(71) | B/C = 95/5 | E-2 | 10/90 | G-7 | F-6 |
| Comparative Example 7 | Resin B(51) | Resin C(71) | B/C = 95/5 | E-2 | 10/90 | G-7 | F-7 |
| Comparative Example 8 | Resin B(51) | Resin C(71) | B/C = 95/5 | E-2 | 10/90 | G-7 | F-8 |
| Comparative Example 9 | Resin B(51) | Resin C(71) | B/C = 95/5 | E-2 | 10/90 | G-7 | F-9 |
| Comparative Example 10 | Resin B(51) | Resin C(71) | B/C = 95/5 | E-2 | 50/50 | G-7 | F-1 |
| Comparative Example 11 | Resin B(51) | Resin C(71) | B/C = 95/5 | — | 100/0 | G-7 | F-1 |
| Comparative Example 12 | Resin B(51) | Resin C(71) | B/C = 95/5 | E-3 | 10/90 | G-7 | F-1 |
| Comparative Example 13 | Resin B(51) | Resin C(71) | B/C = 95/5 | E-9 | 10/90 | G-7 | F-1 |
| Comparative Example 14 | Resin B(51) | Resin C(71) | B/C = 95/5 | D-1 | 10/90 | G-7 | F-1 |
| Comparative Example 15 | Resin B(51) | Resin C(71) | B/C = 95/5 | D-4 | 10/90 | G-7 | F-1 |
| Comparative Example 16 | Resin B(51) | Resin C(71) | B/C = 95/5 | D-8 | 10/90 | G-7 | F-1 |
| Comparative Example 17 | Resin B(51) | Resin C(71) | B/C = 100/0 | E-2 | 10/90 | G-7 | F-1 |
| Comparative Example 18 | Resin B(51) | Resin C(71) | B/C = 0/100 | E-2 | 10/90 | G-7 | F-1 |
| Comparative Example 19 | Resin B(52) | Resin C(72) | B/C = 95/5 | E-2 | 10/90 | G-7 | F-1 |
| Comparative Example 20 | Resin B(52) | Resin C(72) | B/C = 95/5 | E-2 | 10/90 | G-7 | F-2 |
| Comparative Example 21 | Resin B(52) | Resin C(72) | B/C = 95/5 | E-2 | 10/90 | G-7 | F-3 |
| Comparative Example 22 | Resin B(52) | Resin C(72) | B/C = 95/5 | E-2 | 10/90 | G-7 | F-4 |
| Comparative Example 23 | Resin B(52) | Resin C(72) | B/C = 95/5 | E-2 | 10/90 | G-7 | F-5 |

TABLE 15-continued

| Comparative Example | Siloxane-containing polyester resins | | | Additional resin | Mixing ratio of siloxane-containing polyester resins to additional resin | CTM | Resin included in lower layer in contact with surface layer |
| --- | --- | --- | --- | --- | --- | --- | --- |
| | Resin B | Resin C | Mixing ratio of resin B to resin C | | | | |
| Comparative Example 24 | Resin B(52) | Resin C(72) | B/C = 95/5 | E-2 | 10/90 | G-7 | F-6 |
| Comparative Example 25 | Resin B(52) | Resin C(72) | B/C = 95/5 | E-2 | 10/90 | G-7 | F-7 |
| Comparative Example 26 | Resin B(52) | Resin C(72) | B/C = 95/5 | E-2 | 10/90 | G-7 | F-8 |
| Comparative Example 27 | Resin B(52) | Resin C(72) | B/C = 95/5 | E-2 | 10/90 | G-7 | F-9 |
| Comparative Example 28 | Resin B(52) | Resin C(72) | B/C = 95/5 | E-2 | 50/50 | G-7 | F-1 |
| Comparative Example 29 | Resin B(52) | Resin C(72) | B/C = 95/5 | — | 100/0 | G-7 | F-1 |
| Comparative Example 30 | Resin B(52) | Resin C(72) | B/C = 95/5 | E-3 | 10/90 | G-7 | F-1 |
| Comparative Example 31 | Resin B(52) | Resin C(72) | B/C = 95/5 | E-9 | 10/90 | G-7 | F-1 |
| Comparative Example 32 | Resin B(52) | Resin C(72) | B/C = 95/5 | D-1 | 10/90 | G-7 | F-1 |
| Comparative Example 33 | Resin B(52) | Resin C(72) | B/C = 95/5 | D-4 | 10/90 | G-7 | F-1 |
| Comparative Example 34 | Resin B(52) | Resin C(72) | B/C = 95/5 | D-8 | 10/90 | G-7 | F-1 |
| Comparative Example 35 | Resin B(52) | Resin C(72) | B/C = 100/0 | E-2 | 10/90 | G-7 | F-1 |
| Comparative Example 36 | Resin B(52) | Resin C(72) | B/C = 0/100 | E-2 | 10/90 | G-7 | F-1 |
| Comparative Example 37 | | — | | E-2 | 0/100 | G-7 | F-1 |
| Comparative Example 38 | Resin B(1) | Resin C(1) | B/C = 95/5 | E-2 | 10/90 | G-7 | Polystyrene |
| Comparative Example 39 | Resin B(1) | Resin C(1) | B/C = 95/5 | E-2 | 10/90 | G-7 | Phenol resin |
| Comparative Example 40 | | Resin H | | E-2 | 10/90 | G-7 | F-1 |
| Comparative Example 41 | | Resin H | | E-2 | 10/90 | G-1 | F-1 |
| Comparative Example 42 | | Resin H | | E-2 | 10/90 | G-1 | F-2 |
| Comparative Example 43 | | Resin H | | E-2 | 10/90 | G-1 | F-3 |
| Comparative Example 44 | | Resin H | | E-2 | 10/90 | G-1 | F-4 |
| Comparative Example 45 | | Resin H | | E-2 | 10/90 | G-1 | F-5 |
| Comparative Example 46 | | Resin H | | E-2 | 10/90 | G-1 | F-6 |
| Comparative Example 47 | | Resin H | | E-2 | 10/90 | G-1 | F-7 |
| Comparative Example 48 | | Resin H | | E-2 | 10/90 | G-1 | F-8 |
| Comparative Example 49 | | Resin H | | E-2 | 10/90 | G-1 | F-9 |
| Comparative Example 50 | | Resin H | | E-2 | 50/50 | G-1 | F-1 |
| Comparative Example 51 | | Resin H | | — | 100/0 | G-1 | F-1 |
| Comparative Example 52 | | Resin H | | E-3 | 10/90 | G-1 | F-1 |
| Comparative Example 53 | | Resin H | | E-9 | 10/90 | G-1 | F-1 |
| Comparative Example 54 | | Resin H | | D-7 | 10/90 | G-1 | F-1 |
| Comparative Example 55 | | Resin H | | D-1 | 10/90 | G-1 | F-1 |
| Comparative Example 56 | | Resin H | | D-9 | 10/90 | G-1 | F-1 |
| Comparative Example 57 | | Resin H | | D-4 | 10/90 | G-1 | F-1 |
| Comparative Example 58 | | Resin H | | D-8 | 10/90 | G-1 | F-1 |
| Comparative Example 59 | | Resin I | | E-2 | 10/90 | G-7 | F-1 |
| Comparative Example 60 | | Resin I | | E-2 | 10/90 | G-1 | F-1 |

TABLE 15-continued

| Comparative Example | Siloxane-containing polyester resins | | Mixing ratio of resin B to resin C | Additional resin | Mixing ratio of siloxane-containing polyester resins to additional resin | CTM | Resin included in lower layer in contact with surface layer |
|---|---|---|---|---|---|---|---|
| | Resin B | Resin C | | | | | |
| Comparative Example 61 | | Resin I | | E-2 | 10/90 | G-1 | F-2 |
| Comparative Example 62 | | Resin I | | E-2 | 10/90 | G-1 | F-3 |
| Comparative Example 63 | | Resin I | | E-2 | 10/90 | G-1 | F-4 |
| Comparative Example 64 | | Resin I | | E-2 | 10/90 | G-1 | F-5 |
| Comparative Example 65 | | Resin I | | E-2 | 10/90 | G-1 | F-6 |
| Comparative Example 66 | | Resin I | | E-2 | 10/90 | G-1 | F-7 |
| Comparative Example 67 | | Resin I | | E-2 | 10/90 | G-1 | F-8 |
| Comparative Example 68 | | Resin I | | E-2 | 10/90 | G-1 | F-9 |
| Comparative Example 69 | | Resin I | | E-2 | 50/50 | G-1 | F-1 |
| Comparative Example 70 | | Resin I | | — | 100/0 | G-1 | F-1 |
| Comparative Example 71 | | Resin I | | E-3 | 10/90 | G-1 | F-1 |
| Comparative Example 72 | | Resin I | | E-9 | 10/90 | G-1 | F-1 |
| Comparative Example 73 | | Resin I | | D-7 | 10/90 | G-1 | F-1 |
| Comparative Example 74 | | Resin I | | D-1 | 10/90 | G-1 | F-1 |
| Comparative Example 75 | | Resin I | | D-9 | 10/90 | G-1 | F-1 |
| Comparative Example 76 | | Resin I | | D-4 | 10/90 | G-1 | F-1 |
| Comparative Example 77 | | Resin I | | D-8 | 10/90 | G-1 | F-1 |

TABLE 16

| Comparative Example | Siloxane-containing polyester resins | | Mixing ratio of resin B to resin C | Additional resin | Mixing ratio of siloxane-containing polyester resins to additional resin | CTM | Resin included in lower layer in contact with surface layer |
|---|---|---|---|---|---|---|---|
| | Resin B | Resin C | | | | | |
| Comparative Example 78 | Resin B(51) | Resin C(71) | B/C = 95/5 | E-2 | 50/50 | G-7 | D-1 |
| Comparative Example 79 | Resin B(51) | Resin C(71) | B/C = 95/5 | E-2 | 50/50 | G-7 | D-4 |
| Comparative Example 80 | Resin B(51) | Resin C(71) | B/C = 95/5 | E-2 | 50/50 | G-7 | D-8 |
| Comparative Example 81 | Resin B(51) | Resin C(71) | B/C = 95/5 | E-3 | 50/50 | G-7 | D-1 |
| Comparative Example 82 | Resin B(51) | Resin C(71) | B/C = 95/5 | E-3 | 50/50 | G-7 | D-4 |
| Comparative Example 83 | Resin B(51) | Resin C(71) | B/C = 95/5 | E-3 | 50/50 | G-7 | D-8 |
| Comparative Example 84 | Resin B(51) | Resin C(71) | B/C = 95/5 | E-9 | 50/50 | G-7 | D-1 |
| Comparative Example 85 | Resin B(51) | Resin C(71) | B/C = 95/5 | E-9 | 50/50 | G-7 | D-4 |
| Comparative Example 86 | Resin B(51) | Resin C(71) | B/C = 95/5 | E-9 | 50/50 | G-7 | D-8 |
| Comparative Example 87 | Resin B(51) | Resin C(71) | B/C = 100/0 | E-2 | 50/50 | G-7 | D-1 |
| Comparative Example 88 | Resin B(51) | Resin C(71) | B/C = 0/100 | E-2 | 50/50 | G-7 | D-1 |
| Comparative Example 89 | Resin B(52) | Resin C(72) | B/C = 95/5 | E-2 | 50/50 | G-7 | D-1 |
| Comparative Example 90 | Resin B(52) | Resin C(72) | B/C = 95/5 | E-2 | 50/50 | G-7 | D-4 |
| Comparative Example 91 | Resin B(52) | Resin C(72) | B/C = 95/5 | E-2 | 50/50 | G-7 | D-8 |

TABLE 16-continued

| Comparative Example | Siloxane-containing polyester resins | | | Additional resin | Mixing ratio of siloxane-containing polyester resins to additional resin | CTM | Resin included in lower layer in contact with surface layer |
|---|---|---|---|---|---|---|---|
| | Resin B | Resin C | Mixing ratio of resin B to resin C | | | | |
| Comparative Example 92 | Resin B(52) | Resin C(72) | B/C = 95/5 | E-3 | 50/50 | G-7 | D-1 |
| Comparative Example 93 | Resin B(52) | Resin C(72) | B/C = 95/5 | E-3 | 50/50 | G-7 | D-4 |
| Comparative Example 94 | Resin B(52) | Resin C(72) | B/C = 95/5 | E-3 | 50/50 | G-7 | D-8 |
| Comparative Example 95 | Resin B(52) | Resin C(72) | B/C = 95/5 | E-9 | 50/50 | G-7 | D-1 |
| Comparative Example 96 | Resin B(52) | Resin C(72) | B/C = 95/5 | E-9 | 50/50 | G-7 | D-4 |
| Comparative Example 97 | Resin B(52) | Resin C(72) | B/C = 95/5 | E-9 | 50/50 | G-7 | D-8 |
| Comparative Example 98 | Resin B(52) | Resin C(72) | B/C = 100/0 | E-2 | 50/50 | G-7 | D-1 |
| Comparative Example 99 | Resin B(52) | Resin C(72) | B/C = 0/100 | E-2 | 50/50 | G-7 | D-1 |
| Comparative Example 100 | | — | | E-2 | 0/100 | G-7 | D-1 |
| Comparative Example 101 | | Resin H | | E-2 | 50/50 | G-7 | D-7 |
| Comparative Example 102 | | Resin H | | E-2 | 50/50 | G-7 | D-1 |
| Comparative Example 103 | | Resin H | | E-2 | 50/50 | G-7 | D-9 |
| Comparative Example 104 | | Resin H | | E-2 | 50/50 | G-7 | D-4 |
| Comparative Example 105 | | Resin H | | E-2 | 50/50 | G-7 | D-8 |
| Comparative Example 106 | | Resin H | | E-3 | 50/50 | G-7 | D-7 |
| Comparative Example 107 | | Resin H | | E-3 | 50/50 | G-7 | D-1 |
| Comparative Example 108 | | Resin H | | E-3 | 50/50 | G-7 | D-9 |
| Comparative Example 109 | | Resin H | | E-3 | 50/50 | G-7 | D-4 |
| Comparative Example 110 | | Resin H | | E-3 | 50/50 | G-7 | D-8 |
| Comparative Example 111 | | Resin H | | E-9 | 50/50 | G-7 | D-7 |
| Comparative Example 112 | | Resin H | | E-9 | 50/50 | G-7 | D-1 |
| Comparative Example 113 | | Resin H | | E-9 | 50/50 | G-7 | D-9 |
| Comparative Example 114 | | Resin H | | E-9 | 50/50 | G-7 | D-4 |
| Comparative Example 115 | | Resin H | | E-9 | 50/50 | G-7 | D-8 |
| Comparative Example 116 | | Resin I | | E-2 | 50/50 | G-7 | D-7 |
| Comparative Example 117 | | Resin I | | E-2 | 50/50 | G-7 | D-1 |
| Comparative Example 118 | | Resin I | | E-2 | 50/50 | G-7 | D-9 |
| Comparative Example 119 | | Resin I | | E-2 | 50/50 | G-7 | D-4 |
| Comparative Example 120 | | Resin I | | E-2 | 50/50 | G-7 | D-8 |
| Comparative Example 121 | | Resin I | | E-3 | 50/50 | G-7 | D-7 |
| Comparative Example 122 | | Resin I | | E-3 | 50/50 | G-7 | D-1 |
| Comparative Example 123 | | Resin I | | E-3 | 50/50 | G-7 | D-9 |
| Comparative Example 124 | | Resin I | | E-3 | 50/50 | G-7 | D-4 |
| Comparative Example 125 | | Resin I | | E-3 | 50/50 | G-7 | D-8 |
| Comparative Example 126 | | Resin I | | E-9 | 50/50 | G-7 | D-7 |
| Comparative Example 127 | | Resin I | | E-9 | 50/50 | G-7 | D-1 |
| Comparative Example 128 | | Resin I | | E-9 | 50/50 | G-7 | D-9 |

TABLE 16-continued

| Comparative Example | Siloxane-containing polyester resins | | Mixing ratio of resin B to resin C | Additional resin | Mixing ratio of siloxane-containing polyester resins to additional resin | CTM | Resin included in lower layer in contact with surface layer |
|---|---|---|---|---|---|---|---|
| | Resin B | Resin C | | | | | |
| Comparative Example 129 | | Resin I | | E-9 | 50/50 | G-7 | D-4 |
| Comparative Example 130 | | Resin I | | E-9 | 50/50 | G-7 | D-8 |
| Comparative Example 131 | | Resin K | | E-2 | 10/90 | G-7 | F-1 |

The phrase "Mixing ratio of resin B to resin C" in Tables 15 and 16 means a mass ratio. The phrase "Mixing ratio of siloxane-containing polyester resins to additional resin" in Tables 15 and 16 means a mass ratio of terminal siloxane-containing polyester resins to an additional resin containing no siloxane structure. The term "CTM" in Tables 15 and 16 refers to a charge-transporting substance.

In the column "Resin included in lower layer in contact with surface layer" in Tables 15 and 16, the polystyrene represents (manufactured by Mitsubishi Monsanto Chemical Company, product name: Diarex HF-55), and the phenol resin represents (manufactured by Gunei Chemical Industry Co., Ltd., product name: PL-4804).

TABLE 17

| Comparative Example | Initial torque relative value | Evaluation of peeling resistance |
|---|---|---|
| Comparative Example 1 | 0.90 | A |
| Comparative Example 2 | 0.90 | A |
| Comparative Example 3 | 0.90 | A |
| Comparative Example 4 | 0.90 | A |
| Comparative Example 5 | 0.90 | A |
| Comparative Example 6 | 0.90 | A |
| Comparative Example 7 | 0.90 | A |
| Comparative Example 8 | 0.90 | A |
| Comparative Example 9 | 0.90 | A |
| Comparative Example 10 | 0.88 | B |
| Comparative Example 11 | 0.86 | C |
| Comparative Example 12 | 0.90 | A |
| Comparative Example 13 | 0.90 | A |
| Comparative Example 14 | 0.90 | A |
| Comparative Example 15 | 0.90 | A |
| Comparative Example 16 | 0.90 | A |
| Comparative Example 17 | 0.90 | A |
| Comparative Example 18 | 0.91 | A |
| Comparative Example 19 | 0.60 | D |
| Comparative Example 20 | 0.60 | D |
| Comparative Example 21 | 0.60 | D |
| Comparative Example 22 | 0.60 | D |
| Comparative Example 23 | 0.60 | D |
| Comparative Example 24 | 0.60 | D |
| Comparative Example 25 | 0.60 | D |
| Comparative Example 26 | 0.60 | D |
| Comparative Example 27 | 0.60 | D |
| Comparative Example 28 | 0.59 | D |
| Comparative Example 29 | 0.57 | D |
| Comparative Example 30 | 0.60 | D |
| Comparative Example 31 | 0.60 | D |
| Comparative Example 32 | 0.60 | D |
| Comparative Example 33 | 0.60 | D |
| Comparative Example 34 | 0.60 | D |
| Comparative Example 35 | 0.60 | D |
| Comparative Example 36 | 0.62 | D |
| Comparative Example 37 | 1.00 | A |
| Comparative Example 38 | 0.75 | D |
| Comparative Example 39 | 0.75 | D |
| Comparative Example 40 | 0.91 | D |
| Comparative Example 41 | 0.91 | D |
| Comparative Example 42 | 0.91 | D |
| Comparative Example 43 | 0.91 | D |
| Comparative Example 44 | 0.91 | D |
| Comparative Example 45 | 0.91 | D |
| Comparative Example 46 | 0.91 | D |
| Comparative Example 47 | 0.91 | D |
| Comparative Example 48 | 0.91 | D |
| Comparative Example 49 | 0.91 | D |
| Comparative Example 50 | 0.90 | D | eb;normal

TABLE 17-continued

| Comparative Example | Initial torque relative value | Evaluation of peeling resistance |
| --- | --- | --- |
| Comparative Example 51 | 0.88 | D |
| Comparative Example 52 | 0.91 | D |
| Comparative Example 53 | 0.91 | D |
| Comparative Example 54 | 0.91 | D |
| Comparative Example 55 | 0.91 | D |
| Comparative Example 56 | 0.91 | D |
| Comparative Example 57 | 0.91 | D |
| Comparative Example 58 | 0.91 | D |
| Comparative Example 59 | 0.91 | D |
| Comparative Example 60 | 0.91 | D |
| Comparative Example 61 | 0.91 | D |
| Comparative Example 62 | 0.91 | D |
| Comparative Example 63 | 0.91 | D |
| Comparative Example 64 | 0.91 | D |
| Comparative Example 65 | 0.91 | D |
| Comparative Example 66 | 0.91 | D |
| Comparative Example 67 | 0.91 | D |
| Comparative Example 68 | 0.91 | D |
| Comparative Example 69 | 0.90 | D |
| Comparative Example 70 | 0.88 | D |
| Comparative Example 71 | 0.91 | D |
| Comparative Example 72 | 0.91 | D |
| Comparative Example 73 | 0.91 | D |
| Comparative Example 74 | 0.91 | D |
| Comparative Example 75 | 0.91 | D |
| Comparative Example 76 | 0.91 | D |
| Comparative Example 77 | 0.91 | D |
| Comparative Example 78 | 0.88 | A |
| Comparative Example 79 | 0.88 | A |
| Comparative Example 80 | 0.88 | A |
| Comparative Example 81 | 0.88 | A |
| Comparative Example 82 | 0.88 | A |
| Comparative Example 83 | 0.88 | A |
| Comparative Example 84 | 0.88 | A |
| Comparative Example 85 | 0.88 | A |
| Comparative Example 86 | 0.88 | A |
| Comparative Example 87 | 0.88 | A |
| Comparative Example 88 | 0.89 | A |
| Comparative Example 89 | 0.58 | D |
| Comparative Example 90 | 0.58 | D |
| Comparative Example 91 | 0.58 | D |
| Comparative Example 92 | 0.58 | D |
| Comparative Example 93 | 0.58 | D |
| Comparative Example 94 | 0.58 | D |
| Comparative Example 95 | 0.58 | D |
| Comparative Example 96 | 0.58 | D |
| Comparative Example 97 | 0.58 | D |
| Comparative Example 98 | 0.58 | D |
| Comparative Example 99 | 0.60 | D |
| Comparative Example 100 | 1.00 | A |
| Comparative Example 101 | 0.89 | D |
| Comparative Example 102 | 0.89 | D |
| Comparative Example 103 | 0.89 | D |
| Comparative Example 104 | 0.89 | D |
| Comparative Example 105 | 0.89 | D |
| Comparative Example 106 | 0.89 | D |
| Comparative Example 107 | 0.89 | D |
| Comparative Example 108 | 0.89 | D |
| Comparative Example 109 | 0.89 | D |
| Comparative Example 110 | 0.89 | D |
| Comparative Example 111 | 0.89 | D |
| Comparative Example 112 | 0.89 | D |
| Comparative Example 113 | 0.89 | D |
| Comparative Example 114 | 0.89 | D |
| Comparative Example 115 | 0.89 | D |
| Comparative Example 116 | 0.89 | D |
| Comparative Example 117 | 0.89 | D |
| Comparative Example 118 | 0.89 | D |
| Comparative Example 119 | 0.89 | D |
| Comparative Example 120 | 0.89 | D |
| Comparative Example 121 | 0.89 | D |
| Comparative Example 122 | 0.89 | D |
| Comparative Example 123 | 0.89 | D |
| Comparative Example 124 | 0.89 | D |
| Comparative Example 125 | 0.89 | D |
| Comparative Example 126 | 0.89 | D |

TABLE 17-continued

| Comparative Example | Initial torque relative value | Evaluation of peeling resistance |
|---|---|---|
| Comparative Example 127 | 0.89 | D |
| Comparative Example 128 | 0.89 | D |
| Comparative Example 129 | 0.89 | D |
| Comparative Example 130 | 0.89 | D |
| Comparative Example 131 | 0.87 | B |

Comparisons between the Examples and Comparative Examples 1 to 18 and 78 to 88 reveal that, in the case where the average of "a" in the above-mentioned formula (A) in the terminal siloxane-containing polyester resins (resin B and resin C) in the surface layer is low, the effect of relieving contact stress is not sufficiently exhibited. This is supported by the fact that the effect of reducing the initial torque is small in this evaluation method.

Comparisons between the Examples and Comparative Examples 19 to 36 and 89 to 99 reveal that, in the case where the average of "a" in the above-mentioned formula (A) in the terminal siloxane-containing polyester resins in the surface layer is high, the effect of suppressing film peeling is not sufficiently exhibited. This is probably because adhesion is decreased by the presence of a large amount of the siloxane moiety, which exerts low surface energy property, at the interface between the surface layer and the lower layer thereof.

Comparisons between the Examples and Comparative Examples 38 and 39 reveal that an excellent effect of suppressing film peeling is exhibited by a combination of the terminal siloxane-containing polyester resins of the present invention with the resin included in the lower layer of the surface layer. This is probably because the resin included in the lower layer of the surface layer in the present invention has a carbonyl group having high polarity and hence strongly interacts with the ether structure moieties in the terminal siloxane-containing polyester resins.

Comparisons between the Examples and Comparative Examples 40 to 77 and 101 to 130 reveal that an excellent effect of suppressing film peeling is exhibited by a combination of the terminal siloxane-containing polyester resins of the present invention with the resin included in the lower layer of the surface layer. This is probably because the ether structures included in the terminal siloxane-containing polyester resins in the present invention are less sterically-hindered and more highly polar compared with a conventional phenol structure and hence strongly interact with the resin included in the lower layer of the surface layer.

Comparisons between the Examples and Comparative Example 131 reveal that an excellent effect of suppressing film peeling is exhibited by a combination of the terminal siloxane-containing polyester resins of the present invention with the resin included in the lower layer of the surface layer. In Comparative Example 131, the number of repetitions of the dimethylsiloxane structure in the terminal siloxane-containing polycarbonate resins is as small as 4, and hence the effect of relieving contact stress is not sufficiently exhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-244361, filed Oct. 29, 2010, which is hereby incorporated by reference herein in its entirety.

The invention claimed is

1. An electrophotographic photosensitive member, comprising:

a support, a charge-generating layer which is provided on the support and comprises a charge-generating substance, and a charge-transporting layer which is provided on the charge-generating layer and comprises a charge-transporting substance;

wherein:

a surface layer of the electrophotographic photosensitive member comprises at least one resin selected from the group consisting of a resin B having a structure represented by the following formula (B) and a resin C having a structure represented by the following formula (C); and a lower layer in contact with the surface layer comprises at least one resin selected from the group consisting of a polycarbonate resin D having a repeating structural unit represented by the following formula (D), a polyester resin E having a repeating structural unit represented by the following formula (E), and a polyvinyl acetal resin F having a repeating structural unit represented by the following formula (F-A), a repeating structural unit represented by the following formula (F-B), and a repeating structural unit represented by the following formula (F-C):

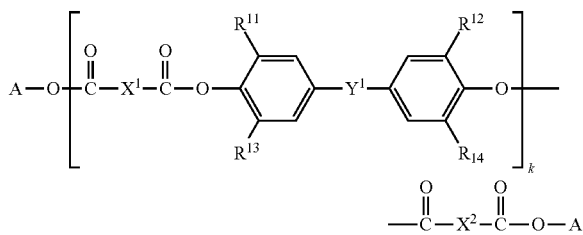

wherein, in the formula (B), $R^{11}$ to $R^{14}$ each independently represent a hydrogen atom, or a methyl group;

$X^1$ and $X^2$ each independently represent a m-phenylene group, a p-phenylene group, or a bivalent group having two p-phenylene groups bonded with an oxygen atom;

$Y^1$ represents a single bond, a methylene group, an ethylidene group, a propylidene group, a phenylethylidene group, a cyclohexylidene group, or an oxygen atom;

"k" represents the number of repetitions of a structure within the brackets; and "A" represents a structure represented by the following formula (A):

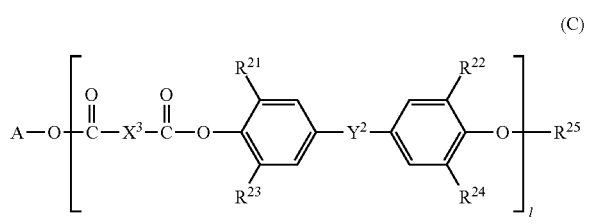

(C)

wherein, in the formula (C), $R^{21}$ to $R^{24}$ each independently represent a hydrogen atom, or a methyl group;

$Y^2$ represents a single bond, a methylene group, an ethylidene group, a propylidene group, a phenylethylidene group, a cyclohexylidene group, or an oxygen atom;

$R^{25}$ represents a structure represented by the following formula (R25-1), (R25-2), or (R25-3);

$X^3$ represents a m-phenylene group, a p-phenylene group, or a bivalent group having two p-phenylene groups bonded with an oxygen atom;

"l" represents the number of repetitions of a structure within the brackets; and "A" represents a structure represented by the following formula (A):

(R25-1)

(R25-2)

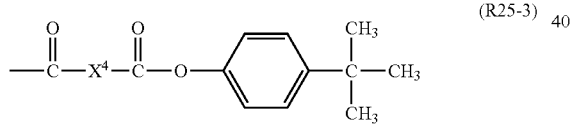
(R25-3)

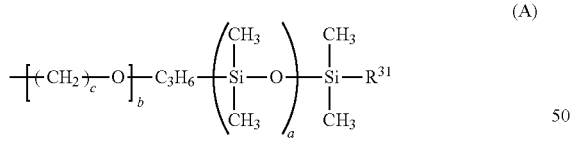
(A)

wherein, in the formulas (R25-2) and (R25-3), $X^4$ represents a m-phenylene group, a p-phenylene group, or a bivalent group having two p-phenylene groups bonded with an oxygen atom; and in the formula (A), "a", "b", and "c" each represent the number of repetitions of a structure within the brackets, an average of "a" in the resin B and the resin C ranges from 10 to 100, an average of "b" in the resin B and the resin C ranges from 1 to 3, and an average of "c" in the resin B and the resin C ranges from 2 to 4; and $R^{31}$ represents an alkyl group having 1 to 4 carbon atoms;

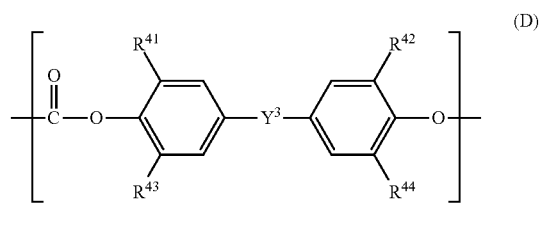
(D)

wherein, in the formula (D), $R^{41}$ to $R^{44}$ each independently represent a hydrogen atom, or a methyl group; and $Y^3$ represents a single bond, a methylene group, an ethylidene group, a propylidene group, a phenylethylidene group, a cyclohexylidene group, or an oxygen atom;

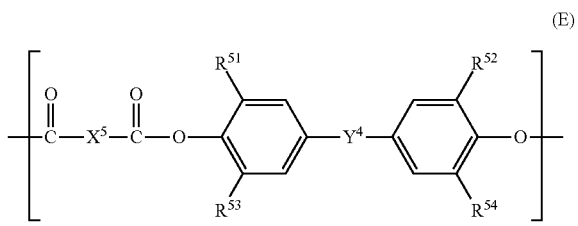
(E)

wherein, in the formula (E), $R^{51}$ to $R^{54}$ each independently represent a hydrogen atom, or a methyl group;

$X^5$ represents a m-phenylene group, a p-phenylene group, or a bivalent group having two p-phenylene groups bonded with an oxygen atom; and $Y^4$ represents a single bond, a methylene group, an ethylidene group, a propylidene group, a phenylethylidene group, a cyclohexylidene group, or an oxygen atom;

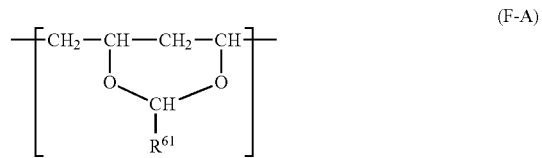
(F-A)

(F-B)

(F-C)

wherein, in the formula (F-A), $R^{61}$ represents an alkyl group having 1 to 4 carbon atoms.

2. An electrophotographic photosensitive member according to claim 1, wherein:

the content of a siloxane moiety in the resin B is not less than 10% by mass and not more than 50% by mass relative to the total mass of the resin B, and the content of a siloxane moiety in the resin C is not less than 5% by mass and not more than 25% by mass relative to the total mass of the resin C.

3. An electrophotographic photosensitive member according to claim 1, wherein:
the lower layer in contact with the surface layer is the charge-transporting layer, and
the charge-transporting layer comprises at least one resin selected from the group consisting of the polycarbonate resin D and the polyester resin E.

4. An electrophotographic photosensitive member according to claim 1, wherein:
the lower layer in contact with the surface layer is the charge-generating layer, and
the charge-generating layer comprises the polyvinyl acetal resin F.

5. An electrophotographic photosensitive member according to claim 1, wherein the content of the resin B and the resin C is not less than 5% by mass and not more than 100% by mass relative to the total mass of whole resin in the surface layer.

6. An electrophotographic photosensitive member according to claim 1, wherein, in the formula (A), the average of "a" in the resin B and the resin C ranges from 20 to 40.

7. A process cartridge detachably attachable to a main body of an electrophotographic apparatus, wherein the process cartridge integrally supports:
the electrophotographic photosensitive member according to claim 1; and
at least one device selected from the group consisting of a charging device, a developing device, a transferring device, and a cleaning device.

8. An electrophotographic apparatus, comprising:
the electrophotographic photosensitive member according to claim 1; a charging device; an exposing device; a developing device; and a transferring device.

* * * * *